United States Patent
Oh et al.

(10) Patent No.: US 12,335,910 B2
(45) Date of Patent: Jun. 17, 2025

(54) METHOD AND APPARATUS FOR TRANSMITTING AND RECEIVING MODE REFERENCE SIGNAL IN WIRELESS COMMUNICATION SYSTEM

(71) Applicant: Samsung Electronics Co., Ltd., Suwon-si (KR)

(72) Inventors: Jinyoung Oh, Suwon-si (KR); Taehyoung Kim, Suwon-si (KR); Jinhyun Park, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 17/477,941

(22) Filed: Sep. 17, 2021

(65) Prior Publication Data

US 2022/0095268 A1    Mar. 24, 2022

(30) Foreign Application Priority Data

Sep. 18, 2020    (KR) .................. 10-2020-0120439

(51) Int. Cl.
| | |
|---|---|
| *H04W 68/00* | (2009.01) |
| *H04L 5/00* | (2006.01) |
| *H04W 52/52* | (2009.01) |
| *H04W 72/1263* | (2023.01) |
| *H04W 72/54* | (2023.01) |

(52) U.S. Cl.
CPC ......... *H04W 68/005* (2013.01); *H04L 5/0051* (2013.01); *H04W 52/52* (2013.01); *H04W 72/1263* (2013.01); *H04W 72/54* (2023.01)

(58) Field of Classification Search
CPC ... H04W 68/005; H04W 68/02; H04W 52/52; H04W 72/1263; H04W 72/54; H04W 72/23; H04L 5/0094; H04L 5/0048
See application file for complete search history.

(56) References Cited

U.S. PATENT DOCUMENTS

| | | | |
|---|---|---|---|
| 2018/0234197 A1 | 8/2018 | John Wilson et al. | |
| 2020/0022144 A1* | 1/2020 | Papasakellariou | .... H04W 72/23 |
| 2020/0228262 A1 | 7/2020 | Chuang et al. | |
| 2022/0352953 A1* | 11/2022 | Huang | ................ H04W 68/005 |

(Continued)

OTHER PUBLICATIONS

Huawei et al.; Assistance RS occasions for idle/inactive mode; 3GPP TSG RAN WG1 Meeting #102-e; R1-2005263; Aug. 17-28, 2020; E-meeting.

(Continued)

*Primary Examiner* — Robert C Scheibel
(74) *Attorney, Agent, or Firm* — Jefferson IP Law, LLP

(57) ABSTRACT

A communication scheme and a system thereof for converging IoT technology and a 5$^{th}$ generation (5G) communication system for supporting a high data transmission rate beyond that of a 4$^{th}$ generation (4G) system is provided. The disclosure can be applied to intelligent services (for example, services related to a smart home, smart building, smart city, smart car, connected car, health care, digital education, retail business, security, and safety) based on the 5G communication technology and the IoT-related technology.

15 Claims, 17 Drawing Sheets

(56) References Cited

U.S. PATENT DOCUMENTS

| | | | |
|---|---|---|---|
| 2022/0394526 A1* | 12/2022 | Wang | H04W 72/0446 |
| 2023/0019909 A1* | 1/2023 | Zhang | H04L 5/0023 |
| 2023/0032154 A1* | 2/2023 | Hwang | H04W 68/02 |
| 2023/0198706 A1* | 6/2023 | Maleki | H04L 5/0051 |
| | | | 370/329 |

OTHER PUBLICATIONS

LG Electronics; Discussion on TRS/CSI-RS occasion(s) for idle/inactive UEs; 3GPP TSG RAN WG1 #102-e; R1-2006312; Aug. 17-28, 2020; E-meeting.

CMCC; Discussion on potential TRS CSI-RS occasion(s) for idle/inactive UEs; 3GPP TSG RAN WG1 #102-e; R1-2006222; Aug. 17-28, 2020; E-meeting.

International Search Report with Written Opinion dated Dec. 10, 2021; International Appln. No. PCT/KR2021/012779.

\* cited by examiner

METHOD AND APPARATUS FOR TRANSMITTING AND RECEIVING MODE REFERENCE SIGNAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0120439, filed on Sep. 18, 2020, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for transmitting and receiving a reference signal in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post Long Term Evolustion (LTE) System". The 5G communication system is considered to be implemented in higher frequency (mm-Wave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for transmitting and receiving a reference signal in a wireless communication system.

Additional aspects will be set forth in part in the description which follows and, in part, will be apparent from the description, or may be learned by practice of the presented embodiments.

In accordance with an aspect of the disclosure, a method of a terminal in a communication system is provided. The method includes receiving, from a base station, configuration of an occasion for an idle or an inactive state; receiving, from the base station, an indication indicating availability of a reference signal at the occasion; receiving, from the base station, the reference signal at the occasion in response to the indication indicating that the reference signal is available at the occasion.

In accordance with another aspect of the disclosure, a method of a base station in a communication system is provided. The method includes transmitting, to a terminal, configuration of an occasion for an idle or an inactive state; transmitting, to the terminal, an indication indicating availability of a reference signal at the occasion; transmitting, to the terminal, the reference signal at the occasion in response to the indication indicating that the reference signal is available at the occasion.

In accordance with another aspect of the disclosure, a terminal in a communication system is provided. The terminal includes a transceiver; and a controller configured to: receive, from a base station, configuration of an occasion for an idle or an inactive state; receive, from the base station, an indication indicating availability of a reference signal at the occasion; receive, from the base station, the reference signal at the occasion in response to the indication indicating that the reference signal is available at the occasion.

In accordance with another aspect of the disclosure, a base station in a communication system is provided. The terminal includes a transceiver; and a controller configured to: transmit, to a terminal, configuration of an occasion for an idle or an inactive state; transmit, to the terminal, an indication indicating availability of a reference signal at the occasion; transmit, to the terminal, the reference signal at the occasion in response to the indication indicating that the reference signal is available at the occasion.

An apparatus and a method according to various embodiments of the disclosure can provide an apparatus and a method for efficiently transmitting and receiving a reference signal in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and may not be intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Figure 1:
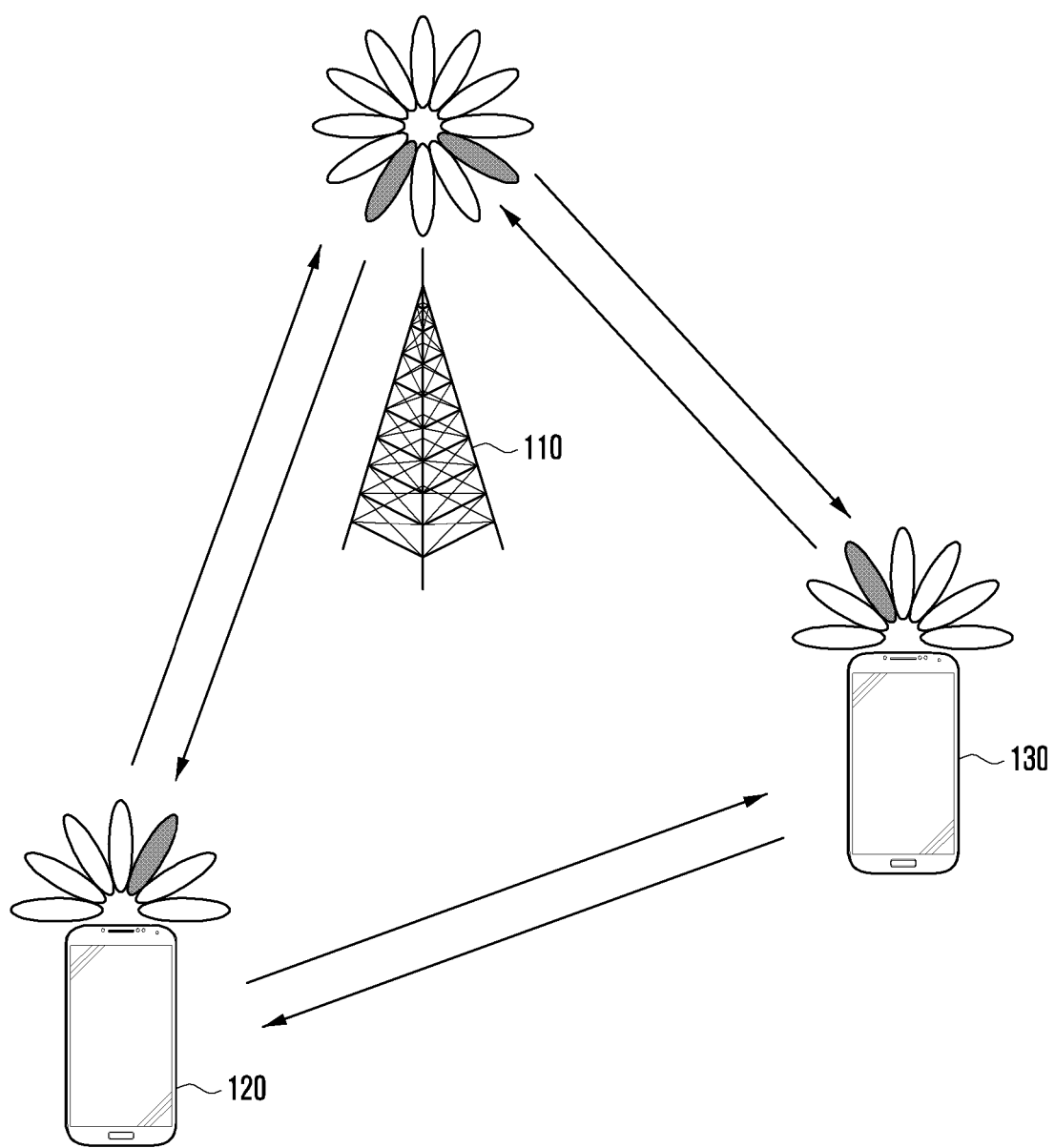
FIG. 1 illustrates a wireless communication system according to an embodiment of the disclosure.

FIG. 1 illustrates a wireless communication system according to an embodiment of the disclosure. Referring to FIG. 1, it illustrates a BS 110, a terminal 120, and a terminal 130 as some of nodes using a radio channel in a wireless communication system. Although FIG. 1 illustrates only one BS, another BS that is the same as or similar to the BS 110 may be further included.

The BS 110 is a network infrastructure element that provides radio access to the terminals 120 and 130. The BS 110 has coverage defined in a predetermined geographical area on the basis of the range within which a signal can be transmitted and received. The BS 110 may be referred to as an "Access Point (AP)", an "eNodeB (eNB)", a "5$^{th}$-Generation (5G) node", a "g NodeB (next generation node B (gNB))", a "wireless point", or a "Transmission/Reception Point (TRP)", or using another term having a technical meaning equivalent thereto, as well as "base station".

Each of the terminal 120 and the terminal 130 is a device used by a user and communicates with the BS 110 through a radio channel. Depending on circumstances, at least one of the terminal 120 and the terminal 130 may be operated without any involvement by the user. That is, at least one of the terminals 120 and 130 may be a device that performs Machine-Type Communication (MTC), and may not be carried by the user. Each of the terminal 120 and the terminal 130 may be referred to as a "user equipment (UE)", "mobile station", "subscriber station", "remote terminal", "wireless terminal", or "user device", or using another term having an equivalent technical meaning, as well as "terminal".

Figure 2:
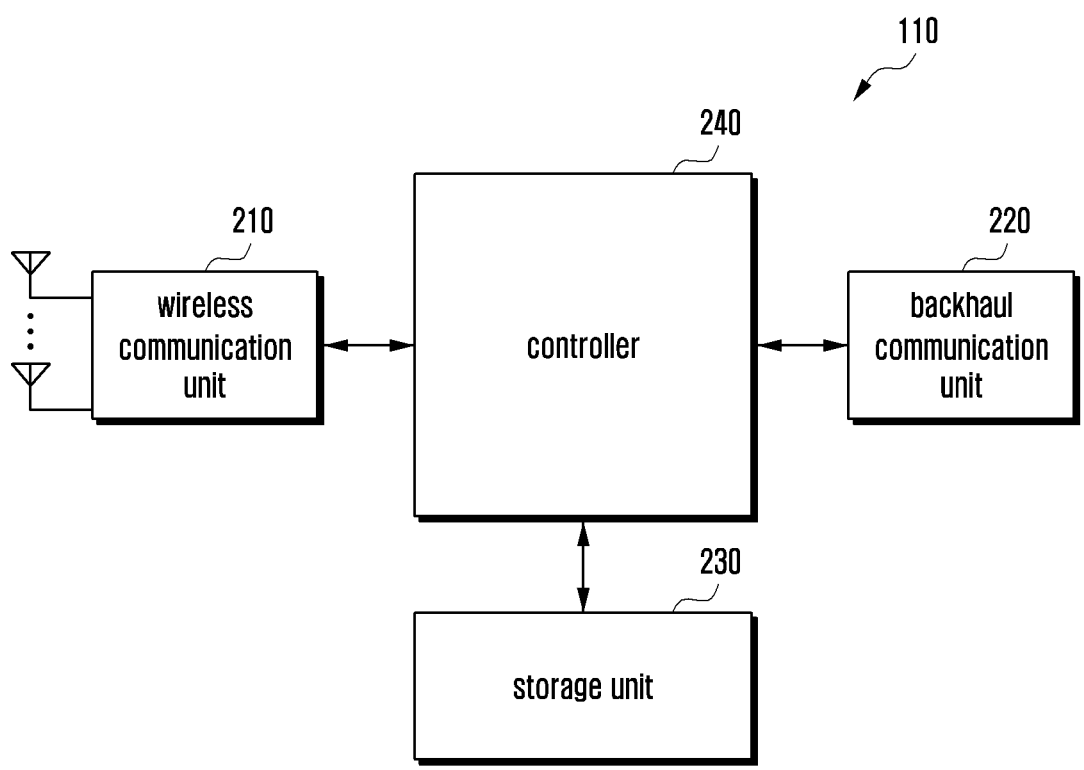
FIG. 2 illustrates an example of the configuration of a BS in a wireless communication system according to an embodiment of the disclosure.

FIG. 2 illustrates a configuration of a BS in a wireless communication system according to an embodiment of the disclosure. The configuration illustrated in FIG. 2 may be understood to be the configuration of the BS 110. The term "~unit" or "~er" used hereinafter may refer to the unit for processing at least one function or operation and may be implemented in hardware, software, or a combination of hardware and software.

Referring to FIG. 2, a BS includes a wireless communication unit 210, a backhaul communication unit 220, a storage unit 230, and a controller 240.

The wireless communication unit 210 performs functions for transmitting and receiving a signal through a radio channel. For example, the wireless communication unit 210 performs a function of conversion between a baseband signal and a bitstream according to the physical-layer standard of the system. For example, in data transmission, the wireless communication unit 210 may encode and modulate a transmission bitstream to generate complex symbols. In data reception, the wireless communication unit 210 reconstructs a reception bitstream by demodulating and decoding a baseband signal.

The wireless communication unit 210 up-converts a baseband signal into a Radio-Frequency (RF) band signal, transmits the RF band signal through an antenna, and down-converts an RF band signal received through an antenna into a baseband signal. To this end, the wireless communication unit 210 may include a transmission filter, a reception filter, an amplifier, a mixer, an oscillator, a Digital-to-Analog Convertor (DAC), an Analog-to-Digital Convertor (ADC), and the like. Further, the wireless communication unit 210 may include a plurality of transmission/reception paths. In addition, the wireless communication unit 210 may include at least one antenna array including a plurality of antenna elements.

On the hardware side, the wireless communication unit 210 may include a digital unit and an analog unit, and the analog unit may include a plurality of sub-units according to operating power, operating frequency, and the like. The digital unit may be implemented by at least one processor (for example, a Digital Signal Processor (DSP)).

The wireless communication unit 210 transmits and receives a signal as described above. Accordingly, all or part of the wireless communication unit 210 may be referred to as a "transmitter", a "receiver", or a "transceiver". Further, in the following description, transmission and reception performed through a radio channel may include the above-described processing by the wireless communication unit 210.

The backhaul communication unit 220 provides an interface for communicating with other nodes within the network. That is, the backhaul communication unit 220 converts a bitstream transmitted from the BS to another node, for example, another access node, another BS, a higher node, or a core network, into a physical signal, and converts a physical signal received from another node into a bitstream.

The storage unit 230 may store data such as a basic program for the operation of the BS, an application, and configuration information. The storage unit 230 may include volatile memory, nonvolatile memory, or a combination of volatile memory and nonvolatile memory. The storage unit 230 provides stored data in response to a request from the controller 240.

The controller 240 may control the overall operation of the BS. For example, the controller 240 transmits and receives a signal through the wireless communication unit 210 or the backhaul communication unit 220. The controller 240 records data in the storage unit 230 and reads the same. The controller 240 may perform the functions of a protocol stack required according to communication standards. According to another implementation, the protocol stack may be included in the wireless communication unit 210. To this end, the controller 240 may include at least one processor.

Figure 3:
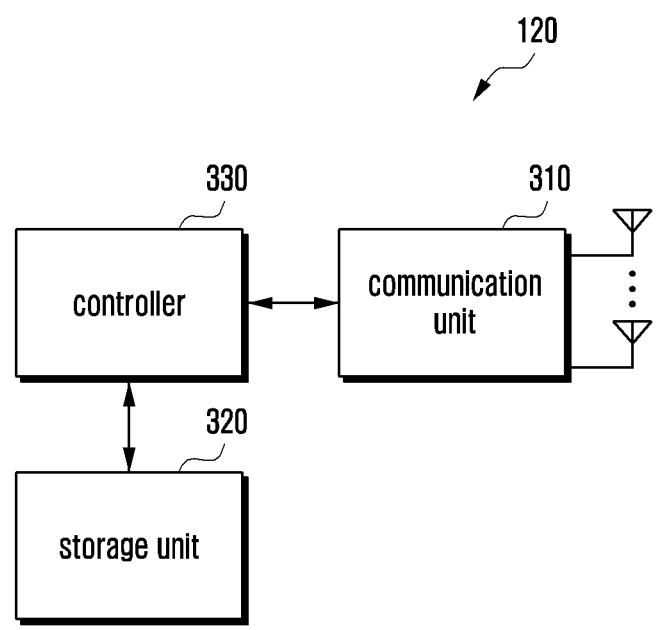
FIG. 3 illustrates an example of the configuration of a terminal in a wireless communication system according to an embodiment of the disclosure.

FIG. 3 illustrates a configuration of a terminal in a wireless communication system according to an embodiment of the disclosure. The configuration illustrated in FIG. 3 may be understood as the configuration of the terminal 120. The term "~unit" or "~er" used hereinafter may refer to the unit for processing at least one function or operation and may be implemented in hardware, software, or a combination of hardware and software.

Referring to FIG. 3, a terminal includes a communication unit 310, a storage unit 320, and a controller 330.

The communication unit 310 performs functions for transmitting and receiving a signal through a radio channel. For example, the communication unit 310 performs a function of conversion between a baseband signal and a bitstream according to a physical-layer standard of the system. For example, in data transmission, the communication unit 310 encodes and modulates a transmission bitstream to generate complex symbols. In data reception, the communication unit 310 reconstructs a reception bitstream by demodulating and decoding a baseband signal. Further, the communication unit 310 up-converts a baseband signal to an RF band signal, transmits the RF band signal through an antenna, and then down-converts the RF band signal received through the antenna to the baseband signal. For example, the communication unit 310 may include a transmission filter, a reception filter, an amplifier, a mixer, an oscillator, a DAC, and an ADC.

The communication unit 310 may include a plurality of transmission/reception paths. The communication unit 310 may include at least one antenna array including a plurality of antenna elements. On the hardware side, the communication unit 310 may include a digital circuit and an analog circuit (for example, a Radio Frequency Integrated Circuit (RFIC)). The digital circuit and the analog circuit may be implemented as a single package. The communication unit 310 may include a plurality of RF chains. The communication unit 310 may perform beamforming.

The communication unit 310 transmits and receives a signal as described above. Accordingly, all or part of the communication unit 310 may be referred to as a "transmitter", a "receiver", or a "transceiver". In the following description, transmission and reception performed through a radio channel are used to have a meaning including the processing performed by the communication unit 310.

The storage unit 320 stores data such as a basic program, an application, and configuration information for the operation of the terminal. The storage unit 320 may include volatile memory, nonvolatile memory, or a combination of volatile memory and nonvolatile memory. The storage unit 320 provides stored data in response to a request from the controller 330.

The controller 330 controls the overall operation of the terminal. For example, the controller 330 transmits and receives a signal through the communication unit 310. The controller 330 records data in the storage unit 320 and reads the same. The controller 330 may perform the functions of a protocol stack required by the communication standard. To this end, the controller 330 may include at least one processor or microprocessor, or may be a part of the processor. Further, the part of the communication unit 310 or the controller 330 may be referred to as a Communications Processor (CP).

Figure 4:
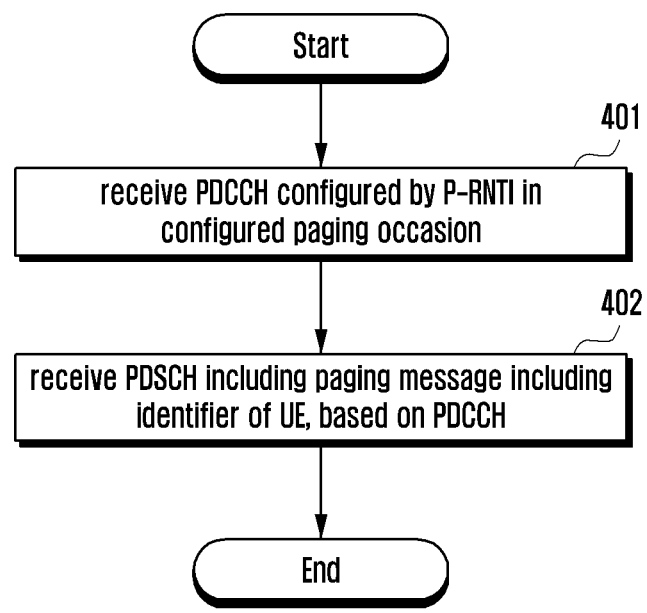
FIG. 4 illustrates an example of the operation of a terminal performed in a wireless communication system according to an embodiment of the disclosure.

FIG. 4 illustrates an operation of a terminal in a wireless communication system according to an embodiment of the disclosure.

Referring to FIG. 4, in operation 401, a terminal receives a Physical Downlink Control Channel (PDCCH) configured by a Paging-Radio Network Temporary Identifier (P-RNTI) in a configured paging occasion. A paging procedure may be used to, when an incoming call to UEs in an idle or inactive state is generated, inform the UEs of the generation of the incoming call and start network access for the UEs or inform UEs in a connected state that system information is changed (an idle state or an inactive state may mean a state in which a terminal camps on a predetermined cell and is not RRC-connected, and a connected state may mean a state in which the terminal is RRC-connected via an initial access procedure). Paging starts from an AMF and is transmitted to the terminal via the base station (gNB). More specifically, paging starts from the AMF, is transmitted to a gNB 1102 through S1 Application Protocol (S1AP) signaling, and then transmitted to the terminal through RRC signaling. At this time, the terminal may know whether there is a paging message by monitoring a PDCCH configured by a P-RNTI in a paging occasion. The paging occasion may be determined on the basis of a DRX cycle which the BS configures in the terminal.

In operation 402, the terminal receives a Physical Downlink Shared Channel (PDSCH) containing a paging message including an identifier of the terminal on the basis of the PDCCH. The terminal receiving the PDCCH configured by the P-RNTI may receive a PDSCH including a paging message 1106. The paging message may include UE identifier (UE ID) information of the terminal which the BS desires to wake.

A wireless communication system has developed into a broadband wireless communication system that provides a high-speed and high-quality packet data service according to communication standards such as high-speed packet access (HSPA) of 3GPP, long-term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the initially provided voice-based service.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a terminal (a User Equipment (UE) or a Mobile Station (MS)) transmits data or a control signal to a Base Station (BS) (or an eNode B), and the downlink is a radio link through which the BS transmits data or a control signal to the terminal. In the multiple access schemes as described above, time-frequency resources for carrying data or control information are allocated and operated in a manner to prevent overlapping of the resources, that is, to establish the orthogonality, between users, so as to identify data or control information of each user.

A post-LTE communication system, that is, a 5G communication system, should be able to freely reflect the various requirements of a user and a service provider, and thus it is required to support a service which simultaneously satisfies the various requirements. Services considered for the 5G communication system include enhanced Mobile Broadband (eMBB), massive Machine-Type Communication (mMTC), and Ultra-Reliability Low-Latency Communication (URLLC).

The eMBB aims to provide a data transmission rate which is improved so as to surpass the data transmission speed supported by LTE, LTE-A, or LTE-Pro according to the related art. For example, in the 5G communication system, the eMBB should provide a peak downlink data rate of 20 Gbps and a peak uplink data rate of 10 Gbps from the viewpoint of one base station. Further, the 5G communication system should provide not only the peak data rate but also an increased user-perceived data rate. In order to satisfy such requirements, improvement of various transmission/reception technologies, including a further improved multi-input multi-output (MIMO) transmission technology, is needed. Further, while the current LTE system uses a maximum of bandwidths of 20 MHz in bandwidths of 2 GHz used in LTE to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

Also, in order to support an application service such as the Internet of Things (IoT), mMTC is considered in the 5G communication system. The mMTC is required to support access of a multitude of terminals within a cell, improve coverage of the terminal, increase a battery lifetime, and reduce the costs of the terminal in order to efficiently provide IoT. IoT is attached to various sensors and devices to provide communication, and thus should support a large number of terminals (for example, 1,000,000 terminals/$km^2$). Since the terminal supporting the mMTC is highly likely to be located in a shaded area, such as a basement, which a cell cannot cover due to service characteristics, the mMTC may require wider coverage than other services provided by the 5G communication system. The terminal supporting the mMTC needs to be produced at low cost and it is difficult to frequently exchange a battery thereof, so that a very long battery lifetime, for example, 10 to 15 years, may be required.

Last, in the URLLC is a cellular-based wireless communication service used for a particular purpose (mission-critical). For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (air interface latency) shorter than 0.5 milliseconds and also have a requirement of a packet error rate equal to or smaller than $7^5$. Accordingly, for services supporting the URLLC, the 5G system should provide a Transmit Time Interval (TTI) smaller than that of other systems and also has a design requirement of allocating a wide array of resources in a frequency band in order to guarantee reliability of a communication link.

The three services of 5G, that is, eMBB, URLLC, and mMTC may be multiplexed in one system and transmitted. At this time, in order to meet the different requirements of the respective services, different transmission/reception schemes and transmission/reception parameters may be used for the services. Of course, 5G is not limited to the above-described three services.

Hereinafter, a frame structure of the 5G system is described in more detail with reference to the drawings.

Figure 5:
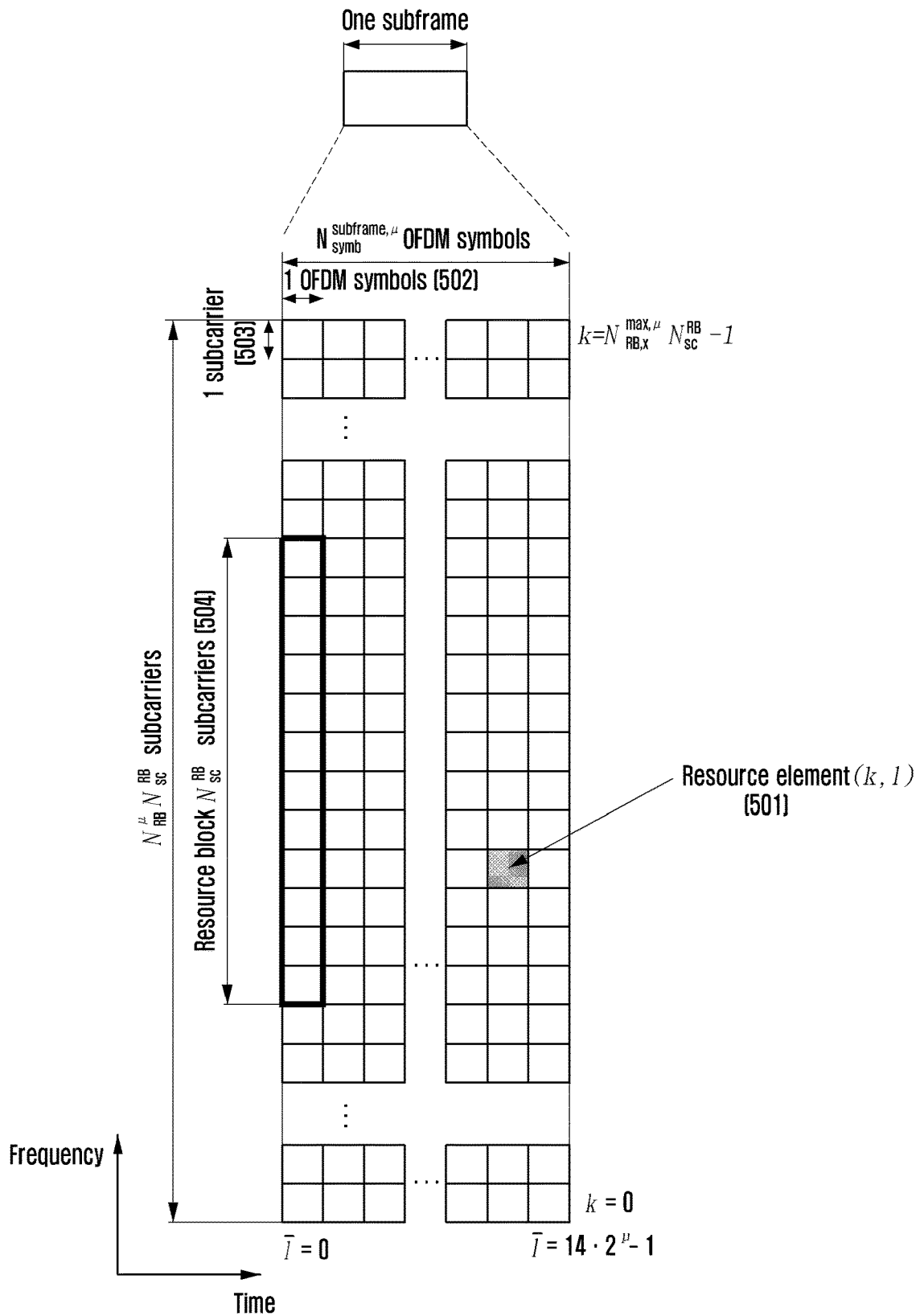
FIG. 5 illustrates an example of the basic structure of a time-frequency domain in a wireless communication system according to an embodiment of the disclosure.

FIG. 5 illustrates a structure of resources in a wireless communication system according to an embodiment of the disclosure. Specifically, FIG. 5 illustrates the basic structure of a time-frequency domain which is a radio resource area in which data or a control channel is transmitted in a 5G system.

Referring to FIG. 5, a horizontal axis indicates a time domain, and a vertical axis indicates a frequency domain. A basic unit of resources in the time and frequency domain is a Resource Element (RE) 501 and may be defined as 1 Orthogonal Frequency Division Multiplexing (OFDM) symbol 502 in the time axis and 1 subcarrier 503 in the frequency axis. In the frequency domain, $N_{sc}^{RB}$ (for example, 12) successive REs may correspond to one Resource Block (RB) 504.

Figure 6:
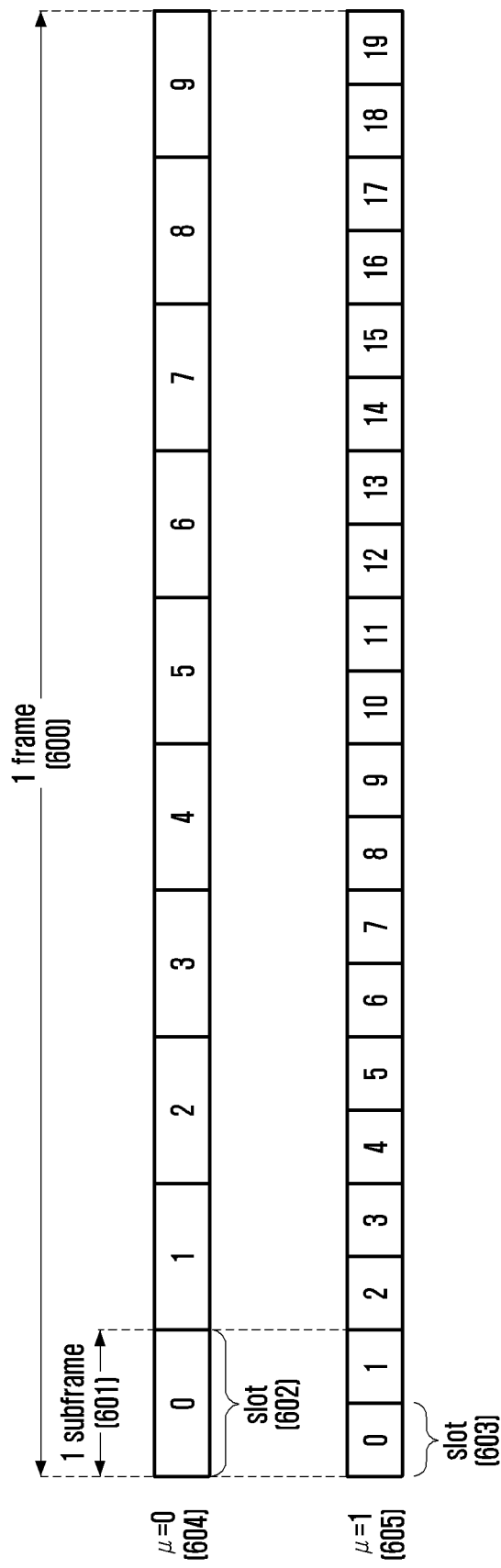
FIG. 6 illustrates an example of the slot structure in a wireless communication system according to an embodiment of the disclosure.

FIG. 6 illustrates a structure of resources in a wireless communication system according to an embodiment of the disclosure. Specifically, FIG. 6 illustrates the slot structure considered in the 5G system.

Referring to FIG. 6, an example of a structure of a frame 600, a subframe 601, and slots 602 and 603 is illustrated. One frame 600 may be defined as 10 ms. One subframe 601 may be defined as 1 ms, and accordingly one frame 600 may include a total of 10 subframes 601. One slot 602 or 603 may be defined as 14 OFDM symbols (that is, the number symbols $N_{symb}^{slot}$) per slot=14). One subframe 601 may include one or a plurality of slots 602 or 603, and the number of slots 602 or 603 per subframe 601 may vary depending on a set value μ 604 or 605 for subcarrier spacing, <0}

In the example of FIG. 6, the subcarrier spacing set values μ=0 604 and μ=1 605. In the case of μ=0 604, one subframe 601 may consist of one slot 602. In the case of μ=1 605, one subframe 601 may consist of two slots 603. That is, the number of slots ($N_{slot}^{subframe,\mu}$) per subframe may be different according to the set value μ for subcarrier spacing, and accordingly, the number of slots ($N_{slot}^{subframe,\mu}$) per frame may be different. $N_{slot}^{subframe,\mu}$ and $N_{slot}^{frame,\mu}$ according to the subcarrier spacing set value μ may be defined as shown in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Subsequently, a configuration of a bandwidth part (BWP) in the 5G communication system will be described in detail with reference to the drawings.

Figure 7:
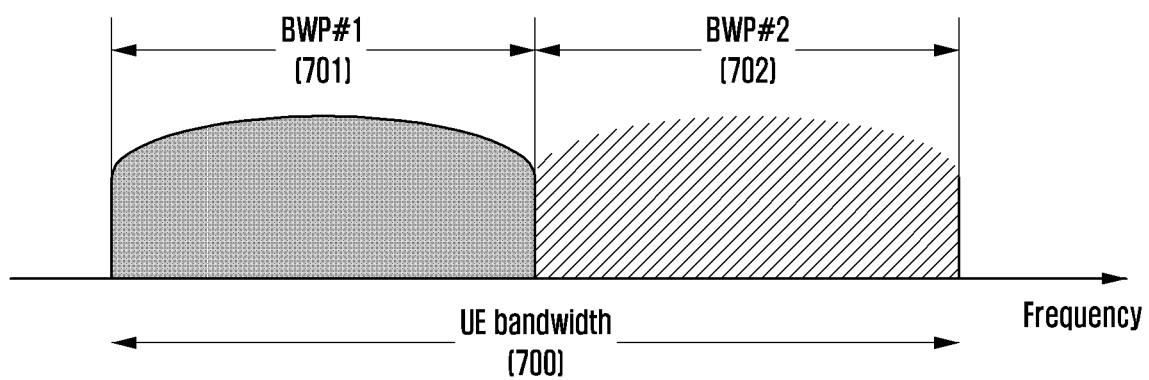
FIG. 7 illustrates an example of the structure of a BWP in a wireless communication system according to an embodiment of the disclosure.

FIG. 7 illustrates a structure of a BWP in a wireless communication system according to an embodiment of the disclosure. Specifically, FIG. 7 illustrates an example of a configuration for a BWP in a 5G communication system.

Referring to FIG. 7, an example in which a UE bandwidth 700 includes two BWPs, that is, BWP #1 701 and BWP #2 702 is illustrated. The BS may configure one or a plurality of BWPs in the terminal and configure information as shown in [Table 2] below for each BWP.

TABLE 2

```
BWR ::=                              SEQUENCE {
    bwp-Id                               BWP-Id,
    (Bandwidth part identifier)
    locationAndBandwidth                 INTEGER (1..65536),
        (Bandwidth part location)
    subcarrierSpacing                    ENUMERATED {n0, n1, n2, n3,
n4, n5},
        (Subcarrier spacing)
    cyclicPrefix                         ENUMERATED { extended }
        (Cyclic prefix)
}
```

Various embodiments of the disclosure are not limited to the above example, and various parameters related to the BWP as well as the configuration information may be configured in the terminal. The information may be transmitted from the BS to the terminal through higher-layer signaling, for example, Radio Resource Control (RRC) signaling. Among the configured one or plurality of BWPs, at least one BWP may be activated. Information indicating whether to activate the configured BWPs may be semi-statically transferred from the BA to the terminal through RRC signaling or may be dynamically transferred through Downlink Control Information (DCI).

According to an embodiment, the terminal before the Radio Resource Control (RRC) connection may receive a configuration of an initial BWP for initial access from the BS through a Master Information Block (MIB). More specifically, the terminal may receive configuration information for a control resource set (CORESET) and a search space in which a PDCCH for receiving system information (Remaining System Information (RMSI) or System Information Block 1 (SIB1)) required for initial access through the MIB can be transmitted in an initial access operation. The control resource set and the search space configured as the MIB may be considered as an identity (ID) of 0. The BS may inform the user of configuration information such as frequency allocation information, time allocation information, and numerology for control resource set #0. Further, the BS may inform the terminal of configuration information of a monitoring period and a paging occasion for control resource set #0, that is, configuration information for search space #0 through the MIB. The terminal may consider a frequency domain configured as control resource set #0 acquired from the MIB as an initial BWP for initial access. At this time, an ID of the initial BWP may be considered as 0.

The configuration for the BSP supported by 5G may be used for various purposes.

According to an embodiment, when a bandwidth supported by the terminal is smaller than a system bandwidth, the bandwidth may be supported through the BWP configuration. For example, the BS may configure a frequency location of the BWP (configuration information 2) in the terminal and thus transmit and thus the terminal may transmit and receive data at a specific frequency location within the system bandwidth.

According to an embodiment, the BS may configure a plurality of BWPs in the terminal in order to support different numerologies. For example, in order to support the terminal to perform data transmission and reception using both subcarrier spacing of 15 kHz and subcarrier spacing of 30 kHz, two BWPs may be configured as subcarrier spacings of 15 kHz and 30 kHz, respectively. Different BWPs may be frequency-division-multiplexed, and when data is transmitted/received at particular subcarrier spacing, the BWP configured at the corresponding subcarrier spacing may be activated.

According to an embodiment, the BS may configure BWPs having different sizes of bandwidths in the UE in order to reduce power consumption of the terminal. For example, when the terminal supports a very large bandwidth, for example, 100 MHz but always transmits and receives data through the bandwidth, very high power consumption may be generated. Particularly, monitoring an unnecessary downlink control channel through a large bandwidth of 100 MHz in the state in which there is no traffic is very inefficient from the aspect of power consumption. In order to reduce power consumption of the terminal, the BS may configure a BWP having a relatively small bandwidth, for example, a BWP of 20 MHz in the terminal. The terminal may perform a monitoring operation in the BWP of 20 MHz in the state in which there is no traffic, and if data is generated, may transmit and receive data through the BWP of 100 MHz according to an instruction from the BS.

In a method of configuring the BWP, terminals before the RRC connection may receive configuration information for an initial BWP through a Master Information Block (MIB) in an initial access operation. More specifically, the terminal may receive a configuration of a control resource set (CORESET) for a downlink control channel in which Downlink Control Information (DCI) for scheduling a System Information Block (SIB) can be transmitted from an MIB of a Physical Broadcast Channel (PBCH). A bandwidth of the CORESET configured as the MIB may be considered as an initial downlink BWP, and the terminal may receive a Physical Downlink Shared Channel (PDSCH), in which the SIB is transmitted, through the configured initial BWP. The initial BWP may be used not only for receiving the SIB but also for Other System Information (OSI), paging, or random access.

When one or more BWPs are configured in the terminal, the BS may instruct the terminal to change the BWPs through a BWP indicator field within the DCI. For example, when a currently activated BWP of the terminal is BWP #1 701 in FIG. 7, the BS may indicate BWP #2 702 to the terminal through a BWP indicator within DCI, and the terminal may change the BWP into BWP #2 702 indicated by the received BWP indicator within the DCI.

As described above, since the DCI-based BWP change may be indicated by the DCI for scheduling the PDSCH or the PUSCH, the terminal should receive or transmit the PDSCH or the PUSCH scheduled by the corresponding DCI in the changed BWP without any difficulty if the terminal receives a BWP change request. To this end, the standard defines requirements of a delay time (TBWP) required for a BWP change, and the requirements may be defined as, for example, shown in Table 3 below.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1
Depends on UE capability.
Note 2:
If the BWP switch involves changing of SCS, the BWP switch delay is determined by the larger one between the SCS before BWP switch and the SCS after BWP switch.

The requirements for the BWP change delay time support type 1 or type 2 according to a capability of the terminal. The terminal may report a supportable BWP delay time type to the BS.

When the terminal receives DCI including a BWP change indicator in slot n according to the requirements for the BWP change delay time, the terminal may complete a change to a new BWP indicated by the BWP change indicator at a time point that is not later than slot $n+T_{BWP}$ and transmit and receive a data channel scheduled by the corresponding DCI in the changed new BWP. When the BS desires to schedule a data channel in the new BWP, the BS may determine allocation of time domain resources for the data channel in consideration of the BWP change delay time ($T_{BWP}$) of the terminal. That is, when scheduling the data channel in the new BWP, the BS may schedule the corresponding data channel after the BWP change delay time through a method of determining allocation of time domain resources for the data channel. Accordingly, the terminal may not expect that the DCI indicating the BWP change indicates a slot offset (K0 or K2) smaller than the BWP change delay time ($T_{BWP}$).

If the terminal receives DCI (for example, DCI format 1_1 or 0_1) indicating the BWP change, the terminal may perform no transmission or reception during a time interval corresponding to symbols from a third symbol of a slot for receiving the PDCCH including the corresponding DCI to a start point of the slot indicated by the slot offset (K0 or K2) indicated by a time domain resource allocation field within the corresponding DCI. For example, when the terminal receives DCI indicating the BWP change in slot n and a slot offset value indicated by the corresponding DCI is K, the terminal may perform no transmission or reception from the third symbol of slot n to a symbol before slot n+K (that is, the last symbol of slot n+K−1).

Subsequently, a Synchronization Signal (SS)/PBCH block in 5G is described.

An SS/PBCH block may be a physical layer channel block including a Primary SS (PSS), a Secondary SS (SSS), and a PBCH. Specifically, the configuration of the SS/PBCH block is described below.

PSS: is a signal which is a reference of downlink time/frequency synchronization and provides some pieces of information of a cell ID.

SSS: is a reference of downlink time/frequency synchronization and provides the remaining cell ID information which the PSS does not provides. In addition, the SSS serves as a reference signal for demodulation of a PBCH.

PBCH: provides necessary system information required for transmitting and receiving a data channel and a control channel by the terminal. The necessary system information may include control information related to a search space indicating radio resource mapping information of a control channel, scheduling information for a separate data channel for transmitting system information, and the like.

SS/PBCH block: includes a combination of PSS, SSS, and PBCH. One or a plurality of SS/PBCH blocks may be transmitted within a time of 5 ms, and each of the transmitted SS/PBCH blocks may be separated by an index.

The terminal may detect the PSS and the SSS in an initial access stage and decode the PBCH. The terminal may receive the MIB from the PBCH and receive a configuration of a control resource set (CORESET) #0 (corresponding to a control resource set having a control resource set index or an identity (ID) of 0) and search space #0 (corresponding to a search space having a search space index or an ID of 0). The terminal may monitor CORESET #0 on the basis of the assumption that the selected SS/PBCH block and a Demodulation Reference Signal (DMRS) transmitted in CORESET #0 are Quasi Co-Located (QCL). The terminal may receive system information through downlink control information transmitted in CORESET #0. The terminal may acquire configuration information related to a Random Access Channel (RACH) required for initial access from the received system information. The terminal may transmit a Physical RACH (PRACH) to the BS in consideration of the selected SS/PBCH block index, and the BS receiving the PRACH may acquire the SS/PBCH block index selected by the terminal. The BS may know which block is selected by the terminal from among the SS/PBCH blocks and that CORESET #0 related thereto is monitored.

Subsequently, downlink control information (DCI) in the 5G system will be described in detail.

In the 5G system, scheduling information for uplink data (or a physical uplink data channel (Physical Uplink Shared Channel (PUSCH)) or downlink data (or physical downlink data channel (Physical Downlink Shared Channel (PDSCH)) may be transmitted from the BS to the terminal through DCI. The terminal may monitor a fallback DCI format and a non-fallback DCI format for the PUSCH or the PDSCH. The fallback DCI format may include a fixed field predefined between the BS and the terminal, and the non-fallback DCI format may include a configurable field.

The DCI may be transmitted through a Physical Downlink Control Channel (PDCCH) after passing through a channel coding and modulation process. A Cyclic Redundancy Check (CRC) is added to a DCI message payload and is scrambled by a Radio Network Temporary Identifier (RNTI) corresponding to the identity of the terminal. Depending on the purpose of the DCI message, for example, UE-specific data transmission, a power control command, a random access response, or the like, different RNTIs may be used. That is, the RNTI is not explicitly transmitted but is included in a CRC calculation process to be transmitted. If the DCI message transmitted through the PDCCH is received, the terminal may identify the CRC through the allocated RNTI, and may recognize that the corresponding message is transmitted to the terminal when the CRC is determined to be correct on the basis of the CRC identification result.

For example, DCI for scheduling a PDSCH for System Information (SI) may be scrambled by an SI-RNTI. DCI for scheduling a PDSCH for a Random Access Response (RAR) message may be scrambled by an RA-RNTI. DCI for scheduling a PDSCH for a paging message may be scrambled by a P-RNTI. DC for notifying of a Slot Format Indicator (SFI) may be scrambled by an SFI-RNTI. DCI for notifying of Transmit Power Control (TPC) may be scrambled by a TPC-RNTI. DC for scheduling a UE-specific PDSCH or PSCH may be scrambled by a Cell RNTI (C-RNTI), a Modulation Coding Scheme (MCS)-C-RNTI, or a Configured Scheduling (CS)-RNTI.

DCI format 0_0 may be used for failback DC for scheduling a PUSCH in which case the CRC may be scrambled by a C-RNTI. DCI format 0_0 in which the CRC is scrambled by the C-RNTI may include, for example, information in Table 4 below.

TABLE 4

Identifier for DCI formats - 1 bit
    The value of this bit field is always set to 0, indicating an UL DCI format
Frequency domain resource assignment- $\lceil\log_2(N_{RB}^{UL,BWP}(N_{RB}^{UL,BWP}+ 1)/2)\rceil$ bits where $N_{RB}^{UL,BWP}$ is defined in subclause 7.3.1.0
    For PUSCH hopping with resource allocation type 1:
        $N_{UL\_hop}$ MSB bits are used to indicate the frequency offset according to
        Subclause 6.3 of [6, TS 38.214], where $N_{UL\_hop}$ = 1 if the higher layer parameter
        frequencyHoppingOffsetLists contains two offset values and $N_{UL\_hop}$ = 2 if the
        higher layer parameter frequencyHoppingOffsetLists contains four offset
        values
        $\lceil\log_2(N_{RB}^{UL,BWP}(N_{RB}^{UL,BWP}+ 1)/2)\rceil$ − $N_{UL\_hop}$ bits provides the frequency
        domain
        resource allocation according to Subclause 6.1.2.2.2 of [6, TS 38.214]
    For non-PUSCH hopping with resource allocation type 1:
        $\lceil\log_2(N_{RB}^{UL,BWP}(N_{RB}^{UL,BWP}+ 1)/2)\rceil$ bits provides the frequency domain resource
        allocation according to Subclause 6.1.2.2.2 of [6, TS 38.214]
Time domain resource assignment- 4 bits as defined in Subclause 6.1.2.1 of [6, TS 38.214]
Frequency hopping flag - 1 bit according to Table 7.3.1.1.1-3, as defined in Subclause 6.3 of [6, TS 38.214]
Modulation and coding scheme - 5 bits as defined in Subclause 6.1.4.1 of [6, TS 38.214]
New data indicator - 1 bit
Redundancy version - 2 bits as defined in Table 7.3.1.1.1-2
HARQ process number - 4 bits
TPC command for scheduled PUSCH - 2 bits as defined in Subclause 7.1.1 of [5, TS 38.213]

TABLE 4-continued

Padding bits, if required.
UL/SUL indicator - 1 bit for UEs configured with supplementaryUplink in
ServingCellConfig in the cell as defined in Table 7.3.1.1.1-1 and the number of bits
for DCI format 1_0 before padding is larger than the number of bits for DCI format
0_0 before padding; 0 bit otherwise. The UL/SUL indicator, if present, locates in the
last bit position of DCI format 0_0, after the padding bit(s).
    If the UL/SUL indicator is present in DCI format 0_0 and the higher layer
    parameter pusch-Config is not configured on both UL and SUL the UE ignores
    the UL/SUL indicator field in DCI format 0_0, and the corresponding PUSCH
    scheduled by the DCI format 0_0 is for the UL or SUL for which high layer
    parameter pucch-Config is configured;
    If the UL/SUL indicator is not present in DCI format 0_0 and pucch-Config is
    configured, the corresponding PUSCH scheduled by the DCI format 0_0 is for
    the UL or SUL for which high layer parameter pucch-Config is configured.
    If the UL/SUL indicator is not present in DCI format 0_0 and pucch-Config is not
    configured, the corresponding PUSCH scheduled by the DCI format 0_0 is for
    the uplink on which the latest PRACH is transmitted.

DCI format 0_1 may be used for non-fallback DCI for scheduling a PUSCH in which case the CRC may be scrambled by a C-RNTI. DCI format 0_1 in which the CRC is scrambled by the C-RNTI may include, for example, information in Table 5 below.

TABLE 5

Identifier for DCI formats - 1 bit
The value of this bit field is always set to 0, indicating an UL DCI format
Carrier indicator - 0 or 3 bits, as defined in Subclause 10.1 of [5, TS38.213].
UL/SUL indicator - 0 bit for UEs not configured with supplementaryUplink in
SrvingCellConfig in the cell or UEs configured with supplementaryUplink in
ServingCellConfig in the cell but only PUCCH carrier in the cell is configured
for PUSCH transmission; otherwise, 1 bit as defined in Table 7.3.1.1.1-1.
Bandwidth part indicator - 0, 1 or 2 bits as determined by the number of UL
BWPs $n_{BWP,RRC}$ configured by higher layers, excluding the initial UL
bandwidth part. The bitwidth for this field is determined as $\lceil \log_2(n_{BWP}) \rceil$ bits,
where
$n_{BWP} = n_{BWP,RRC} + 1$ if $n_{BWP,RRC} \leq 3$, in which case the bandwidth part
indicator is equivalent to the ascending order of the higher layer parameter
BWP-Id;
otherwise $n_{BWP} = n_{BWP,RRC}$, in which case the bandwidth part indicator is
defined in Table 7.3.1.1.2-1;
If a UE does not support active BWP change via DCI, the UE ignores this bit
field.
Frequency domain resource assignment - number of bits determined by the
following, where $N_{RB}^{UL,BWP}$ is the size of the active UL bandwidth part:
$N_{RBG}$ bits if only resource allocation type 0 is configured, where $N_{RBG}$ is
defined in Subclause 6.1.2.2.1 of [6, TS 38.214],
$\lceil \log_2(N_{RB}^{UL,BWP}(N_{RB}^{UL,BWP} + 1)/2) \rceil$ bits if only resource allocation type 1 is
configured, or $\max(\lceil \log_2(N_{RB}^{UL,BWP}(N_{RB}^{UL,BWP} + 1)/2) \rceil, N_{RBG}) + 1$ bits if
both resource allocation type 0 and 1 are configured.
    If both resource allocation type 0 and 1 are configured, the MSB bit is used
    to indicate resource allocation type 0 or resource allocation type 1, where the
    bit value of 0 indicates resource allocation type 0 and the bit value of 1
    indicates resource allocation type 1.
    For resource allocation type 0, the $N_{RBG}$ LSBs provide the resource allocation
    as defined in Subclause 6.1.2.2.1 of [6, TS 38.214].
    For resource allocation type 1, the $\lceil \log_2(N_{RB}^{UL,BWP}(N_{RB}^{UL,BWP} + 1)/2) \rceil$ LSBs
    provide the resource allocation as follows:
        For PUSCH hopping with resource allocation type 1:
            $N_{UL\_hop}$ MSB bits are used to indicate the frequency offset according to
            Subclause 6.3 of [6, TS 38.214], where $N_{UL\_hop} = 1$ if the higher layer
            parameter frequencyHoppingOffsetLists contains two offset values and
            $N_{UL\_hop} = 2$ if the higher layer parameter frequencyHoppingOffsetLists
            contains four offset values
            $\lceil \log_2(N_{RB}^{UL,BWP}(N_{RB}^{UL,BWP} + 1)/2) \rceil - N_{UL\_hop}$ bits provides the
            frequency domain resource allocation according to Subclause 6.1.2.2.2
            of [6, TS 38.214]
        For non-PUSCH hopping with resource allocation type 1:
            $\lceil \log_2(N_{RB}^{UL,BWP}(N_{RB}^{UL,BWP} + 1)/2) \rceil$ bits provides the frequency domain
            resource allocation according to Subclause 6.1.2.2.2 of [6, TS 38.214]
If "Bandwidth part indicator" field indicates a bandwidth part other than the
active bandwidth part and if both resource allocation type 0 and 1 are
configured for the indicated bandwidth part, the UE assumes resource
allocation type 0 for the indicated bandwidth part if the bitwidth of the
"Frequency domain resource assignment" field of the active bandwidth part
is smaller than the bitwidth of the "Frequency domain resource assignment"

TABLE 5-continued field of the indicated bandwidth part.
Time domain resource assignment - 0, 1, 2, 3, or 4 bits as defined in Subclause
6.1.2.1 of [6, TS38.214]. The bitwidth for this field is determined as
$\lceil \log_2(I) \rceil$ bits, where I is the number of entries in the higher layer parameter
pusch-TimeDomainAllocationList if the higher layer parameter is configured;
otherwise I is the number of entries in the default table.
Frequency hopping flag - 0 or 1 bit:
  0 bit if only resource allocation type 0 is configured or if the higher layer
  parameter frequencyHopping is not configured;
  1 bit according to Table 7.3.1.1.1-3 otherwise, only applicable to resource
  allocation type 1, as defined in Subclause 6.3 of [6, TS 38.214].
Modulation and coding scheme - 5 bits as defined in Subclause 6.1.4.1 of [6,
TS 38.214]
New data indicator - 1 bit
Redundancy version - 2 bits as defined in Table 7.3.1.1.1-2
HARQ process number - 4 bits
$1^{st}$ downlink assignment index - 1 or 2 bits:
  1 bit for semi-static HARQ-ACK codebook;
  2 bits for dynamic HARQ-ACK codebook.
$2^{nd}$ downlink assignment index - 0 or 2 bits:
  2 bits for dynamic HARQ-ACK codebook with two HARQ-ACK sub-
  codebooks;
  0 bit otherwise.
TPC command for scheduled PUSCH - 2 bits as defined in Subclause 7.1.1 of
[5, TS38.213]

SRS resource indicator - $\left\lceil \log_2\left( \sum_{k=1}^{min\{L_{max},N_{SRS}\}} \binom{N_{SRS}}{k} \right) \right\rceil$ or $\lceil \log_2(N_{SRS}) \rceil$ bits where $N_{SRS}$ is the number of configured SRS resources in the SRS resource set
associated with the higher layer parameter usage of value 'codeBook' or
'nonCodeBook', $\left\lceil \log_2\left( \sum_{k=1}^{min\{L_{max},N_{SRS}\}} \binom{N_{SRS}}{k} \right) \right\rceil$ bits according to Tables 7.3.1.1.2-

28/29/30/31 if the higher layer parameter txConfig = nonCodebook, where
$N_{SRS}$ is the number of configured SRS resources in the SRS resource set
associated with the higher layer parameter usage of value 'nonCodeBook' and
if UE supports operation with maxMIMO-Layers and the higher layer
parameter maxMIMO-Layers of PUSCH-ServingCellConfig of the serving
cell is configured, $L_{max}$ is given by that parameter
otherwise, $L_{max}$ is given by the maximum number of layers for PUSCH
supported by the UE for the serving cell for non-codebook based
operation.
$\lceil \log_2(N_{SRS}) \rceil$ bits according to Tables 7.3.1.1.2-32 if the higher layer
parameter txConfig = codebook, where NsRs is the number of configured
SRS resources in the SRS resource set associated with the higher layer
parameter usage of value 'codeBook'.
Precoding information and number of layers - number of bits determined by the
following:
0 bits if the higher layer parameter txConfig = nonCodeBook;
0 bits for 1 antenna port and if the higher layer parameter txConfig =
codebook;
4, 5, or 6 bits according to Table 7.3.1.1.2-2 for 4 antenna ports, if txConfig =
codebook, and according to whether transform precoder is enabled or
disabled, and the values of higher layer parameters maxRank, and
codebookSubset;
2, 4, or 5 bits according to Table 7.3.1.1.2-3 for 4 antenna ports, if txConfig =
codebook, and according to whether transform precoder is enabled or
disabled, and the values of higher layer parameters maxRank, and
codebookSubset;
2 or 4 bits according to Table7.3.1.1.2-4 for 2 antenna ports, if txConfig =
codebook, and according to whether transform precoder is enabled or
disabled, and the values of higher layer parameters maxRank and
codebookSubset;
1 or 3 bits according to Table7.3.1.1.2-5 for 2 antenna ports, if txConfig =
codebook, and according to whether transform precoder is enabled or
disabled, and the values of higher layer parameters maxRank and
codebookSubset.
Antenna ports - number of bits determined by the following
2 bits as defined by Tables 7.3.1.1.2-6, if transform precoder is enabled, dmrs-
Type = 1, and maxLength = 1;
4 bits as defined by Tables 7.3.1.1.2-7, if transform precoder is enabled, dmrs-
Type = 1, and maxLength = 2;
3 bits as defined by Tables 7.3.1.1.2-8/9/10/11, if transform precoder is
disabled, dmrs-Type = 1, and maxLength = 1, and the value of rank is
determined according to the SRS resource indicator field if the higher layer
parameter txConfig = nonCodebook and according to the Precoding TABLE 5-continued information and number of layers field if the higher layer parameter txConfig = codebook;
4 bits as defined by Tables 7.3.1.1.2-12/13/14/15, if transform precoder is disabled, dmrs-Type = 1, and maxLength = 2, and the value of rank is determined according to the SRS resource indicator field if the higher layer parameter txConfig = nonCodebook and according to the Precoding information and number of layers field if the higher layer parameter txConfig = codebook;
4 bits as defined by Tables 7.3.1.1.2-16/17/18/19, if transform precoder is disabled, dmrs-Type = 2, and maxLength = 1, and the value of rank is determined according to the SRS resource indicator field if the higher layer parameter txConfig = nonCodebook and according to the Precoding information and number of layers field if the higher layer parameter txConfig = codebook;
5 bits as defined by Tables 7.3.1.1.2-20/21/22/23, if transform precoder is disabled, dmrs-Type = 2, and maxLength = 2, and the value of rank is determined according to the SRS resource indicator field if the higher layer parameter txConfig = nonCodebook and according to the Precoding information and number of layers field if the higher layer parameter txConfig = codebook.
where the number of CDM groups without data of values 1, 2, and 3 in Tables 7.3.1.1.2-6 to 7.3.1.1.2-23 refers to CDM groups {0}, {0,1}, and {0, 1,2} respectively.
If a UE is configured with both dmrs-UplinkForPUSCH-MappingTypeA and dmrs-UplinkForPUSCH-MappingTypeB, the bitwidth of this field equals max{$x_A$, $x_B$}, where $x_A$ is the "Antenna ports" bitwidth derived according to dmrs-UplinkForPUSCH-MappingTypeA and XB is the "Antenna ports" bitwidth derived according to dmrs-UplinkForPUSCH-MappingTypeB. A number of $|x_A - x_B|$ zeros are padded in the MSB of this field, if the mapping type of the PUSCH corresponds to the smaller value of $x_A$ and $x_B$.
SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
CSI request - 0, 1, 2, 3, 4, 5, or 6 bits determined by higher layer parameter reportTriggerSize.
CBG transmission information (CBGTI) - 0 bit if higher layer parameter codeBlockGroupTransmission for PDSCH is not configured, otherwise, 2, 4, 6, or 8 bits determined by higher layer parameter maxCodeBlockGroupsPerTransportBlock for PUSCH.
PTRS-DMRS association - number of bits determined as follows
0 bit if PTRS-UplinkConfig is not configured and transform precoder is disabled, or if transform precoder is enabled, or if maxRank = 1;
2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field.
If "Bandwidth part indicator" field indicates a bandwidth part other than the active bandwidth part and the "PTRS-DMRS association" field is present for the indicated bandwidth part but not present for the active bandwidth part, the UE assumes the "PTRS-DMRS association" field is not present for the indicated bandwidth part.
beta offset indicator - 0 if the higher layer parameter betaOffsets = semiStatic; otherwise 2 bits as defined by Table 9.3-3 in [5, TS 38.213].
DMRS sequence initialization - 0 bit if transform precoder is enabled; 1 bit if transform precoder is disabled.
UL-SCH indicator - 1 bit. A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s).

DCI format 1_0 may be used for fallback DCI for scheduling a PDSCH in which case the CRC may be scrambled by a C-RNTI. DCI format 1_0 in which the CRC is scrambled by the C-RNTI may include, for example, information in Table 6 below.

TABLE 6

Identifier for DCI formats- 1 bits
    The value of this bit field is always set to 1, indicating a DL DCI format
Frequency domain resource assignment- $\lceil \log_2(N_{RB}^{DL,BWP}(N_{RB}^{DL,BWP}+1)/2) \rceil$ bits where $N_{RB}^{DL,BWP}$ is given by subclause 7.3.1.0

TABLE 6-continued

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:
    Random Access Preamble index- 6 bits according to ra-PreambleIndex in Subclause 5.1.2 of [8, TS38.321]
    UL/SUL indicator- 1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved
    SS/PBCH index- 6 bits. If the value of the "Random Access Preamble index" is not all zeros, this field indicates the SS/PBCH that shall be used to determine the RACK occasion for the PRACH transmission; otherwise, this field is reserved.
    PRACH Mask index- 4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved
    Reserved bits- 10 bits
Otherwise, all remaining fields are set as follows:
    Time domain resource assignment- 4 bits as defined in Subclause 5.1.2.1 of [6, TS 38.214]
    VRB-to-PRB mapping- 1 bit according to Table 7.3.1.2.2-5
    Modulation and coding scheme- 5 bits as defined in Subclause 5.1.3 of [6, TS 38.214]
    New data indicator- 1 bit
    Redundancy version- 2 bits as defined in Table 7.3.1.1.1-2
    HARQ process number- 4 bits
    Downlink assignment index- 2 bits as defined in Subclause 9.1.3 of [5, TS 38.213], as counter DAI
    TPC command for scheduled PUCCH- 2 bits as defined in Subclause 7.2.1 of [5, TS 38.213]
    PUCCH resource indicator- 3 bits as defined in Subclause 9.2.3 of [5, TS 38.213]
    PDSCH-to-HARQ_feedback timing indicator- 3 bits as defined in Subclause 9.2.3 of [5, TS38.213]

DCI format 1_1 may be used for non-fallback DCI for scheduling a PDSCH in which case the CRC may be scrambled by a C-RNTI. DCI format 11 in which the CRC is scrambled by the C-RNTI may include, for example, information in Table 7 below.

TABLE 7

Identifier for DCI formats - 1 bits
    The value of this bit field is always set to 1, indicating a DL DCI format
Carrier indicator - 0 or 3 bits as defined in Subclause 10.1 of [5, TS 38.213].
Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
    $n_{BWP} = n_{BWP,RRC} + 1$ if $nn_{BWP,RRC} \leq 3$, in which case the bandwidth part indicator is equivalent to the ascending order of the higher layer parameter BWP-Id;
    otherwise $n_{BWP} = n_{BWP,RRC}$, in which case the bandwidth part indicator is defined in Table 7.3.1.1.2-1;
If a UE does not support active BWP change via DCI, the UE ignores this bit field.
Frequency domain resource assignment- number of bits determined by the following, where $N_{RB}^{DL,BWP}$ is the size of the active DL bandwidth part:
    $N_{RBG}$ bits if only resource allocation type 0 is configured, where $N_{RBG}$ is defined in Subclause 5.1.2.2.1 of [6, TS38.214],
    $\lceil \log_2(N_{RB}^{DL,BWP} (N_{RB}^{DL,BWP} + 1)/2) \rceil$ bits if only resource allocation type 1 is configured, or
    max ($\lceil \log_2(N_{RB}^{DL,BWP} (N_{RB}^{DL,BWP} + 1)/2), N \rceil$)+ 1 bits if both resource allocation type 0 and 1 are configured.
    If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
    For resource allocation type 0, the $N_{RBG}$ LSBs provide the resource allocation as defined in Subclause 5.1.2.2.1 of [6, TS 38.214].
    For resource allocation type 1, the $\lceil \log_2(N_{RB}^{DL,BWP} (N_{RB}^{DL,BWP} + 1)/2) \rceil$ LSBs provide the resource allocation as defined in Subclause 5.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits,

TABLE 7-continued where I is the number of entries in the higher layer parameter pdsch-TimeDomainAllocationList if the higher layer parameter is configured; otherwise I is the number of entries in the default table.

VRB-to-PRB mapping - 0 or 1 bit:
    0 bit if only resource allocation type 0 is configured or if interleaved VRB-to-PRB mapping is not configured by high layers;
    1 bit according to Table 7.3.1.2.2-5 otherwise, only applicable to resource allocation type 1, as defined in Subclause 7.3.1.6 of [4, TS 38.211].

PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].

Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.

ZP CSI-RS trigger - 0, 1, or 2 bits as defined in Subclause 5.1.4.2 of [6, TS 38.214]. The bitwidth for this field is determined as $\lceil \log_2 (n_{ZP} + 1) \rceil$ bits, where $n_{ZP}$ is the number of aperiodic ZP CSI-RS resource sets configured by higher layer.

For transport block 1:
    Modulation and coding scheme- 5 bits as defined in Subclause 5.1.3.1 of [6, TS 38.214]
    New data indicator - 1 bit.
    Redundancy version - 2 bits as defined in Table 7.3.1.1.1-2

For transport block 2 (only present if maxNrofCodeWordsScheduledByDCI equals 2):
    Modulation and coding scheme - 5 bits as defined in Subclause 5.1.3.1 of [6, TS 38.214]
    New data indicator - 1 bit.
    Redundancy version - 2 bits as defined in Table 7.3.1.1.1-2

If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part HARQ process number - 4 bits Downlink assignment index- number of bits as defined in the following
    4 bits if more than one serving cell are configured in the DL and the higher layer parameter pdsch-HARQ-ACK-Codebook = dynamic, where the 2 MSB bits are the counter DAI and the 2 LSB bits are the total DAI;
    2 bits if only one serving cell is configured in the DL and the higher layer parameter pdsch-HARQ-ACK-Codebook = dynamic, where the 2 bits are the counter DAI;
    0 bits otherwise.

TPC command for scheduled PUCCH - 2 bits as defined in Subclause 7.2.1 of [5, TS 38.213]

PUCCH resource indicator - 3 bits as defined in Subclause 9.2.3 of [5, TS 38.213]

PDSCH-to-HARQ_feedback timing indicator - 0, 1, 2, or 3 bits as defined in Subclause 9.2.3 of [5, TS 38.213]. The bitwidth for this field is determined as $\lceil \log_2(I) \rceil$ bits, where I is the number of entries in the higher layer parameter dl-DataToUL-ACK.

Antenna port(s) - 4, 5, or 6 bits as defined by Tables 7.3.1.2.2-1/2/3/4, where the number of CDM groups without data of values 1, 2, and 3 refers to CDM groups $\{0\}$, $\{0, 1\}$, and $\{0, 1, 2\}$ respectively. The antenna ports $\{p_0, \ldots, p_{v-1}\}$ shall be determined according to the ordering of DMRS port(s) given by Tables 7.3.1.2.2-1/2/3/4.

If a UE is configured with both dmrs-DownlinkForPDSCH-MappingTypeA and dmrs-DownlinkForPDSCH-MappingTypeB, the bitwidth of this field equals $\max(x_A, x_B)$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.

Transmission configuration indication- 0 bit if higher layer parameter tci-PresentInDCI is not enabled; otherwise 3 bits as defined in Subclause 5.1.5 of [6, TS38.214].

If "Bandwidth part indicator" field indicates a bandwidth part other than the active bandwidth part,
    if the higher layer parameter tci-PresentInDCI is not enabled for the CORESET used for the PDCCH carrying the DCI format 1_1,
        the UE assumes tci-PresentInDCI is not enabled for all CORESETs in the indicated bandwidth part;

TABLE 7-continued otherwise,
the UE assumes tci-PresentInDCI is enabled for all CORESETs in the
indicated bandwidth part.
SRS request - 2 bits as defined by Table 7.3.1.1.2-24 for UEs not configured with
supplementaryUplink in ServingCellConfig in the cell; 3 bits for UEs configured
with supplementaryUplink in ServingCellConfig in the cell where the first bit is the
non-SUL/SUL indicator as defined in Table 7.3.1.1.1-1 and the second and third bits
are defined by Table 7.3.1.1.2-24. This bit field may also indicate the associated
CSI-RS according to Subclause 6.1.1.2 of [6, TS 38.214].
CBG transmission information (CBGTI) - 0 bit if higher layer parameter
codeBlockGroupTransmission for PDSCH is not configured, otherwise, 2, 4, 6, or 8
bits as defined in Subclause 5.1.7 of [6, TS38.214], determined by the higher layer
parameters maxCodeBlockGroupsPerTransportBlock and
maxNrofCodeWordsScheduledByDCI for the PDSCH.
CBG flushing out information (CBGFI) - 1 bit if higher layer parameter
codeBlockGroupFlushIndicator is configured as "TRUE", 0 bit otherwise.
DMRS sequence initialization - 1 bit.

Hereinafter, a method of allocating time domain resources for a data channel in a 5G communication system is described.

The BS may configure a table for time domain resource allocation information for a downlink data channel (Physical Downlink Shared Channel (PDSCH)) and an uplink data channel (Physical Uplink Shared Channel (PUSCH)) in the terminal through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include, for example, PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), a location (S) and a length (L) of a start symbol in which a PDSCH or a PUSCH is scheduled within the slot, a mapping type of a PDSCH or a PUSCH, and the like. For example, information shown in Table 8 and Table 9 below may be notified to the terminal by the BS.

TABLE 8

PDSCH-TimeDomainResourceAllocationList information element

PDSCH-TimeDomainReSourceAllocationList ::= SEQUENCE (SIZE(1..maxNrofDL-
Allocations)) OF PDSCH-TimeDomainResourceAllocation
PDSCH-TimeDomainResourceAllocation ::=    SEQUENCE {
    k0                                    INTEGER(0..32)
OPTIONAL,   -- Need S
        (PDCCH-to-PDSCH timing, slot unit)
    mappingType                           ENUMERATED {typeA, typeB},
        (PDSCH mapping type)
    startSymbolAndLength                  INTEGER (0..127)
    (start symbol and length of PDSCH)
}

TABLE 9

PUSCH-TImeDomaInResourceAllocation information element

PUSCH-TimeDontainResourceAllocationList ::= SEQUENCE (SIZE(1..maxNrofUL-
Allocations)) OF PUSCH-TimeDomainResourceAllocation
PUSCH-TimeDamainResourceAllocation ::=    SEQUENCE {
    k2                                    INTEGER(0..32)   OPTIONAL,
-- Need S
        (PDCCH-to-PUSCH timing, slot unit)
    mappingType                           ENUMERATED {typeA, typeB},
        (PUSCH mapping type)
    star tSymbolAndLength                 INTEGER (0..127)
        (start symbol and length of PUSCH)
}

The BS may inform the terminal of one of the entries in the table for the time domain resource allocation information through L1 signaling (for example, DCI) (for example, through a 'time domain resource allocation' filed within DCI). The terminal may acquire time domain resource allocation information for a PDSCH or a PUSCH on the basis of the DCI received from the BS.

Hereinafter, a method of allocating frequency domain resources for a data channel in a 5G communication system.

In 5G, two types, such as resource allocation type 0 and resource allocation type 1, are supported as a method of indicating frequency domain resource allocation information for a downlink data channel (Physical Downlink Shared Channel (PDSCH) and an uplink data channel (Physical Uplink Shared Channel (PUSCH)).

Resource Allocation Type 0

The BS may inform the terminal of RB allocation information in the form of a bitmap for a Resource Block Group (RBG). At this time, the RBG may include a set of successive Virtual RBs (VRBs), and the size P of the RBG may be determined on the basis of a value configured as a higher-layer parameter (rbg-Size) and a value of the size of a BWP defined in Table 10 below.

TABLE 10

Nominal RBG size P

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

A total number $N_{RBG}$ of RBGs of a BWP i having the size of $N_{BWP,i}^{size}$ may be defined as below.

$N_{RBG} = \lceil (N_{BWP,i}^{size} + (N_{BWP,i}^{start} \bmod P))/P \rceil$, where the size of the first RBG is $RBG_0^{size} = P - N_{BWP,i}^{start} \bmod P$,
the size of last RBG is RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$ and P otherwise,
the size of all other RBGs is P.

$N_{RBG}$ bits in a bitmap having the bit size of may correspond to respective RBGs. Indexes may be assigned to the RBGs in the order of increasing frequencies from the lowest frequency. For $N_{RBG}$ RBGs within the BWP, RBGs from RBG #0 to RBG #($N_{RBG}$−1) may be mapped to bits from the MSB to the LSB in the RBG bitmap. When a specific bit value within the bitmap is 1, the terminal may determine that an RBG corresponding to the corresponding bit value is allocated. When a specific bit value within the bitmap is 0, the terminal may determine that an RBG corresponding to the corresponding bit value is not allocated. <0}

Resource Allocation Type 1

The BS may inform the terminal of the RB allocation information through information on a start location and a length of successively allocated VRBs. At this time, interleaving or non-interleaving may be additionally applied to the successively allocated VRBs. A resource allocation field of resource allocation type 1 may include a Resource Indication Value (RIV), and the RIV may include a start point $RB_{start}$ of the VRB and a length $L_{RBs}$ of successively allocated RBs. More specifically, the RIV within the BWP having the size of $N_{BWP}^{size}$ may be defined as below.

if $(L_{RBs} - 1) \leq \lfloor N_{BWP}^{size}/2 \rfloor$ then $RIV = N_{BWP}^{size}(L_{RBs} - 1) + RB_{start}$ else $RIV = N_{BWP}^{size}(N_{BWP}^{size} - L_{RBs} + 1) + (N_{BWP}^{size} - 1 - RB_{start})$ where $L_{PBs} \geq 1$ and shall not exceed $N_{BWP}^{size} - RB_{start}$.

The BS may configure a resource allocation type in the terminal through higher-layer signaling (for example, a higher-layer parameter resourceAllocation may be configured as one value among resourceAllocationType0, resourceAllocationType1, or dynamicSwitch). If the terminal receives a configuration of both resource allocation types 0 and 1 (or if the higher-layer parameter resourceAllocation is configured as dynamicSwitch), it may indicate whether a Most Significant Bit (MSB) of a field indicating resource allocation within a DCI format indicating scheduling is resource allocation type 0 or resource allocation type 1, resource allocation information may be indicated through the remaining bits except for a bit corresponding to the MSB on the basis of the indicated resource allocation type, and the terminal may analyze resource allocation field information of the DCI field on the basis thereof. If the terminal receives a configuration of one of resource allocation type 0 or resource allocation type 1 (or if the higher-layer parameter resourceAllocation is configured as one value among resourceAllocationType0 or resourceAllocationType1), resources allocation information may be indicated on the basis of a field indicating resource allocation within a DCI format indicating scheduling and the terminal may analyze resource allocation field information of a DCI field on the basis of thereof.

Hereinafter, the downlink control channel in the 5G communication system will be described in more detail with reference to the drawings.

Figure 8:
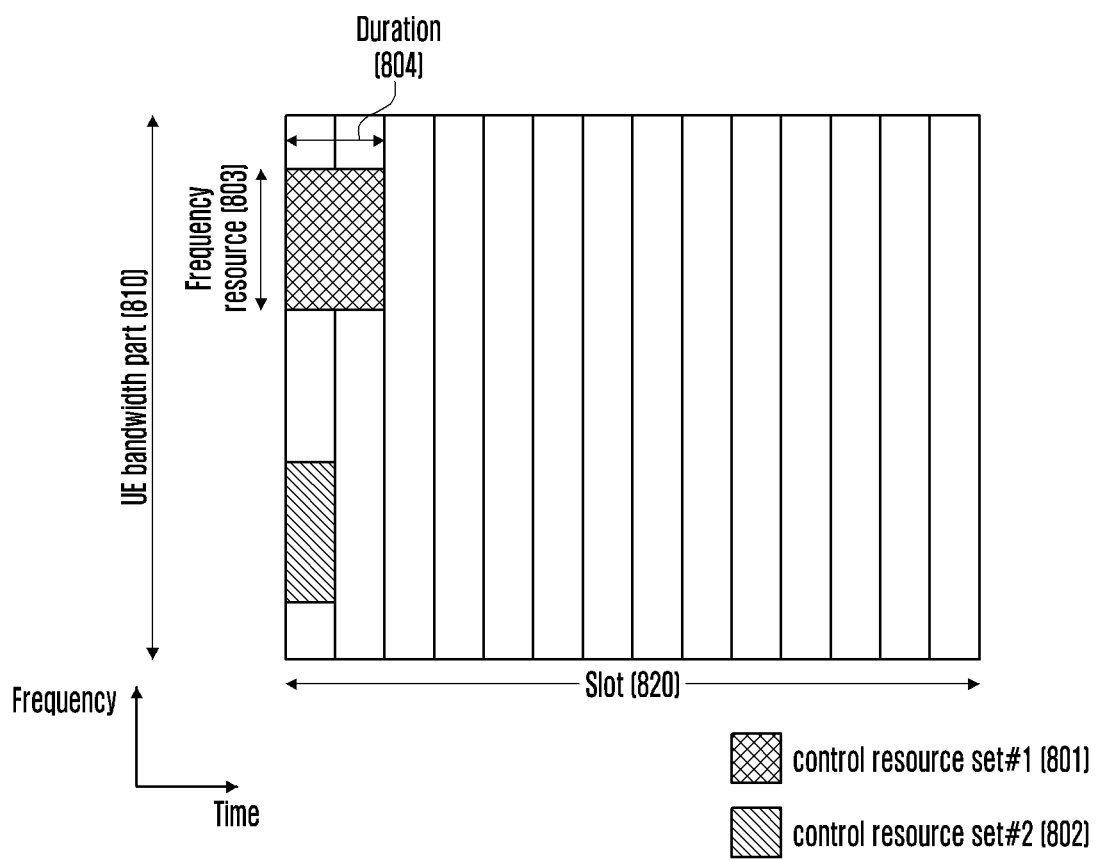
FIG. 8 illustrates an example of the structure of a CORE-SET in a wireless communication system according to an embodiment of the disclosure.

FIG. 8 illustrates a structure of a control resource set in a wireless communication system according to an embodiment of the disclosure.

Specifically, FIG. 8 illustrates an example of a Control Resource Set (CORESET) in which a downlink control channel is transmitted in the 5G wireless communication system. FIG. 8 illustrates an example in which a BWP of the UE (UE bandwidth part) 810 is configured in a frequency axis and two CORESETs (CORESET #1 801 and CORESET #2 802) are configured within one slot 820 in a time axis. The CORESETs 801 and 802 may be configured in specific frequency resources 803 within the entire UE BWP 810 on the frequency axis. The CORESETs may be configured as one or a plurality of OFDM symbols in the time axis, which may be defined as a control resource set duration 804.

Referring to FIG. 8, CORESET #1 801 may be configured as a CORESET duration of two symbols, and CORESET #2 802 may be configured as a CORESET duration of one symbol.

The CORESET in 5G may be configured in the terminal by the BS through higher-layer signaling (for example, system information, a Master Information Block (MIB), or Radio Resource Control (RRC) signaling). Configuring the CORESET in the terminal may mean providing information such as an identity of the CORESET, a frequency location of the CORESET, a symbol length of the CORESET, and the like. For example, information in [Table 11] below may be included.

TABLE 11

```
ControlResourceSet ::=                                          SEQUENCE {
            -- Corresponds to L1 parameter 'CORESET-ID'
            controlResourceSetId
            ControlResourceSetId,
        (Control Resource Set Identity))
            frequencyDomainResources              BIT STRING (SIZE (45)),
        (Frequency domain resources allocation information)
            duration                              INTEGER
    (1..maxCoReSetDaration),
        (Time domain resources allocation information)
            cce-REG-MappingType                   CHOICE {
        (CCE-to-REG mapping type)
                interleaved
            SEQUENCE {
                        reg-BundleSize
                ENUMERATED {n2, n3, n6},
                    (REG bundle size)
                        precoderGranularity
                ENUMERATED {sameAsREG-bundle, allContiguousRBs},
                        interleaverSize
                ENUMERATED {n2, n3, n6}
                            (interleaver size)
                        shiftIndex
                INTEGER(0..maxNrofPhysicalResourceBlocks-1)
                                    OPTIONAL
                    (interleaver shift)
        },
            nonInterleaved                        NULL
        },
        tci-StatesPDCCH
        SEQUENCE(SIZE (1..maxNrofTCI-StatesPDCCH)) OF TCI-StateId
                    OPTIONAL,
    (QCL configuration information)
            tci-PresentInDCI                      ENUMERATED
{enabled}
                        OPTIONAL, -- Need S
}
```

In Table 11, tci-StatesPDCCH (simply, referred to as a Transmission Configuration Indication (TCI) state) configuration information may include information on one or a plurality of Synchronization Signal (SS)/Physical Broadcast Channel (PBCH) block indexes or Channel State Information Reference Signal (CSI-RS) indexes having the Quasi Co-Located (QCL) relationship with a Demodulation Reference Signal (DMRS) transmitted in the corresponding CORESET.

Figure 9:
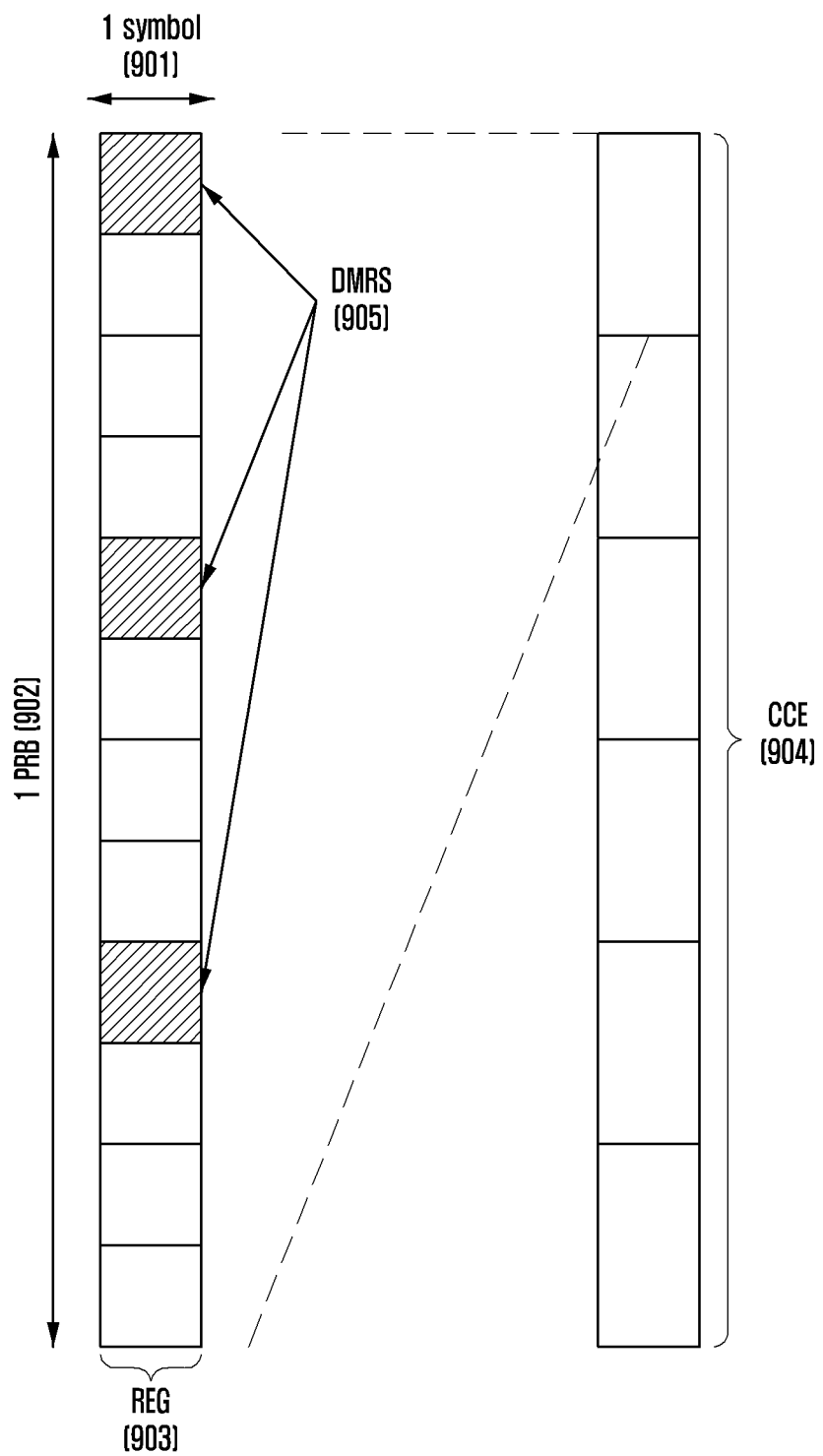
FIG. 9 illustrates an example of a time and frequency resource unit included in a downlink control channel in a wireless communication system according to an embodiment of the disclosure.

FIG. 9 illustrates a structure of resources in a wireless communication system according to an embodiment of the disclosure.

Specifically, FIG. 9 illustrates an example of a basic unit of time and frequency resources included in a downlink control channel which can be used in 5G.

Referring to FIG. 9, a basic unit of time and frequency resources included in a control channel may be a Resource Element Group (REG) 903, and the REG 903 may be defined as one OFDM symbol 901 in a time axis and one Physical Resource Block (PRB) 902 in a frequency axis, that is, as 12 subcarriers. The BS may configure a downlink control channel allocation unit by concatenating the REGs 903.

Referring to FIG. 9, when a basic unit of allocation of the downlink control channel in 5G is a Control Channel Element (CCE) 904, one CCE 904 may include a plurality of REGs 903. For example, the REG 903 illustrated in FIG. 9 may include 12 REs and, when 1 CCE 904 includes 6 REGs 903, 1 CCE 904 may include 72 REs. When a downlink CORESET is configured, the corresponding area may include a plurality of CCEs 904, and a specific downlink control channel may be mapped to one or a plurality of CCEs 904 according to an Aggregation Level (AL) within the CORESET and then transmitted. The CCEs 904 within the CORESET may be distinguished by numbers, and at this time, the numbers of the CCEs 904 may be assigned according to a logical mapping scheme.

Referring to FIG. 9, the basic unit of the downlink control channel, that is, the REG 903, may include all REs to which the DCI is mapped and the region to which a DMRS 905, which is a reference signal for decoding the REs, is mapped. As illustrated in FIG. 9, 3 DMRSs 905 may be transmitted within 1 REG 903. The number of CCEs required to transmit the PDCCH may be 1, 2, 4, 8, or 16 according to the Aggregation Level (AL), and the different number of CCEs may be used to implement link adaptation of the downlink control channel. For example, if AL=L, one downlink control channel may be transmitted through L CCEs. The terminal is required to detect a signal in the state in which the terminal is not aware of information on the downlink control channel, and a search space indicating a set of CCEs may be used to assist such a blind decoding. The search space is a set of downlink control channel candidates including CCEs for which the terminal should attempt decoding at the given aggregation level, and there are several aggregation levels at which one set of CCEs is configured by 1, 2, 4, 8, and 16 CCEs, so that the terminal has a plurality of search spaces. The search space set may be defined as a set of search spaces at all configured aggregation levels.

The search spaces may be classified into a common search space and a terminal (UE)-specific search space. UEs in a predetermined group or all UEs may search for a common search space of the PDCCH in order to receive cell-common control information such as dynamic scheduling for system information or paging messages. For example, PDSCH scheduling allocation information for transmission of an SIB including information on a service provider of a cell may be received by searching for a common-search space of the PDCCH. In the case of the common-search space, terminals in a predetermined group or all terminals should receive the PDCCH, so that the common-search space may be defined as a set of pre-arranged CCEs. Scheduling allocation information for the terminal-specific PDSCH or PUSCH may be received by searching for a terminal-specific search space of the PDCCH. The terminal-specific search space may be terminal-specifically defined as a terminal identity and a function of various system parameters.

In 5G, parameters for the PDCCH search space may be configured in the terminal by the BS through higher-layer signaling (for example, SIB, MIB, or RRC signaling). For example, the BS may configure, in the terminal, the number of PDCCH candidates at each aggregation level L, a monitoring period of the search space, a monitoring occasion in units of symbols within the slot for the search space, a search space type, that is, a common-search space or a terminal-specific search space, a combination of a DCI format and an RNTI to be monitored in the corresponding search space, and a control resource set index for monitoring the search space. For example, the parameter of the search space for the PDCCH may include information in Table 12 below.

TABLE 12

```
SearchSpace ::=                                                    SEQUENCE {
                    -- Identity of the search space. SearchSpaceId = 0 identifies the
SearchSpace configured via PBCH (MIB) or ServingCellConfigCommon.
                    searchSpaceId                                  SearchSpaceId,
               (search space ID)
                    controlResourceSetId
                    ControlResourceSetId,
               (control resource set ID)
                    monitoringSlotPeriodicityAndOffset             CHOICE {
               (monitoring slot periodicity and offset)
                         sl1
                    NULL,
                         sl2
                    INTEGER (0..1),
                         sl4
                    INTEGER (0..3),
                         sl5
                    INTEGER (0..4),
                         sl8
                    INTEGER (0..7),
                         sl₁5
                    INTEGER (0..9),
                         sl₁6
                    INTEGER (0..15),
                         sl₂0
                    INTEGER (0..19)
                    }
                                                OPTIONAL,
                    duration(monitoring length)                    INTEGER {2..2559}
                    monitoringSymbolsWithinSlot                    BIT STRING
      (SIZE (14))
                                                OPTIONAL,
               (monitoring symbols within slot)
                    nrofCandidates                                 SEQUENCE {
               (number of PDCCH candidates per aggregation level)
                         aggregationLevel1                         ENUMERATED
      {n0, n1, n2, n3, n4, n5, n6, n8},
                         aggregationLevel2                         ENUMERATED
      {n0, n1, n2, n3, n4, n5, n6, n8},
                         aggregationlevel4                         ENUMERATED
      {n0, n1, n2, n3, n4, n5, n6, n8},
                         aggregationlevel8                         ENUMERATED
      {n0, n1, n2, n3, n4, n5, n6, n8},
                         aggregationlevel16                        ENUMERATED
      {n0, n1, n2, n3, n4, n5, n6, n8}
                    },
                    searchSpaceType                                CHOICE {
                    (search space type)
                              -- Configures this search space as common search space (CSS) and
DCI formats to monitor.
                         common
                    SEQUENCE {
                         (common search space)
                    }
                         ue-Specific
                    SEQUENCE {
                         (UE-specific search space)
                              -- Indicates whether the UE monitors in this USS for DCI
```

TABLE 12-continued

```
formats 0-0 and 1-0 or for formats 0-1 and 1-1.
                  formats
                      ENUMERATED {formats0-0-And-1-0, formats0-1-And-1-1},
                      ...
                  }
```

The BS may configure one or a plurality of search space sets in the terminal according to configuration information. According to an embodiment, the BS may configure search space set 1 and search space 2 in the terminal, and the configuration may be performed such that DCI format A scrambled by an X-RNTI in search space set 1 is monitored in the common-search space and DCI format B scrambled by a Y-RNTI in search space set 2 is monitored in the terminal-specific search space.

According to configuration information, one or a plurality of search space sets may exist in the common search space or the terminal-specific search space. For example, search space set #1 and search space set #2 may be configured as common-search spaces, and search space set #3 and search space set #4 may configured as terminal-specific search spaces.

In the common-search space, the following combinations of DCI formats and RNTIs may be monitored. Of course, various embodiments of the disclosure are not limited to the following examples.

DCI format 0_0/1_0 with CRC scrambled by C-RNTI, CS-RNTI, MCS-C-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the terminal-specific search space, the following combinations of DCI formats and RNTIs may be monitored. Of course, various embodiments of the disclosure are not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The described RNTIs may follow the following definition and use.

Cell RNTI (C-RNTI): used for terminal-specific PDSCH scheduling

Modulation Coding Scheme (MCS)C-RNTI (MCS-C-RNTI): used for terminal-specific PDSCH scheduling Temporary Cell RNTI (TC-RNTI): used for UE-specific PDSCH scheduling Configured Scheduling RNTI (CS-RNTI): used for semi-statically configured UE-specific PDSCH scheduling Random Access RNTI (RA-RNTI): used for PDSCH scheduling at random access stage Paging RNTI (P-RNTI): used for PDSCH scheduling through which paging is transmitted System Information RNTI (SI-RNTI): used for PDSCH scheduling through which system information is transmitted Interruption RNTI (INT-RNTI): used for indicating whether puncturing is performed for PDSCH Transmit Power Control for PUSCH RNTI (TPC-PUSCH-RNTI): used for indicating PUSCH power control command Transmit Power Control for PUCCH RNTI (TPC-PUCCH-RNTI): used for indicating PUCCH power control command Transmit Power Control for SRS RNTI (TPC-SRS-RNTI): used for indicating SRS power control command The DCI formats may follow the definition in Table 13 below.

TABLE 13

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a CORESET p and a search space at an aggregation level L in a search space set s may be expressed as shown in [Equation 1] below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{Equation 1}$$

L: aggregation level $n_{CI}$: carrier index $N_{CCE,p}$: total number of CCEs existing within CORESET p $n_{s,f}^\mu$: slot index $M_{p,s,max}^{(L)}$: number of PDCCH candidates at aggregation level L $m_{s,n_{CI}} = 0, \ldots, M_{p,s,max}^{(L)} - 1$: PDCCH candidate index at aggregation level L $i = 0, \ldots, L-1$ $Y_{p,n_{s,f}^\mu} = (A_p \cdot Y_{p,n_{s,f}^\mu - 1}) \bmod D$, $Y_{p,-1} = n_{RNTI} \neq 0$, $A_0 = 39822$, $A_1 = 39829$, $A_2 = 39839$, $D = 65537$ $n_{RNTI}$: terminal identifier A value of Y_(p,n$^\mu_{s,f}$) may correspond to 0 in the case of the common search space.

A value of Y_(p,n$^\mu_{s,f}$) may correspond to a value varying depending on a terminal identity (a C-RNTI or an ID configured in the terminal by the BS) and a time index in the case of the terminal-specific search space.

Figure 10:
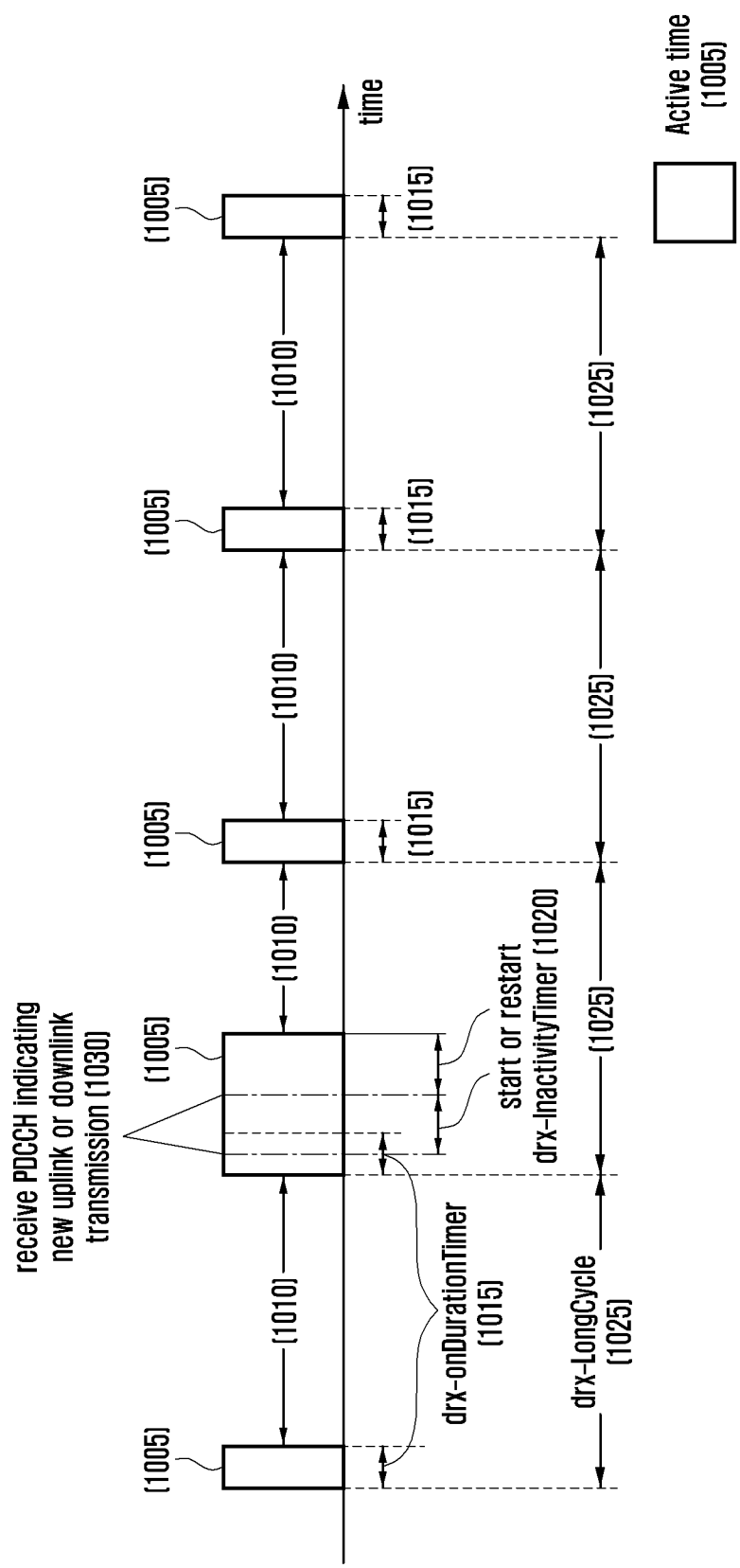
FIG. 10 illustrates an example of a Discontinuous Reception (DRX) operation in a wireless communication system according to an embodiment of the disclosure.

FIG. 10 illustrates a process of Discontinuous Reception (DRX) in a wireless communication system according to an embodiment of the disclosure. Specifically, FIG. 10 describes Discontinuous Reception (DRX).

Discontinuous Reception (DRX) is an operation in which the terminal using a service discontinuously receives data in an RRC-connected state in which a radio link is established between the BS and the terminal. When DRX is applied, the terminal may turn on a receiver at a specific time point and monitor a control channel, and when there is no data received for a predetermined period, turn off the receiver to reduce power consumption of the terminal. The DRX operation may be controlled by a MAC layer device on the basis of various parameters and a timer.

Referring to FIG. 10, an active time 1005 is a time during which a terminal wakes up every DRX cycle and monitor a PDCCH. The active time 1005 may be defined below.

drx-onDurationTimer, drx-InactivityTimer, drx-RetransmissionTimerDL, drx-RetransmissionTimerUL, or ra-ContentionResolutionTimer is running;

a scheduling request is sent on a PUCCH and is pending; or <0} a PDCCH indicating new transmission addressed to a C-RNTI of a MAC entity has not been received after successful reception of a random access response to a random access preamble that is not selected by the MAC entity among contention-based random access preambles drx-onDurationTimer, drx-InactivityTimer, drx-RetransmissionTimerDL, drx-RetransmissionTimerUL, ra-ContentionResolutionTimer, and the like are timers of which values are configured by the BS, and have functions configured to monitor a PDCCH by the terminal in the state in which a predetermined condition is satisfied.

The drx-onDurationTimer 1015 is a parameter for configuring a minimum time during which the terminal is awake in a DRX cycle. The drx-InactivityTimer 1020 is a parameter for configuring a time during which the terminal is additionally awake when a PDCCH indicating new uplink transmission or downlink transmission is received as indicated by reference numeral 1030. The drx-RetransmissionTimerDL is a parameter for configuring a maximum time during which the terminal is awake in order to receive downlink retransmission in a downlink HARQ procedure. The drx-RetransmissionTimerUL is a parameter for configuring a maximum time during which the terminal is awake in order to receive a grant of uplink retransmission in an uplink HARQ procedure. The drx-onDurationTimer, drx-InactivityTimer, drx-RetransmissionTimerDL, and drx-RetransmissionTimerUL may be configured as, for example, a time, the number of subframe, the number of slots, and the like. The ra-ContentionResolutionTimer is a parameter for monitoring a PDCCH in a random access procedure.

An inactive time 1010 is a time in which no PDCCH monitoring is performed or a time in which no PDCCH reception is performed during the DRX operation, and the remaining time except for the active time 1005 in the entire time in which the DRX operation is performed may be the inactive time 1010. When the PDCCH is not monitored during the active time 1005, the terminal may enter the sleep or inactive state and reduce power consumption.

The DRX cycle refers to a cycle on which the terminal wakes up and monitors a PDCCH. That is, the DRX cycle is a time interval or a cycle of on duration from monitoring of the PDCCH to monitoring of the next PDCCH by the terminal. The DRX cycle includes two types, such as a short DRX cycle and a long DRX cycle. The short DRX cycle may be optionally applied.

The long DRX cycle 1025 is a longer DRX cycle among two DRX cycles configured in the terminal. The terminal starts the drx-onDurationTimer 1015 at a time point at which the long DRX cycle 1025 passes after a start point (for example, a start symbol) of the drx-onDurationTimer 1015 during the long DRX cycle. In the case of the long DRX cycle 1025, the terminal may start the drx-onDurationTimer 1015 in a slot after drx-SlotOffset in a subframe that satisfies [Equation 2] below. Here, drx-SlotOffset is a delay before the drx-onDurationTimer 1015 starts. The drx-SlotOffset may be configured as, for example, a time, the number of slots, or the like.

$$[(SFN\times 10)+\text{subframe number}] \bmod(drx\text{-LongCycle})=drx\text{-StartOffset} \quad \text{Equation 2}$$

At this time, a drx-LongCycleStartOffset may include the long DRX cycle 1025 and a drx-StartOffset, and may be used to define a subframe for starting the long DRX cycle 1025. The drx-LongCycleStartOffset may be configured as, for example, a time, the number of subframes, the number of slots, or the like.

The short DRX cycle is a shorter DRX cycle among two DRX cycles configured in the terminal. When the terminal operates on the long DRX cycle 1025 and then a predetermined event, for example, reception of a PDCCH indicating new uplink transmission or downlink transmission, is generated in the active time 1005, the terminal may start or restart the drx-InactivityTimer 1020 and, when the drx-InactivityTimer 1020 has expired or a DRX command MAC CE is received, operate on the short DRX cycle. For example, in FIG. 10, the terminal may start the drx-ShortCycleTimer at a time point at which the drx-onDurationTimer 1015 or the drx-InactivityTimer 1020 expires and operate on the short DRX cycle before the drx-ShortCycleTimer expires. When the terminal receives the PDCCH indicating new uplink transmission or downlink transmission as indicated by reference numeral 1030, the terminal may expect additional uplink transmission or downlink transmission in the future and extend the active time 1005 or delay the advent of the inactive time 1010. The terminal starts the drx-onDurationTimer 1015 again at a time point at which the short DRX cycle passes from a start point of previous on duration during the short DRX cycle. Thereafter, when the drx-ShortCycleTimer has expired, the terminal operates on the long DRX cycle 1025 again.

In the case of the short DRX cycle, the terminal may start the drx-onDurationTimer 1015 after the drx-SlotOffset in a subframe that satisfies [Equation 3] below. Here, the drx-SlotOffset is a delay before the drx-onDurationTimer 1015 starts. The drx-SlotOffset may be configured as, for example, a time, the number of slots, or the like.

$$[(SFN\times 10)+\text{subframe number}] \bmod(drx\text{-ShortCycle})=(drx\text{-StartOffset})\bmod(drx\text{-ShortCycle}) \quad \text{Equation 3}$$

In Equation 3, drx-ShortCycle and drx-StartOffset may be used to define a subframe to start a short DRX cycle. The drx-ShortCycle and the drx-StartOffset may be configured as, for example, a time, the number of subframes, the number of slots, or the like.

The DRX operation has been described above with reference to FIG. 10. According to an embodiment, the terminal may reduce power consumption of the terminal by performing the DRX operation. However, even though the terminal performs the DRX operation, the terminal does not always receive a PDCCH related to the terminal in the active time 1005. Accordingly, an embodiment of the disclosure may provide a signal for controlling the terminal operation in order to more efficiently save power of the terminal.

Hereinafter, carrier aggregation and a scheduling method in a 5G communication system are described in detail.

The terminal may access a primary cell through initial access, and the BS may additionally configure one or a plurality of secondary cells in the terminal. The terminal may perform communication through a serving cell including the primary cell and the secondary cells configured by the BS.

The BS may additionally configure whether to perform cross-carrier scheduling for cells configured in the terminal. For convenience of description, when the cross-carrier scheduling is configured, a cell (that is, a cell receiving downlink control information corresponding to downlink allocation or uplink grant) performing the scheduling is referred to as a "first cells" and a cell (that is, a cell to which and from which downlink or uplink data is actually scheduled and transmitted and received on the basis of downlink control information) for which the scheduling is performed is referred to as a "second cell". If the terminal receives a configuration of cross-carrier scheduling for a specific cell A (scheduled cell) (at this time, the cell A corresponds to the "second cell"), the terminal may not perform PDCCH monitoring in the cell A but may perform the PDCCH monitoring in another cell B indicated by the cross-carrier scheduling, that is, a cell performing the scheduling (scheduling cell) (at this time, the cell B corresponds to the "first cell"). The BS may configure information on the "first cell" performing the scheduling for the "second cell" (for example, a cell index of the cell corresponding to the "first cell"), a value of a Carrier Indicator Field (CIF) for the "second cell", and the like in order to configure cross-carrier scheduling in the terminal. For example, the BS may inform the terminal of configuration information in [Table 14] below through higher-layer signaling (for example, RRC signaling).

TABLE 14

| | |
|---|---|
| CrossCarrierSchedulingConfig ::= | SEQUENCE { |
| schedulingCellInfo | CHOICE { |
| own (self carrier scheduling) | SEQUENCE { - |
| - No cross carrier scheduling | |
| cif-Presence | BOOLEAN |
| }, | |
| other (cross carrier scheduling) | SEQUENCE { - |
| - Cross carrier scheduling | |
| schedulingCellId | ServCellIndex, |
| (scheduling cell index) | |
| cif-InSchedulingCell | INTEGER (1..7) |
| (CIF value) | |
| } | |
| }, | |
| ... | |
| } | |

The terminal may monitor a PDCCH for a cell configured by cross-carrier scheduling in a cell corresponding to the "first cell". The terminal may determine an index of the cell scheduled by received DCI on the basis of the value of the carrier indicator field within a DCI format for scheduling data and may transmit and receive data in a cell indicated by the carrier indicator.

The scheduled cell (cell A) and the scheduling cell (cell B) may be configured by different numerologies. The numerology may include subcarrier spacing, a cyclic prefix, and the like. When numerologies of the cell A and the cell B are different, the following minimum scheduling offset may be further considered between a PDCCH and a PDSCH when the PDCCH of the cell B schedules the PDSCH of the cell A.

[Cross-Carrier Scheduling Method]
(1) When subcarrier spacing ($\mu B$) of the cell B is smaller than subcarrier spacing ($\mu A$) of the cell A, the PDSCH may be scheduled from the next PDSCH slot corresponding to a point after X symbols from the last symbol of the received PDCCH in the cell B. X may vary depending on $\mu B$, and may be defined such that X=4 symbols when $\mu B$=15 kHz, X=4 symbols when $\mu B$=30 kHz, and X=8 symbols when $\mu B$=60 kHz.

(2) When subcarrier spacing ($\mu B$) of the cell B is larger than subcarrier spacing ($\mu A$) of the cell A, the PDSCH may be scheduled from a time point corresponding to a point after X symbols from the last symbol of the received PDCCH in the cell B. X may vary depending on $\mu B$, and may be defined such that X=4 symbols when $\mu B$=30 kHz, X=8 symbols when $\mu B$=60 kHz, and X=12 symbols when $\mu B$=120 kHz.

Hereinafter, a method of configuring a Transmission Configuration Indication (TCI) state that is a means for indicating or exchanging Quasi Co-Location (QCL) information between the terminal and the BS in the 5G communication system is described in detail.

The BS may configure and indicate the TCI state between different two RSs or channels through appropriate signaling and inform on the QCL relation between the different RSs or channels. The QCL relation between different RSs or channels may mean that, when a channel is estimated through a reference RS antenna port A (reference RS #A) and another purpose RS antenna port B (target RS #B) which are QCLed, the terminal is allowed to apply some or all of large-scale channel parameters estimated in the antenna port A to channel measurement from the antenna port B. The QCL is required to correlate different parameters according to 1) time tracking influenced by an average delay and a delay spread, 2) frequency tracking influenced by a Doppler shift and a Doppler spread, 3) Radio Resource Management (RRM) influenced by an average gain, 4) Beam Management (BM) influenced by a spatial parameter, and the like. Accordingly, NR supports four types of QCL relations shown in Table 15 below.

TABLE 15

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters such as an Angle of Arrival (AoA), a Power Angular Spectrum (PAS) of AoA, an Angle of Departure (AoD), a PAS of AoD, a transmit/receive channel correlation, transmit/receive beamforming, a spatial channel correlation, and the like.

The QCL relation can be configured in the terminal through an RRC parameter TCI state and QCL information (QCL-Info) as shown in [Table 16] below. Referring to [Table 16] below, the BS may configure one or more TCI states in the terminal and inform the terminal of a maximum of two QCL relations (qcl-Type 1 and qcl-Type 2) for an RS referring to an ID of the TCI state, that is, a target RS. At this time, each piece of QCL information (QCL-Info) included in each TC state includes a serving cell index of a reference RS indicated by the corresponding QCL information, a BWP index, a type and an ID of a reference RX, and a QCL type shown in Table 15.

TABLE 16

```
TCI-State ::=                   SEQUENCE {
  tci-StateId                     TCI-StateId,
    (ID of the corresponding TCI state)
  qcl-Type1                       QCL-Info,
    (QCL information of the first reference RS of RS (target RS) referring
to the corresponding TCI state ID)
  qcl-Type2                       QCL-Info
         OPTIONAL,       -- Need R
    (QCL information of the second reference RS of the RS (target RS)
referring to the corresponding TCI state ID)
  ...
}
QCL-Info ::=                    SEQUENCE {
  cell                            ServCellIndex
         OPTIONAL,       -- Need R
    (the serving cell index of the reference RS indicated by the corresponding
QCL information)
  bwp-Id                          BWF-Id
         OPTIONAL, -- Cond CSI-RS-Indicated
    (BWP index of reference RS indicated by the corresponding QCL information)
  referenceSignal                 CHOICE {
     csi-rs                          NZP-CSI-RS-
ResourceId,
     ssb                             SSB-
Index
    (one of the CSI-RS ID or SSB ID indicated by the corresponding QCL
information)
  },
  qcl-Type                       ENUMERATED {typeA, typeB, typeC,
typeD},
  ...
}
```

Hereinafter, a paging method in the 5G communication system is described in detail.

Figure 11:
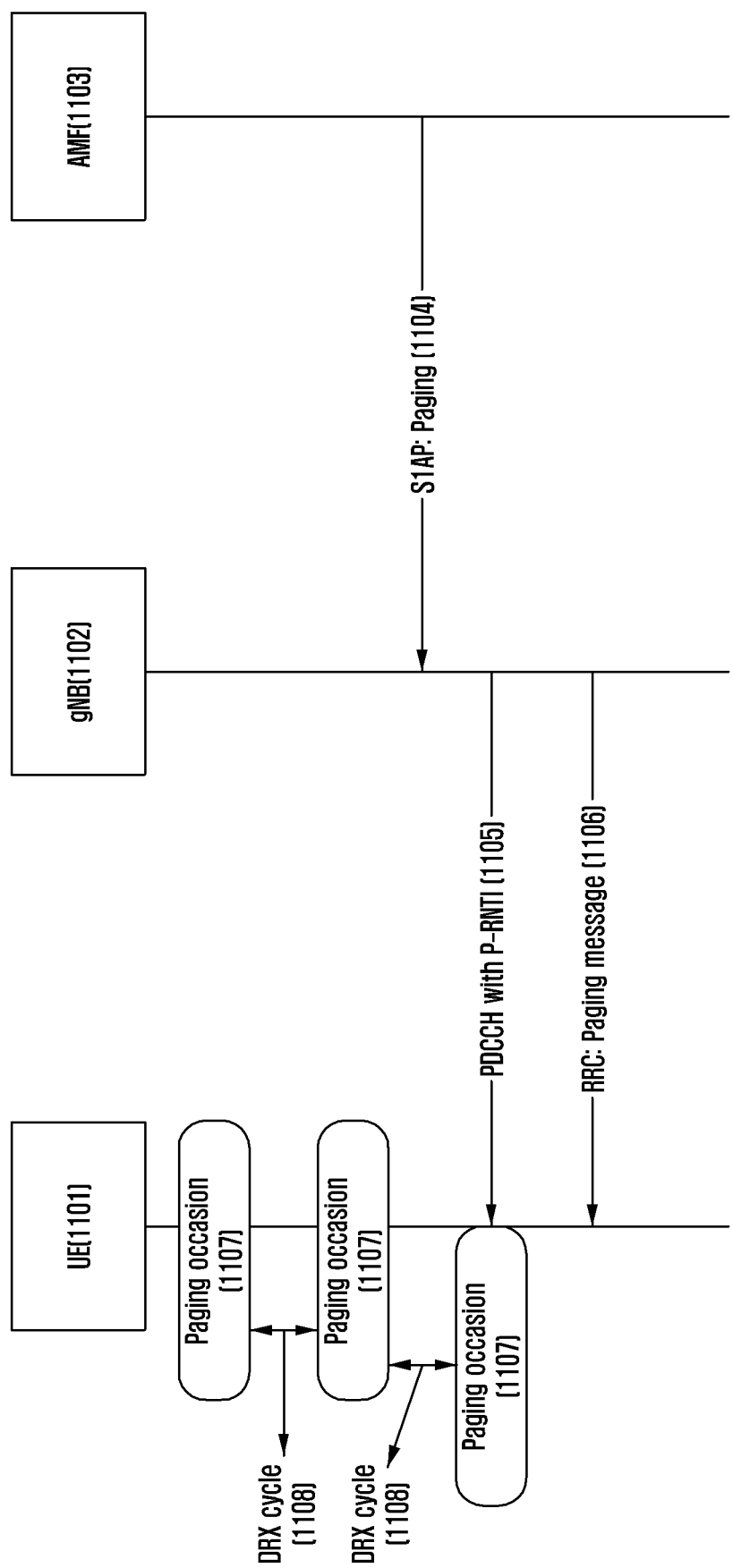
FIG. 11 illustrates an example of a paging operation performed in a wireless communication system according to an embodiment of the disclosure.

FIG. 11 illustrates a process of paging in a wireless communication system according to an embodiment of the disclosure. Specifically, FIG. 11 illustrates a paging procedure in the 5G communication system. The paging procedure may be used to inform of, when an incoming call to the terminal in an idle or inactive state is generated, the incoming call to start network access for terminals or inform terminals in a connected state that system information is changed. Paging may be controlled by a Mobility Management Entity (AMF) and a paging message may be transmitted over a plurality of cells within a Tracking Area (TA). Referring to FIG. 11, paging is started at an AMF 1103 and transmitted to a UE 1101 via a gNB 1102. More specifically, paging is started at the AMF 1103 and transmitted to the gNB 1102 through S1AP signaling 1104, and then transmitted to the UE 1101 through RRC signaling (e.g., paging message 1106). At this time, the UE 1101 may know whether there is a paging message by monitoring a PDCCH 1105 configured by a P-RNTI in a paging occasion 1107. The paging occasion 1107 may be determined on the basis of a DRX cycle 1108 which the gNB configures in the UE. The UE receiving the PDCCH 1105 configured by the P-RNTI may receive a PDSCH including the paging message 1106. The paging message 1106 may include UE ID information of the UE which the gNB desires to wake up. <0}

In an efficient paging procedure, the terminal (e.g., UE 1101) should have a rest without any reception operation in the most time and should be able to wake up for a little while during only a predetermined time interval in order to observe paging information from the network. To this end, in NR, a Paging Occasion (PO) and a Paging Frame (PF) are defined. The PO may be defined as a subframe or a time point in which there is a PDCCH configured by a P-RNTI for receiving a paging message. The PF may be defined as one radio frame including one or a plurality of Pos. Referring to FIG. 11, the UE 1101 may observe one PO per Discontinuous Reception (DRX) cycle 1108.

Figure 12:
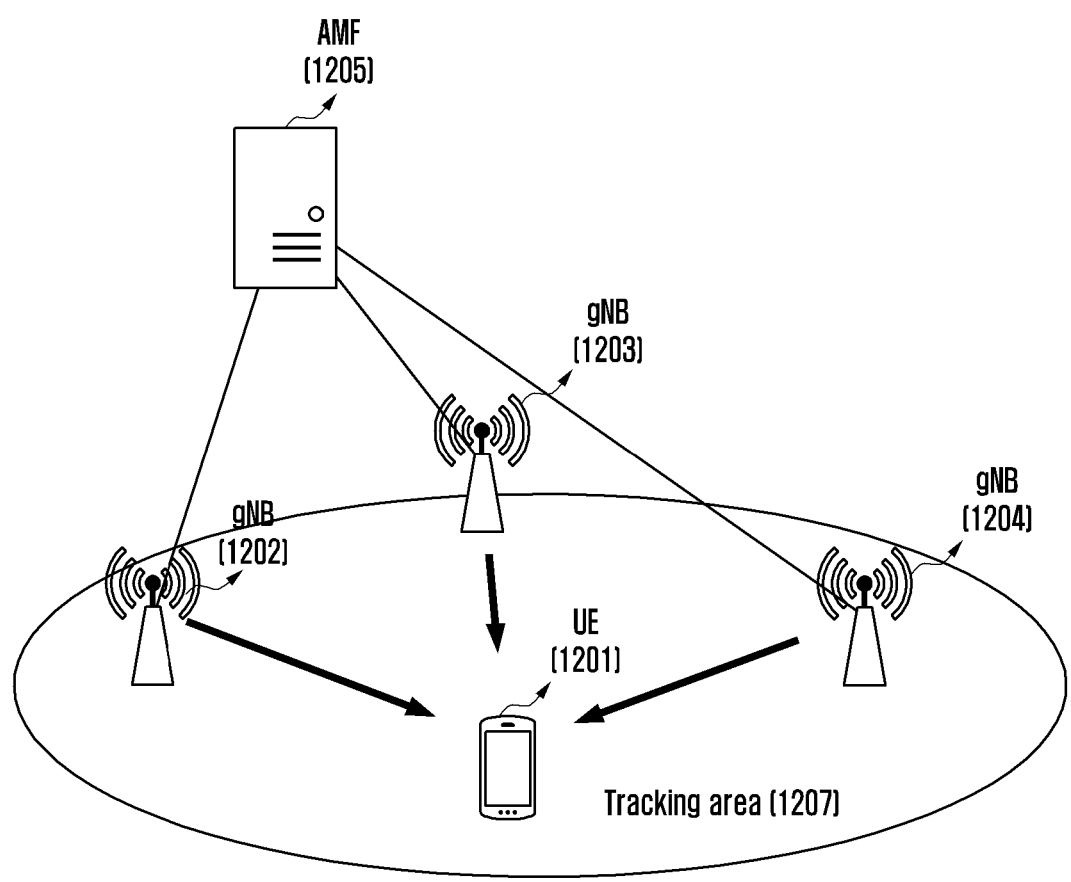
FIG. 12 illustrates an example of a paging operation performed in a wireless communication system according to an embodiment of the disclosure.

FIG. 12 illustrate a paging process in a wireless communication system according to an embodiment of the disclosure.

Specifically, FIG. 12 illustrates an example of paging in the 5G communication system. Referring to FIG. 12, when a UE 1201 is in an RRC_IDLE state, a NR network knows a location of the UE 1201 in units of Tracking Areas (TAs) rather than in units of cells. When accessing the NR network, the UE receives allocation of a Tracking Area Identity (TAI) list from an Access and Mobility Management Function (AMF) 1205. The UE 1201 may freely move within a cell in the TAI list without any update of the AMF 805. When an incoming call to the terminal (e.g., UE 1201) is generated, the AMF 1205 may transmit the same paging message to all cells 1202, 1203, and 1204 within the TA 1207 configured in the corresponding terminal (e.g., UE 1201), and the respective cells 1202, 1203, and 1204 transmit the paging message to the corresponding UE 1201. When (re)selecting any cell, the UE 1201 may acquire a Tracking Area Code (TAC) of the corresponding cell through system information (for example, SIB1) and identify whether the corresponding cell is a cell in its own TAI list on the basis of thereof. If the TAC of the selected cell is an ID that is not included in the TAI list, the UE transmits a TAU message to the AMF 1205. When transmitting a response (TAU accept) to the TAU message to the UE, the MME may also transmit a TAI list and thus update the TAI list according to movement of the UE location in the UE.

Hereinafter, an operation for monitoring paging of the UE is described in detail.

The UE may monitor one Paging Occasion (PO) per DRX cycle. One PO may include a set of a plurality of PDCCH monitoring occasions, and a slot in which paging DCI can be transmitted may include a plurality of time slots (for example, subframe or OFDM symbol). One Paging Frame (PF) may correspond to one radio frame, and may include start points of one or a plurality of POs or a predetermined PO.

In a multi-beam operation, the UE may assume that the same paging message or the same short message is repeated in all transmission beamsAt this time, a beam selected to receive a paging message or a short message may be determined by implementation of the UE. Paging message may be all the same for Radio Access Network (RAN)-initiated paging and Core Network (CN)-initiated paging.

If the terminal receives RAN-initiated paging, an RRC connection resumption (RRCConnection Resume) procedure may be started. If the terminal receives CN-initiated paging in an RRC_INACTIVE state, the terminal may change the RRC_INACTIVE state to an RRC_IDLE mode and inform of the change through Network Attached Storage (NAS).

The Paging Frame (PF) and the Paging Occasion (PO) for paging may be determined by the following equation.

A System Frame Number (SFN) corresponding to the paging frame may be determined by Equation 4 below. In Equation 4 below, A mod B may mean a modulo operation for outputting the remainder obtained by dividing A by B.

$$(SFN+PF\_offset) \bmod T = (T \text{ div } N)*(UE\_ID \bmod N) \quad \text{Equation 4}$$

An index (i_s) indicating a paging occasion index may be determined by Equation 5 below.

$$i\_s = \text{floor}(UE\_ID/N) \bmod Ns \quad \text{Equation 5}$$

Respective parameters in Equation 4 and Equation 5 for determining the paging frame and the paging occasion may be determined below.

T: DRX cycle configured in UE (DRX cycle may be configured through higher-layer signaling (for example, RRC signaling, system information (System Information Block (SIB)), or the like)

N: total number of paging frames within T

Ns: number of paging occasions for one paging frame

PF_offset: offset value for determining time point of paging frame

UE_ID: UD ID for determining paging frame and paging occasion which may be determined as in Equation 6

$$UE\_ID = 5G\text{-}S\text{-}TMSI \bmod 1024 \quad \text{Equation 6}$$

A 5G-S-TMSI may be received by, for example, the UE through higher-layer signaling. If the terminal has not been registered in the network, the UE may assume that UE_ID is 0. Alternatively, the UE ID for paging may correspond to a parameter determined by an International Mobile Subscriber Identity (IMSI). In the disclosure, the UE ID for paging is generalized and used as UE_ID. This may include both a value which can be configured on the basis of the 5G-S-TMSI and a value which can be derived from the IMSI.

PDCCH (or PDCCH scrambled by a P-RNTI) monitoring occasions for paging may be determined by a configuration of a search space for paging (for example, a search space indicated by a higher-layer signaling parameter paging-SearchSpace), information on a configuration for a first PDCCH monitoring occasion of a paging occasion (for example, a higher-layer signaling parameter firstPDCCH-MonitoringOccasionOfPO), and the number of PDCCH monitoring occasions per SS/PBCH within the paging occasion (for example, a higher-layer signaling parameter nrofPDCCH-MontiroingOccasionPerSSB-InPO). Definition of the pagingSearchSpace, firstPDCCH-MonitoringOccasionOfPO and the nrofPDCCH-MontiroingOccasionPerSSB-InPO are described below in detail.

pagingSearchSpace
ID of the Search space for paging (see TS 38.213 [13], clause 10.1). If the field is absent, the UE does not receive paging in this BWP (see TS 38.213 [13], clause 10).
firstPDCCH-MonitoringOccasionOfPO
Points out the first PDCCH monitoring occasion for paging of each PO of the PF, see TS 38.304 [20].
nrofPDCCHMonitoringOccasionPerSSB-InPO
The number of PDCCH monitoring occasions corresponding to an SSB for paging, see TS 38.304 [20], clause 7.1.

If the paging search space is configured to have a search space ID of 0, there may be one paging occasion within the paging frame when Ns=1, there may be two paging occasions within the paging frame when Ns=2, a first paging occasion (i_s=0) may exist in a first half frame within the paging frame, and a second paging occasion ((i_s=1) may exist in a second half frame within the paging frame. The search space having the search space ID of 0 may correspond to a search space configured from a Master Information Block (MIB).

If the paging search space is configured to have a search space ID of 0, the terminal may monitor a $(i\_s+1)^{th}$ paging occasion. One paging occasion may include a set of "S*X" successive PDCCH monitoring occasions, where "S" may correspond to the number of actually transmitted SS/PBCH blocks, and the corresponding information is a specific parameter (for example, ssb-PositionsInBurst) value of the System Information Block (SIB) and may be transmitted from the gNB to the UE. Further, "X" may correspond to the number of PDCCH monitoring occasions per SS/PBCH block within the paging occasion configured in the UE by the BS (for example, a higher-layer signaling parameter nrofPDCCH-MontiroingOccasionPerSSB-InPO), and if there is no corresponding configuration information, the terminal may assume that X=1. In the paging occasions, a $[x*S+K]^{th}$ (x=0, 1, 2, . . . , X−1, and K=1, 2, 3, . . . , S) PDCCH monitoring occasion may correspond to a $K^{th}$ transmission SS/PBCH block. PDCCH monitoring occasions starting from a first PDCCH monitoring occasion within the paging frame which do not overlap with an uplink (UL) symbol may sequentially have numbers from 0. At this time, when the firstPDCCH-MonitoringOccasionOfPO is configured through higher-layer signaling, a start PDCCH monitoring occasion number of the $(i\_s+1)^{th}$ paging occasion may correspond to a $(i\_s+1)^{th}$ value within the firstPDCCH-MonitoringOccasionOfPO parameter. If the firstPDCCH-MonitoringOccasionOfPO is not configured through higher-layer signaling, a start PDCCH monitoring occasion number of the $(i\_s+1)^{th}$ paging occasion may be the same as i_s*S*X. If X>1 and the terminal detects a PDCCH corresponding to a P-RNTI in any paging occasion, the terminal is not required to monitor the remaining PDCCH monitoring occasions or PDCCH monitoring occasion thereafter in the corresponding paging occasion.

One paging occasion associated with any paging frame may start within the corresponding paging frame or after the corresponding paging frame.

PDCCH monitoring occasions for a predetermined paging occasion may exist over a plurality of radio frames. When the search space for paging is configured to have a search space ID which is a value other than 0, PDCCH monitoring occasions for one paging occasion may exist over a plurality of cycles of the paging search space.

The following description corresponds to a part related to discontinuous reception for paging in the TS 38.304 standard.

7 Paging 7.1 Discontinuous Reception for paging

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]). One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is Determined by:

$$(SFN + PF\_offset) \bmod T = (T \div N) * (UE\_ID \bmod N)$$

Index (is), Indicating the Index of the PO is Determined by:

$$i\_s = \mathrm{floor}(UE\_ID/N) \bmod Ns$$

The PDCCH monitoring occasions for paging are determined according to pagingSearchSpace as specified in TS 38.213 [4] and firstPDCCH-MonitoringOccasionOfPO and nrofPDCCH-MonitoringOccasionPerSSB-InPO if configured as specified in TS 38.331 [3]. When SearchSpaceId=0 is configured for pagingSearchSpace, the PDCCH monitoring occasions for paging are same as for RMSI as defined in clause 13 in TS 38.213 [4].

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)*PO. A PO is a set of 'S*X' consecutive PDCCH monitoring occasions where 'S' is the number of actual transmitted SSBs determined according to ssb-PositionsInBurst in SIB) and X is the nroPDCCH-MonitoringOccosionPerSSB-InPO if configured or is equal to 1 otherwise. The $[x*S+K]^{th}$ PDCCH monitoring occasion for paging in the PO corresponds to the $K^{th}$ transmitted SSB, where x=0, 1, . . . , X−1, K=1, 2, . . . , S.

The PDCCH monitoring occasions for paging which do not overlap with UL symbols (determined according to tdd-UL-DL-ConfigurationCommon) are sequentially numbered from zero starting from the first PDCCH monitoring occasion for paging in the PF.

When firstPDCCH-MonitoringOccasionOfPO is present, the starting PDCCH monitoring occasion number of (i_s+1)$^{th}$ PO is the (i_s+1)$^{th}$ value of the firstPDCCH-monitoringOccasionOfPO parameter; otherwise, it is equal to i_s*SX. If X>1, when the UE detects a PDCCH transmission addressed to P-RNTI within its PO, the UE is not required to monitor the subsequent PDCCH monitoring occasions for this PO.

NOTE 1: A PO associated with a PF may start in the PF or after the PF.

NOTE 2: The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).

N: number of total paging frames in T

Ns: number of paging occasions for a PF

PF_offset: offset used for PF determination

UE ID: 5G-S-TMSI mod 1024

Parameters Ns, nAndPagingFrameOffset, nrofPDCCH-MonitoringOccasionPerSSB-InPO. and the length of default DRX Cycle are signaled in SIB1. The values of N and PF_offset are derived from the parameter nAndPagingFrameOffset as defined in TS 38.331 [3]. The parameterfirst-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string as defined in TS 23.501 [10]. 5G-S-TMSI shall in the formulae above be interpreted as a binary number where the left most bit represents the most significant bit.

The gNB may transmit a PDCCH for paging to the UE, and the corresponding PDCCH may include scheduling information for a PDSCH including a paging message. The paging message may include information on IDs of one or a plurality of UEs which the BS desires to wake up. More specifically, the following information may be included.

Paging Message

```
-- ASN1START
-- TAG-PAGING-START
Paging ::=                      SEQUENCE {
    pagingRecordList                PagingRecordList            OPTIONAL,
-- Need N
        (paging record list)
    lateNonCriticalExtension        OCTET STRING                OPTIONAL,
    nonCriticalExtension            SEQUENCE{ }                 OPTIONAL
}
PagingRecordList ::=            SEQUENCE (SIZE (1..maxNrofPageRec)) OF PagingRecord
PagingRecord ::=                SEQUENCE {
    ue-Identity                     PagingUE-Identity,
        (ue identity(ID))
    accessType                      ENUMERATED {non3GPP} OPTIONAL, -- Need N
        (access type)
    ...
}
PagingUE-Identity :: =          CHOICE {
    ng-5G-S-TMSI                    NG-5G-S-TMSI,
    fullI-RNTI                      I-RNTI-Value,
    ...
}
```

After receiving the PDCCH for paging from the gNB, the UE may receive the PDSCH scheduled by the corresponding PDCCH. UEs having IDs which are the same as the UD_ID indicated by the paging message transmitted through the received PDSCH and then an operation procedure (for example, random access, RRC connection, and the like) may be performed.

Hereinafter, a DCI format scrambled by a P-RNTI in the 5G communication system is described in detail. The DCI format scrambled by the P-RNTI may include, for example, the following fields.

Short message indicator—2 bits

Short message—8 bits according to Clause 6.5 of [9, TS38.331]; if only scheduling information for paging is transmitted, this field is reserved.

Frequency domain resource allocation information—[log $(N_{RB}^{DLBWP}(N_{RB}^{DLBWP}+1)/2)$] bits; If only a short message is transmitted, this field is reserved. $N_{RB}^{DL,BWP}$ is defined as the number of RBs in a downlink bandwidth part.

Time domain resource allocation information—4 bits; if only a short message is transmitted, this field is reserved.

VRB-to-PRB mapping—1 bits according to Table 7.3.1.2.2-5; if only a short message is transmitted, this field is reserved.

Modulation and coding scheme—5 bits; if only a short message is transmitted, this field is reserved.

TB scaling—2 bits as defined in Clause 5.1.3.2 of [6, TS38.214]; if only a short message is transmitted, this field is reserved.

Reserved bit—8 bits for operation in a cell with shared spectrum channel access; otherwise, 6 bits Table 17 shows a short message indicator within a DCI format scrambled by a P-RNTI.

Referring to Table 17, the short message indicator is reserved when a bit field is 00, and the short message indicator indicates that only scheduling information for paging is present in DCI when the bit field is 01, indicate that only a short message is present in DCI when the bit field is 10, and indicates that both the scheduling information for paging and the short message are present in DCI when the bit field is 11.

Hereinafter, a method of configuring a TCI state for a PDCCH (or a PDCCH DMRS) in the 5G communication system is described in detail.

The gNB can configure and indicate a TCI state for a PDCCH (or a PDCCH DMRS) through appropriate signaling. The gNB can configure and indicate a TCI state for a PDCCH (or a PDCCH DMRS) through appropriate signaling on the basis of the above description. The TCI state is to inform of a Quasi Co-Location (QCL) relation between a PDCCH (or a PDCCH DMRS) and another RS or channel, and the QCL relation between a reference antenna port A (reference RS #A) and another purpose antenna port B (target RS #B) means that the terminal is allowed to apply some or all of large-scale channel parameters estimated in the antenna port A to channel measurement from the antenna port B. The QCL is required to correlate different parameters according to 1) time tracking influenced by an average delay and a delay spread, 2) frequency tracking influenced by a Doppler shift and a Doppler spread, 3) Radio Resource Management (RRM) influenced by an average gain, 4) Beam Management (BM) influenced by a spatial parameter, and the like. Accordingly, NR supports four types of QCL relations shown in Table 18 below.

TABLE 17

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

TABLE 18

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters such as an Angle of Arrival (AoA), a Power Angular Spectrum (PAS) of AoA, an Angle of Departure (AoD), a PAS of AoD, a transmit/receive channel correlation, transmit/receive beamforming, a spatial channel correlation, and the like.

The QCL relation can be configured in the terminal through an RRC parameter TCI state and QCL information (QCL-Info) as shown in Table 19 below. Referring to Table 19 below, the gNB may configure one or more TCI states in the terminal and inform the terminal of a maximum of two QCL relations (qcl-Type 1 and qcl-Type 2) for an RS referring to an ID of the TCI state, that is, a target RS. At this time, each piece of QCL information (QCL-Info) included in each TCI state includes a serving cell index of a reference RS indicated by the corresponding QCL information, a BWP index, a type and an ID of a reference RX, and a QCL type shown in Table 18.

TABLE 19

```
ICI-State ::=                                         SEQUENCE {
    tci-StateId                                       TCL-StateId,
        (corresponding TCI state ID)
    qcl-Type1                                         QCL-Info,
        (QCL information of the first reference RS of RS (target RS) referring to the corresponding
TCI state ID)
    qcl-Type2                                         QCL-Info
                OPTIONAL,           -- Need R
        (QCL information of the second reference RS of the RS (target RS) referring to the
corresponding TCI state ID)
    ...
}
QCL-Info ::=                                          SEQUENCE {
    cell                                              ServCellIndex
                OPTIONAL,           -- Need R
        (The serving cell index of the reference RS indicated by the corresponding QCL information)
    bep-Id                                            BWP-Id
                OPTIONAL, -- Cond CSI-RS-Indicated
        (BWP index of reference RS indicated by the corresponding QCL information)
    referenceSignal                                   CHOICE {
            csi-rs                                    NZP-CSI-RS-
ResourceId,
            ssb                                       SSB-
Index
        (One of the CSI-RS ID or SSB ID indicated by the corresponding QCL information)
    },
    qcl-Type                                          ENUMERATED {typeA,
typeB, typeC, typeD},
    ...
}
```

Figure 13:
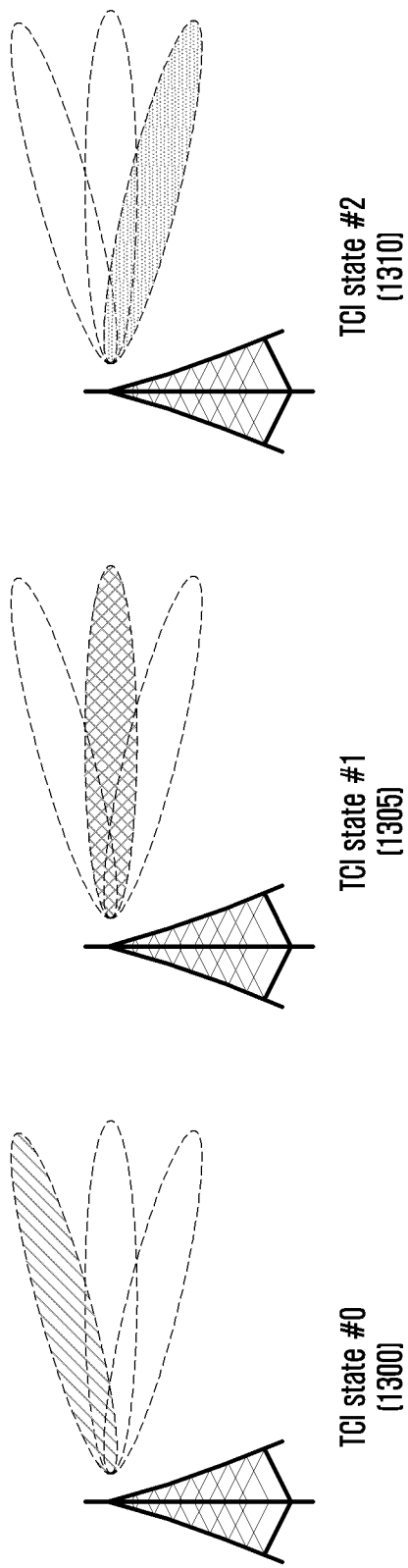
FIG. 13 illustrates an example of BS beam allocation according to a TCI state configuration in a wireless communication system according to an embodiment of the disclosure.

FIG. 13 illustrates BS beam allocation according to a TCI state configuration in a wireless communication system according to an embodiment of the disclosure.

Specifically, FIG. 13 illustrates an example of BS beam allocation according to the TCI state configuration. Referring to FIG. 13, a BS may transmit information on N different beams to a terminal through N different TCI states. For example, when N=3 as illustrated in FIG. 9, the BS may notify that a qcl-Type 2 parameter included in three TCI states 1300, 1305, and 1310 is associated with a CSI-RS or SSB corresponding to different beams to be configured as QCL type D and antenna ports referring to the different TCI states 1300, 1305, and 1310 are associated with different spatial RX parameters, that is, different beams. Specifically, combinations of TCI states which can be applied to PDCCH DMRS antenna ports are as shown in Table 20 below. In Table 20, a fourth row is a combination assumed by the terminal before the RRC configuration, and configurations after RRC are impossible.

TABLE 20

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 14:
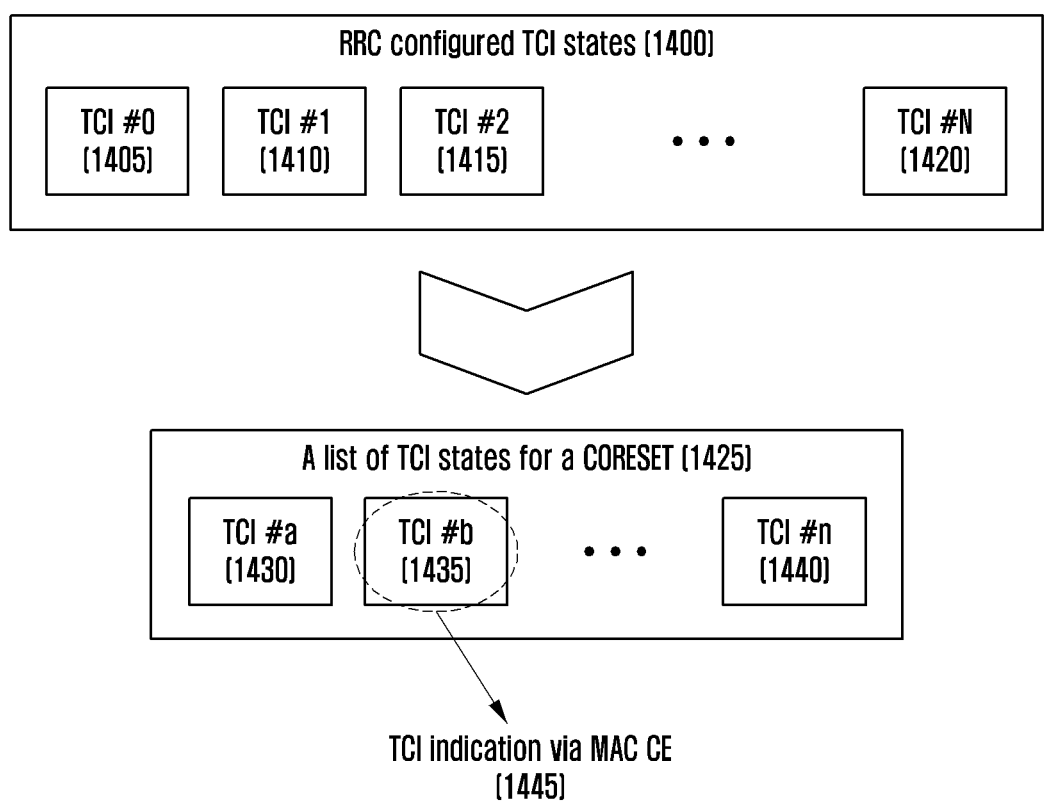
FIG. 14 illustrates an example of a process of hierarchical signaling in a wireless communication system according to an embodiment of the disclosure.

FIG. 14 illustrates a process of hierarchical signaling in a wireless communication system according to an embodiment of the disclosure.

NR supports the hierarchical signaling method as illustrated in FIG. 8 for dynamical allocation of PDCCH beams. Referring to FIG. 14, a BS may configure N TCI states 1405, 1410, 1415, . . . , 1420 in a terminal through RRC signaling 1400 and configure some thereof to be in a TCI state for a CORESET as indicated by reference numeral 1425. Thereafter, the BS may indicate one of the TCI states 1430, 1435, and 1440 for the CORESET to the terminal through MAC CE signaling as indicated by reference numeral 1445. Thereafter, the terminal receives a PDCCH on the basis of beam information included in the TCI state indicated by the MAC CE signaling.

Figure 15:
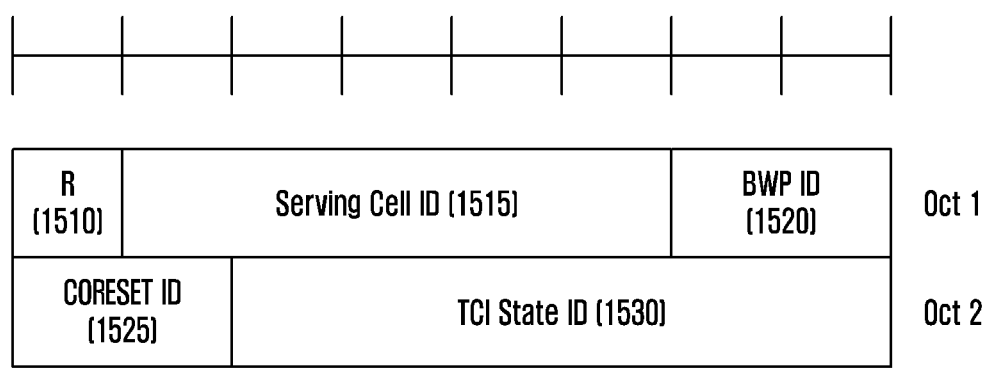
FIG. 15 illustrates an example of a signaling structure in a wireless communication system according to an embodiment of the disclosure.

FIG. 15 illustrates an example of the structure of signaling in a wireless communication system according to an embodiment of the disclosure.

Specifically, FIG. 15 illustrates the structure of TCI indication MAC CE signaling for a PDCCH DMRS. Referring to FIG. 15, a TCI indication MAC CE signaling for a PDCCH DMRS is configured by 2 bytes (16 bits), and includes a reserved bit 1510 of 1 bit, a serving cell ID 1515 of 5 bits, a BWP ID 1520 of 2 bits, a CORESET ID 1525 of 2 bits, and a TCI state ID 1530 of 6 bits.

The BS may configure one or a plurality of TCI states for a specific CORESET in the terminal and activate one of the configured TCI states through a MAC CE activation command. For example, {TCI state #0, TCI state #1, TCI state #2} may be configured as the TCI state in CORESET #1, and the BS may transmit a command activating the TCI state for CORESET #1 assumed as TCI state #0 to the terminal through the MAC CE. The terminal may correctly receive a DMRS of the corresponding CORESET on the basis of QCL information within the activated TCI state by means of the activation command for the TCI state received through the MAC CE.

If the terminal does not receive a configuration of the TCI state indicating QCL information for a DMRS antenna port for receiving a PDCCH of a CORESET (or a CORESET having a CORESET ID (or index) of 0 or CORESET #0) configured through the MIB, the terminal may assume that the following physical layer channel is QCLed in an aspect of features such as an average gain, QCL-TypeA, or QCL-TypeD.

- A DMRS (or DMRS antenna port) associated with the PDCCH received through the CORESET (or the CORESET having the CORESET ID of 0 or CORSEET #0) configured through the MIB<0}
- A DMRS antenna port associated with reception of a PDSCH (PDSCH scheduled by the PDCCH transmitted through CORESET #0) corresponding thereto
- An SS/PBCH block (or SS/PBCH block associated with CORESET #0 or SS/PBCH block transmitting the MIB configuring corresponding CORESET #0) corresponding thereto The following description corresponds to a part of the TS 38.213 standard related to the above description.

The UE may assume that the DM-RS antenna port associated with PDCCH receptions in the CORESET configured by pdcch-ConfigSIB1 in MIB, the DM-RS antenna port associated with corresponding PDSCH receptions, and the corresponding SS/PBCH block are quasi co-located with respect to average gain, QCL-TypeA, and QCL-TypeD properties, when applicable [6, TS 38.214], if the UE is not provided a TCI state indicating quasi co-location information of the DM-RS antenna port for PDCCH reception in the CORESET. The value for the DM-RS scrambling sequence initialization is the cell ID. A SCS is provided by subCarrierSpacingCommon in MIB.

If the terminal receives a configuration of a search space having a search space ID of 0 for a common search space set for monitoring an SI-RNTI/P-RNTI (or when a common search space set for monitoring an SI-RNTI/P-RNTI is a search space set configured through the MIB or is search space #0), the terminal may monitor a PDCCH in a monitoring occasion associated with an SS/PBCH block A in which case SS/PBCH block A may be determined as described below.

The terminal may receive a command activating a specific TCI state for CORESET #0 through the MAC CE and, at this time, the corresponding TCI state may include a CSI-RS related to a predetermined SS/PBCH. An SS/PBCH related to a CSI-RS of a TCI state activated through the MAC CE which the terminal most recently received may correspond to the SS/PBCH block A.

When performing random access, the terminal may transmit a preamble (or a Physical Random Access Channel (PRACH)) related to a specific SS/PBCH to the BS. An SS/PBCH identified through a random access procedure which the terminal most recently performed may correspond to the SS/PBCH block A.

The following description corresponds to a part of the TS 38.213 standard related to the above description.

If a UE is provided a zero value for searchSpaceID in PDCCH-ConfigCommon for a Type0/0A/2-PDCCH CSS set, the UE determines monitoring occasions for PDCCH candidates of the Type0/0A/2-PDCCH CSS set as described in Clause 13, and the UE is provided a C-RNTI, the UE monitors PDCCH candidates only at monitoring occasions associated with a SS/PBCH block, where the SS/PBCH block is determined by the most recent of

- a MAC CE activation command indicating a TCI state of the active BWP that includes a CORESET with index 0, as described in [6, TS 38.214], where the TCI-state includes a CSI-RS which is quasi-co-located with the SS/PBCH block, or
- a random access procedure that is not initiated by a PDCCH order that triggers a contention-free random access procedure For a CORESET (CORESET #X) configured to have an index that is a value other than 0, If the terminal does not receive a configuration of the TCI state for CORESET #X or the terminal receives the configuration of one or more TCI states but does not receive a MAC CE activation command for activating one thereof, the terminal may assume that a DMRS transmitted in CORESET #X is QCLed with an SS/PBCH block identified in an initial access process.

If the terminal receives the configuration for one or more TCI states as a part of the handover procedure (or a part of the reconfiguration with sync procedure) but does not receive a MAC CE activation command for activating one thereof, the terminal may assume that a DMRS transmitted in CORESET #X is QCLed with an SS/PBCH or CSI-RS resources identified during a random access procedure initiated by the handover procedure (or reconfiguration with synch procedure).

The following description corresponds to a part of the TS 38.213 standard related to the above description.

For a CORESET other than a CORESET with index 0,
if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in [11, TS 38.321], the UE assumes that the DM-RS antenna port associated with PDCCH receptions is quasi co-located with the SS/PBCH block the UE identified during the initial access procedure;
if a UE has been provided a configuration of more than one TCI states by tci-StatesPDCCH-ToAddList and tci-StatesPDCCH-ToReleaseList for the CORESET as part of Reconfiguration with sync procedure as described in [12, TS 38.331] but has not received a MAC CE activation command for one of the TCI states as described in [11, TS 38.321], the UE assumes that the DM-RS antenna port associated with PDCCH receptions is quasi co-located with the SS/PBCH block or the CSI-RS resource the UE identified during the random access procedure initiated by the Reconfiguration with sync procedure as described in [12, TS 38.331].

For CORESET having an index of 0 (CORESET #0), the terminal may assume that a DMRS antenna port of a PDCCH received through CORESET #0 is QCLed with the following physical resources.

A downlink reference signal included in the TCI state activated by the MAC CE activation command or An SS/PBCH block identified by the terminal through the most recent random access procedure (random access that is not non-contention-based random access triggered by a PDCCH order) if the terminal does not receive the MAC CE activation command for the TCI state The following description corresponds to a part of the TS 38.213 standard related to the above description.

For a CORESET with index 0, the UE assumes that a DM-RS antenna port for PDCCH receptions in the CORESET is quasi co-located with the one or more DL RS configured by a TCI state, where the TCI state is indicated by a MAC CE activation command for the CORESET, if any, or a SS/PBCH block the UE identified during a most recent random access procedure not initiated by a PDCCH order that triggers a contention-free random access procedure, if no MAC CE activation command indicating a TCI state for the CORESET is received after the most recent random access procedure.

Hereinafter, the terms of paging, a PDCCH, a PDCCH for paging, a PDCCH corresponding to paging, a PDCCH scrambled by a P-RNTI, and a PDCCH configured as a P-RNTI may be all used as the same meaning.

Hereinafter, the terms of paging, a PDSCH, a PDCSH for paging, a PDSCH corresponding to paging, a PDSCH scrambled by a P-RNTI, and a PDSCH configured as a P-RNTI may be all used as the same meaning.

In NR, there is a CSI framework indicating Channel State Information (CSI) measurement and report of the terminal by the BS. The CSI framework of NR may include a minimum of two elements such as resource setting and report setting, and the report setting may have a correlation with the resource setting with reference to at least one of IDs of the resource setting.

According to an embodiment of the disclosure, the resource setting may include information related to a Reference Signal (RS) for measuring channel state information by the terminal. The BS may configure one or more resource settings in the terminal. For example, the BS and the terminal may exchange signaling information such as Table 21 in order to transmit information related to the resource setting.

TABLE 21

```
-- ASN1START
-- TAG-CSI-RESOURCECONFIG-START
CSI-ResourceConfig ::=                    SEQUENCE {
    csi-ResourceConfigId                      CSI-ResourceConfigId,
    csi-RS-ResourceSetList                    CHOICE {
        nzp-CSI-RS-SSB                            SEQUENCE {
            nzp-CSI-RS-ResourceSetList                  SEQUENCE (SIZE (1..maxNrofNZP-
CSI-RS-ResourceSetsPerConfig)) OF NZP-CSI-RS-ResourceSetId
OPTIONAL, -- Need R
            csi-SSB-ResourceSetList                     SEQUENCE (SIZE (1..maxNrofCSI-SSB-
ResourceSetsPerConfig)) OF CSI-SSB-ResourceSetId
OPTIONAL -- NeedR
        },
        csi-IM-ResourceSetList                      SEQUENCE (SIZE (1..maxNrofCSI-IM-
ResourceSetsPerConfig)) OF CSI-IM-ResourceSetId
    },
    bwp-Id                                    BWP-Id,
    resourceType                              ENUMERATED { aperiodic, semiPersistent, periodic },
    ...
}
```

TABLE 21-continued

```
-- TAG-CSI-RESOURCECONFIG-STOP
-- ASN1STOP
```

In Table 21, signaling information CSI-ResourceConfig includes information on each resource setting. According to the signaling information, each resource setting may include a resource setting index (csi-ResourceConfigId), a BWP index (bwp-ID), a configuration of transmission in a time axis of resources, or a resource set list (csi-RS-Resource-SetList) including at least one resource set. The configuration of transmission in the time axis of resources may be performed as aperiodic transmission, semi-persistent transmission, or periodic transmission. The resource set list may be a set including resource sets for channel measurement or resource sets for interference measurement. When the resource set list is the set including resource sets for channel measurement, each resource set may include at least one resource, which may be a CSI-RS resources or an index of an SS/PBCH Block (SSB). When the resource set list is the set including resource sets for interference measurement, each resource set may include at least one interference measurement resources (CSI Inference Measurement (IM)).

For example, when the resource set includes a CSI-RS, the BS and the terminal may exchange signaling information such as Table 22 in order to transmit information related to the resource set.

TABLE 22

```
-- ASN1START
-- TAG-NZP-CSI-RS-RESOURCESET-START
NZP-CSI-RS-ResourceSet ::=        SEQUENCE {
    nzp-CSI-ResourceSetId    NZP-CSI-RS-ResourceSetId,
    nzp-CSI-RS-Resources         SEQUENCE (SIZE (1..maxNrofNZP-CSI-
RS-ResourcesPerSet)) OF NZP-CSI-RS-ResourceId,
    repetition                        ENUMERATED { on, off }
OPTIONAL, -- Need S
    aperiodicTriggeringOffset         INTEGER(0..6)
OPTIONAL, -- Need S
    trs_Info                          ENUMERATED {true}
OPTIONAL, -- Need R
    ...
}
-- TAG-NZP-CSI-RS-RESOURCESET-STOP
-- ASN1STOP
```

In Table 22, signaling information NZP-CSI-RS-ResourceSet includes information on each resource set. According to the signaling information, each resource set may include some pieces of information on at least a resource set index (nzp-CSI-ResourceSetId) or a CSI-RS index set (nzp-CSI-RS-Resources), information on a spatial domain transmission filter of the CSI-RS resources, or the use of tracking of the CSI-RS resources (trs-Info).

The CSI-RS may be a most representative reference signal included in the resource set. The BS and the terminal may exchange signaling information such as Table 23 in order to transmit information on the CSO-RS resource.

TABLE 23

```
-- ASN1START
-- TAG-NZP-CSI-RS-RESOURCE-START
NZP-CSI-RS-Resource ::=        SEQUENCE {
    nzp-CSI-RS-ResourceId         NZP-CSI-RS-ResourceId,
    resourceMapping               CSI-RS-ResourceMapping,
    powerControlOffset            INTEGER (-8..15),
    powerControlOffsetSS          ENUMERATED {db-3,db0, db3, db6}
OPTIONAL, -- Need R
    scramblingID            ScramblingId,
    periodicityAndOffset                CSI-ResourcePeriodicityAndOffset
OPTIONAL, -- Cond PeriodicOrSemiPersistent
    qcl-InfoPeriodicCSI-RS      TCI-StateId        OPTIONAL,
-- Cond Periodic
    ...
}
-- TAG-NZP-CSI-RS-RESOURCE-STOP
-- ASN1STOP
```

In Table 23, signaling information NZP-CSI-RS-Resource includes information on each CSI-RS. Information included in the signaling information NZP-CSI-RS-Resource may have the following meaning.

nzp-CSI-RS-ResourceId: CSI-RS resource index
resourceMapping: resource mapping information of CSI-RS resource
powerControlOffset: ratio between PDSCH Energy Per RE (EPRE) and CSI-RS EPRE
powerControlOffsetSS: ratio between SS/PBCH block EPRE and CSI-RS EPRE
scramblingID: scrambling index of CSI-RS sequence
periodicityAndOffset: transmission period of CSI-RS resource and slot offset
qcl-InfoPeriodicCSI-RS: TCI-state information if corresponding CSI-RS is periodic CSI-RS The resourceMapping included in the signaling information NZP-CSI-RS-Resource indicates resource mapping information of the CSI-RS resource, and may include mapping of Resource Elements (Res) of frequency resources, the number of ports, symbol mapping, CDM type, frequency resource density, and frequency band mapping information. The number of ports, the frequency resource density, the CDM type, and time-frequency axis RE mapping which can be configured therethrough may have a predetermined value in one of rows of [Table 24].

of the CSI-RS component RE pattern. The CSI-RS component RE pattern may be a basic unit of the CSI-RS resource. Through Y=1+max(k') REs in the frequency axis and Z=1+max(l') REs in the time axis, the CSI-RS component RE pattern may include YZ REs. When the number of CSI-RS ports is 1, a CSI-RS RE location may be designated by a bitmap of 12 bits without any limit of subcarriers within a Physical Resource Block (PRB). When the number of CSI-RS ports is {2, 4, 8, 12, 16, 24, 32} and Y=2, the CSI-RS RE location may be designated by a bitmap of 6 bits in every two subcarriers within the PRB. When the number of CSI-RS ports is 4 and Y=4, the CSI-RS RE location may be designated by a bitmap of 3 bits in every four subcarriers within the PRB. Similarly, the RE location in the time axis may be designated by a bitmap of a total of 14 bits. At this time, the length of the bitmap can be changed according to the Z value of [Table 24] like frequency location designation, but the principle is similar to that described above, and thus an overlapping description is omitted hereinafter.

According to an embodiment of the disclosure, the report setting may have a correlation with the resource setting with reference to at least one of IDs of the resource setting, and resources setting(s) having the correlation with the report setting provide configuration information including information on a reference signal for channel information measurement. When resource setting(s) having the correlation with the report setting are used for channel information measurement, the measured channel information may be used for a channel information report according to a report method configured in the report setting having the correlation.

TABLE 24

| Row | Ports X | Density ρ | cdm-Type | $(\bar{k}, \bar{l})$ | CDM group index j | k' | l' |
|---|---|---|---|---|---|---|---|
| 1 | 1 | 3 | noCDM | $(k_0, l_0), (k_0 + 4, l_0), (k_0 + 8, l_0)$ | 0, 0, 0 | 0 | 0 |
| 2 | 1 | 1, 0.5 | noCDM | $(k_0, l_0)$, | 0 | 0 | 0 |
| 3 | 2 | 1, 0.5 | fd-CDM2 | $(k_0, l_0)$, | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | 0 |
| 6 | 8 | 1 | fd-CDM2 | $(k_0, l_0), (k_1, l_0), (k_2, l_0), (k_3, l_0)$ | 0, 1, 2, 3 | 0, 1 | 0 |
| 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | cdm4(FD2, TD2) | $(k_0, l_0), (k_1, l_0)$ | 0, 1 | 0, 1 | 0, 1 |
| 9 | 12 | 1 | fd-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | cdm4(FD2, TD2) | $(k_0, l_0), (k_1, l_0), (k_2, l_0)$ | 0, 1, 2 | 0, 1 | 0, 1 |
| 11 | 16 | 1, 0.5 | fd-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | cdm4(FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | fd-CDM2 | $(k_0, l_0), (k_1, l_0), (k_2, l_0), (k_0, l_0 + 1), (k_1, l_0 + 1), (k_2, l_0 + 1), (k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8 , 9, 10, 11 | 0, 1 | 0 |
| 14 | 24 | 1, 0.5 | cdm4(FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | cdm8(FD2, TD4) | $(k_0, l_0), (k_1, l_0), (k_2, l_0)$ | 0, 1, 2 | 0, 1 | 0, 1, 2, 3 |
| 16 | 32 | 1, 0.5 | fd-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1), (k_0, l_1), (k_1, l_1), (k_2, l_1), (k_3, l_1), (k_0, l_1 + 1), (k1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | cdm4(FD2, TD2) | $(k_0, l_0), (k_1, l_0), (k_2, l_0), (k_3, l_0), (k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | cdm8(FD2, TD4) | $(k_0, l_0), (k_1, l_0), (k_2, l_0), (k_3, l_0)$ | 0, 1, 2, 3 | 0, 1 | 0, 1, 2, 3 |

Table 24 indicates a frequency resource density which can be configured according to the number (X) of CSI-RS ports, a CDM type, a start location $(\bar{k}, \bar{l})$ in a frequency axis and a time axis of a CSI-RS component RE pattern, the number (k') of REs in the frequency axis of the CSI-RS component RE pattern, and the number of (l') REs in the frequency axis According to an embodiment of the disclosure, the report setting may include configuration information related to the CSI report method. For example, the BS and the terminal may exchange signaling information such as Table 25 in order to transmit information related to the report setting.

TABLE 25

```
-- ASN1START
-- TAG-CSI-REPORTCONFIG-START
CSI-ReportConfig ::=                         SEQUENCE {
    reportConfigId                               CSI-ReportConfigId,
    carrier                              ServCellIndex              OPTIONAL, -- Need S
    resourcesForChannelMeasurement                                  CSI-ResourceConfigId,
    csi-IM-ResourcesForInterference                                 CSI-ResourceConfigId      OPTIONAL, -- Need R
    nzp-CSI-RS-ResourcesForInterference                             CSI-ResourceConfigId      OPTIONAL, -- Need R
    reportConfigType                                  CHOICE {
        periodic                              SEQUENCE {
            reportSlotConfig                                    CSI-ReportPeriodicityAndOffset,
            pucch-CSI-ResourceList                                      SEQUENCE (SIZE (1..maxNrofBWPs)) OF PUCCH-CSI-Resource
        },
        semiPersistentOnPUCCH                                SEQUENCE {
            reportSlotConfig                            CSI-ReportPeriodicityAndOffset,
            pucch-CSI-ResourceList                                      SEQUENCE (SIZE (1..maxNrofBWPs)) OF PUCCH-CSI-Resource
        },
        semiPersistentOnPUSCH                                    SEQUENCE {
            reportSlotConfig                            ENUMERATED {sl5, sl10, sl20, sl40, sl80, sl160, sl320},
            reportSlotOffsetList                            SEQUENCE (SIZE (1.. maxNrofUL-Allocations)) OF INTEGER(0..32),
            p0alpha                              P0-PUSCH-AlphaSetId
        },
        aperiodic                          SEQUENCE {
            reportSlotOffsetList                                    SEQUENCE (SIZE (1..maxNrofUL-Allocations)) OF INTEGER(0..32)
        }
    },
    reportQuantity                                CHOICE {
        none                              NULL,
        cri-RI-PMI-CQI                                  NULL,
        cri-RI-i1                        NULL,
        cri-RI-i1-CQI                                SEQUENCE {
            pdsch-BundleSizeForCSI                                    ENUMERATED {n2, n4}        OPTIONAL -- Need S
        },
        cri-RI-CQI                              NULL,
        cri-RSRP                                NULL,
        ssb-Index-RSRP                              NULL,
        cri-RI-LI-PMI-CQI                              NULL
    },
    reportFreqConfiguration                              SEQUENCE {
        cqi-FormatIndicator                              ENUMERATED { widebandCQI, subbandCQI }      OPTIONAL, -- Need R
        pmi-FormatIndicator                                  ENUMERATED { widebandPMI, subbandPMI }      OPTIONAL, -- Need R
        csi-ReportingBand                              CHOICE {
            subbands3                            BIT STRING(SIZE(3)),
            subbands4                            BIT STRING(SIZE(4)),
            subbands5                            BIT STRING(SIZE(5)),
            subbands6                            BIT STRING(SIZE(6)),
            subbands7                            BIT STRING(SIZE(7)),
            subbands8                            BIT STRING(SIZE(8)),
            subbands9                            BIT STRING(SIZE(9)),
            subbands10                              BIT STRING(SIZE(10)),
            subbands11                              BIT STRING(SIZE(11)),
            subbands12                              BIT STRING(SIZE(12)),
            subbands13                              BIT STRING(SIZE(13)),
            subbands14                              BIT STRING(SIZE(14)),
            subbands15                              BIT STRING(SIZE(15)),
            subbands16                              BIT STRING(SIZE(16)),
            subbands17                              BIT STRING(SIZE(17)),
            subbands18                              BIT STRING(SIZE(18)),
            ...,
            subbands19-v1530                                BIT STRING(SIZE(19))
        } OPTIONAL -- Need S
    }                              OPTIONAL,
```

TABLE 25-continued

```
-- Need R
    timeRestrictionForChannelMeasurements                    ENUMERATED
{configured, notConfigured},
    timeRestrictionForInterferenceMeasurements               ENUMERATED
{configured, notConfigured},
    codebookConfig                                           CodebookConfig
OPTIONAL, -- Need R
    dummy                                                    ENUMERATED {n1, n2}
OPTIONAL, -- Need R
    groupBasedBeamReporting                                  CHOICE {
        enabled                                              NULL,
        disabled                                             SEQUENCE {
            nrofReportedRS                                   ENUMERATED {n1, n2, n3, n4}
OPTIONAL -- Need S
        }
    },
    cqi-Table                       ENUMERATED {table1, table2, table3, spare1}
OPTIONAL, -- Need R
    subbandSize                     ENUMERATED {value1, value2},
    non-PMI-PortIndication          SEQUENCE (SIZE (1..maxNrofNZP-CSI-RS-
ResourcesPerConfig)) OF PortIndexFor8Ranks OPTIONAL, -- Need R
    ...,
    [[
    semiPersistentOnPUSCH-v1530                              SEQUENCE {
        reportSlotConfig-v1530                               ENUMERATED {sl4, sl8, sl16}
    }                                                                     OPTIONAL
-- Need R
    ]]
}
```

In Table 25, signaling information CSI-ResourceConfig includes information on each reporting setting. Information included in the signaling information CSI-ReportConfig may have the following meaning.

reportConfigId: report setting index carrier: serving cell index resourcesForChannelMeasurement: resource setting index for channel measurement having correlation with report setting csi-IM-ResourcesForInterference: resource setting index having CSI-IM resources for interference measurement having correlation with report setting nzp-CSI-RS-ResourcesForInterference: resource setting index having CSI-RS resources for interference measurement having correlation with report setting reportConfigType: indicates time axis transmission configuration of channel report and transmission channel and has configurations of aperiodic transmission, semi-persistent Physical Uplink Control Channel (PUCCH) transmission, semi-persistent PUSCH transmission, or periodic transmission reportQuantity: indicates types of reported channel information and has channel information types ("cri-RI-PMI-CQI", "cri-RI-i1", "cri-RI-i1-CQI", "cri-RI-CQI", "cri-RSRP", "ssb-Index-RSRP", and "cri-RI-LI-PMI-CQI") in the case ("none") in which no channel report is transmitted and the case in which channel report is transmitted Elements included in channel information types are Channel Quality Indicator (CQI), Precoding Matric Indicator (PMI), CSI-RS Resource Indicator (CRI), SS/PBCH block Resource Indicator (SSBRI), Layer Indicator (LI), Rank Indicator (RI), and/or Reference Signal Received Power (L1-RSRP).

reportFreqConfiguration: indicates whether reported channel information includes only an entire bandwidth (wideband) or includes information on each subband and has configuration information of a subband including channel information if reported channel information includes information on each subband timeRestrictionForChannelMeasurements: time axis restriction of reference signal for channel measurement in reference signals referred to by reported channel information timeRestrictionForChannelMeasurements: time axis restriction of reference signal for interference measurement in reference signals referred to by reported channel information codebookConfig: codebook information referred to by reported channel information grouBasedBeamReporting: beam grouping of channel report cqi-Table: CQI table index referred to by reported channel information subbandSize: index indicating subband size of channel information non-PMI-PortIndication: port mapping information referred to when non-PMI channel information is reported When the BS indicates a channel information report through high-layer signaling or L1 signaling, the terminal may perform the channel information report with reference to the configuration information included in the indicated report setting.

The BS may indicate the Channel State Information (CSI) report to the terminal through higher-layer signaling including Radio Resource Control (RRC) signaling or Medium Access Control (MAC) Control Element (CE) signaling or L1 signaling (for example, common DCI, group-common DCI, or UE-specific DCI).

For example, the BS may indicate an aperiodic channel information report to the terminal through higher-layer signaling or DCI using DCI format 0_1. The BS configures a plurality of CSI report trigger states including a parameter for the aperiodic CSI report of the terminal or a parameter for the CSI report through higher-layer signaling. The parameter for the CSI report or the CSI report trigger state may include a slot interval between a PDCCH including DCI and a Physical Uplink Control Channel (PUCCH) or a PUSCH including the CSI report or a set including slot intervals, a reference signal ID for channel state measurement, a type of included channel information, and the like. When the BS indicates some of the plurality of CSI report trigger states to the terminal through DCI, the terminal reports channel information according to the CSI report configuration of report setting configured in the indicated CSI report trigger state. Time axis resource allocation of the PUCCH or PUSCH including the CSI report of the terminal may indicate some of all of a slot interval with a PDCCH indicated through DCI, a start symbol within the slot for time axis resource allocation of the PUCCH, a symbol length indication, and a PUCCH resource indication. For example, the location of the slot in which the PUSCH including the CSI report of the terminal is transmitted may be indicated through a slot interval with the PDCCH indicated through DCI, and the start symbol within the slot and the symbol length may be indicated through a time domain resource assignment field of the DCI.

For example, the BS may indicate a semi-persistent CSI report to the terminal through higher-layer signaling or DCI using DCI format 0_1. The BS may activate or deactivate the semi-persistent CSI report through higher-layer signaling including MAC CE signaling or DCI scrambled by an SP-CSI-RNTI. When the semi-persistent CSI report is activated, the terminal may periodically report channel information according to the configured slot interval. When the semi-persistent CSI report is deactivated, the terminal may stop the activated periodic channel information report. The BS configures a plurality of CSI report trigger states including a parameter for the semi-persistent CSI report of the terminal or a parameter for the semi-persistent CSI report through higher-layer signaling. The parameter for the CSI report or the CSI report trigger state may include a slot interval between a PDCCH including DCI indicating the CSI report and a PUCCH or PUSCH including the CSI report, a set including available slot intervals, a slot interval between a slot in which higher-layer signaling indicating the CSI report is activated and a PUCCH or PUSCH including the CSI report, a slot interval period of the CSI report, a type of included channel information, and the like. When the BS activates some of a plurality of CSI report trigger states or some of a plurality of report settings in the terminal through higher-layer signaling or DCI, the terminal may report channel information according to the report setting included in the indicated CSI report trigger state or a CSI report configuration configured in the activated report setting. Time axis resource allocation of the PUCCH or PUSCH including the CSI report of the terminal may be indicated through some or all of a slot interval period of the CSI report, a slot interval with the slot in which higher-layer signaling is activated, a slot interval with a PDCCH indicated through DCI, a start symbol within the slot for time axis resource allocation of the PUSCH, a symbol length indication, and a PUCCH resource indication. For example, the location of the slot in which the PUSCH including the CSI report of the terminal is transmitted may be indicated through a slot interval with the PDCCH indicated through DCI, and the start symbol within the slot and the symbol length may be indicated through a time domain resource assignment field of DCI format 0_1. For example, the location of the slot in which the PUCCH including the CSI report of the terminal is transmitted may be indicated through a slot interval period of the CSI report configured through higher-layer signaling and a slot interval between a slot in which higher-layer signaling is activated and the PUCCH including the CSI report, and the start symbol within the slot and the symbol length may be indicated through a start symbol to which the PUCCH resources configured through higher-layer signaling is allocated and a symbol length.

For example, the BS may indicate a periodic CSI report to the terminal through higher-layer signaling. The BS may activate or deactivate the periodic CSI report through higher-layer signaling including RRC signaling. When the periodic CSI report is activated, the terminal may periodically report channel information according to the configured slot interval. When the periodic CSI report is deactivated, the terminal may stop the activated periodic channel information report. The BS configures report setting including the parameter for the periodic CSI report of the terminal through higher-layer signaling. The parameter for the CSI report may include a slot interval between a slot in which higher-layer signaling is activated and a PUCCH or PUSCH including the CSI report, a slot interval period of the CSI report, a reference signal ID for channel state measurement, a type of included channel information, and the like. Time axis resource allocation of the PUCCH or PUSCH including the CSI report of the terminal may be indicated through some or all of a slot interval period of the CSI report, a slot interval with the slot in which higher-layer signaling is activated, a slot interval with a PDCCH indicated through DCI, a start symbol within the slot for time axis resource allocation of the PUSCH, a symbol length indication, and a PUCCH resource indication. For example, the location of the slot in which the PUCCH including the CSI report of the terminal is transmitted may be indicated through a slot interval period of the CSI report configured through higher-layer signaling and a slot interval between a slot in which higher-layer signaling is activated and the PUCCH including the CSI report, and the start symbol within the slot and the symbol length may be indicated through a start symbol to which the PUCCH resources configured through higher-layer signaling is allocated and a symbol length.

When the BS indicates the aperiodic CSI report or the semi-persistent CSI report to the terminal through DCI, the terminal may determine whether a valid channel report can be performed through the indicated CSI report in consideration of a channel computation time required for the CSI report (CSI computation time). For the aperiodic CSI report or the semi-persistent CSI report indicated through DCI, the terminal may perform the valid CSI report from an uplink symbol after Z symbols from the end of the last symbol included in the PDCCH including DCI indicating the CSI report, and the Z symbols may vary depending on numerology of a downlink BWP corresponding to the PDCCH including DCI indicating the CSI report, numerology of an uplink BWP corresponding to the PUSCH transmitting the CSI report, and a type or a characteristic of channel information reported by the CSI report (report quantity, frequency band granularity, the number of ports of reference signals, a codebook type, and the like). In other words, in order to determine which CSI report is valid (in order to make the corresponding CSI report a valid CSI report), uplink transmission of the corresponding CSI report must not be performed earlier than a symbol Zref, including timing advance. At this time, the symbol Zref is an uplink symbol starting a Cyclic Prefix (CP) after a time $T_{proc.CSI} = (Z)(2048+144) \cdot \kappa 2^{-\mu} \cdot T_c$ from the moment the last symbol of the triggering PDCCH ends. A detailed value of Z follows the description below, and $T_c = 1/(\Delta f_{max} \cdot N_f)$, $\Delta f_{max} = 480 \cdot 10^3$ Hz, $N_f = 4096$, $\kappa = 64$, and $\mu$ is numerology. $\mu$ may be appointed such that a value causing the largest $T_{proc.CSI}$ among $(\mu_{PDCCH}, \mu_{CSI-RS}, \mu_{UL})$ is used, PDCCH denotes subcarrier spacing used for PDCCH transmission, $\mu_{CSI-RS}$ denotes subcarrier spacing used for CSI-RS transmission, and $\mu_{UL}$ denotes subcarrier spacing of an uplink channel used for Uplink Control Information (UCI) transmission for CSI reporting. In another example, μ can be appointed such that a value causing the largest $T_{proc,CSI}$ among ($\mu_{PDCCH}$, $\mu_{UL}$) is used. Definition of $\mu_{PDCCH}$ and $\mu_{UL}$ refer to the above description. For convenience of later description, satisfaction of the above condition means satisfaction of CSI reporting validity condition 1.

When the reference signal for channel measurement for the aperiodic CSI report indicated to the terminal through DCI is an aperiodic reference signal, the terminal may perform the valid CSI report from an uplink symbol after Z' symbols from the end of the last symbol including the reference signal, and the Z' symbols may vary depending on numerology of a downlink BWP corresponding to the PDCCH including DCI indicating the CSI report, numerology of a BSP corresponding to a reference signal for channel measurement for the CSI report, numerology of an uplink BWP corresponding to the PUSCH transmitting the CSI report, and a type or a characteristic of channel information reported by the CSI report (report quantity, frequency band, granularity, the number of ports of reference signals, codebook type, and the like). In other words, in order to determine which CSI report is valid (in order to make the corresponding CSI report a valid CSI report), uplink transmission of the corresponding CSI report must not be performed earlier than a symbol Zref', including timing advance. At this time, the symbol Zref is an uplink symbol starting a Cyclic Prefix (CP) after a time $T_{proc,CSI}'=(Z') \cdot (2048+144) \cdot \kappa 2^{-\mu} \cdot T_c$ from the moment the last symbol of the aperiodic CSI-RS or aperiodic CSI-IM triggered by the triggering PDCCH ends. A detailed value of Z follows the description below, and $T_c=1/(\Delta f_{max} \cdot N_f)$, $\Delta f_{max}=480 \cdot 10^3$ Hz, $T_c=1/(\Delta f_{max} \cdot N_f)$, $\Delta f_{max}=480 \cdot 10^3$ Hz, $N_f=4096$, κ=64, and P is numerology. P may be appointed such that a value causing the largest $T_{proc,CSI}$ among ($\mu_{PDCCH}$, $\mu_{CSI-RS}$, $\mu_{UL}$) is used. $\mu_{PDCCH}$ denotes subcarrier spacing used for triggering PDCCH transmission, $\mu_{CSI-RS}$ denotes subcarrier spacing used for CSI-RS transmission, and $\mu_{UL}$ denotes subcarrier spacing of an uplink channel used for Uplink Control Information (UCI) transmission for CSI reporting. In another example, μ may be appointed such that a value causing the largest $T_{proc,CSI}$ among ($\mu_{PDCCH}$, $\mu_{UL}$) is used. Definition of $\mu_{PDCCH}$ and $\mu_{UL}$ refers to the above description. For convenience of later description, satisfaction of the above condition means satisfaction of CSI reporting validity condition 2.

When the BS indicates the aperiodic CSI report for the aperiodic reference signal to the terminal through DCI, the terminal may perform the valid CSI report from a first uplink symbol satisfying both a time point after Z symbols after the end of the last symbol included in the PDCCH including DCI indicating the CSI report and a time point after Z' symbols after the end of the last symbol including the reference signal. That is, only when CSI reporting validity conditions 1 and 2 are all satisfied, the aperiodic CSI reporting based on the aperiodic reference signal may be determined as the valid CSI report.

When the CSI report time point indicated by the BS does not satisfy a CSI computation time requirement, the terminal may determine that the corresponding CSI report is not valid and may not consider an update of the channel information state for the CSI report.

The Z and Z' symbols for calculating the CSI computation time follow [Table 26] and [Table 27] below. For example, when channel information reported by the CSI report includes only wideband information, the number of ports of the reference signal is equal to or smaller than 4, the number of reference signal resources is 1, and the codebook type is "typeI-SinglePanel" or the report channel information type (report quantity) is "cri-RI-CQI", the Z and Z' symbols follow $Z_1$ and $Z_1'$ in [Table 27]. In addition, when the PUSCH including the CSI report does not include a TB or HARQ-ACK and CPU occupation of the terminal is 0, the Z and Z' symbols follow $Z_1$ and $Z_1'$ in [Table 26], which is named delay requirement 1. When the report quantity is "cri-RSRP" or "ssb-Index-RSRP", the Z and Z' symbols follow $Z_3$ and $Z_3'$ in Table 27. $X_1$, $X_2$, $X_3$, and $X_4$ in Table 27 indicate UE capability for a beam report time and $KB_1$ and $KB_2$ indicate UE capability for a beam change time. In the case that does not correspond to the type or the characteristic of the channel information reported by the CSI report, Z and Z' symbols follow $Z_2$ and $Z_2'$ in Table 26.

TABLE 26

| | $Z_1$ [symbols] | |
|---|---|---|
| μ | $Z_1$ | $Z_1'$ |
| 0 | 10 | 8 |
| 1 | 13 | 11 |
| 2 | 25 | 21 |
| 3 | 43 | 36 |

TABLE 27

| | $Z_1$ [symbols] | | $Z_2$ [symbols] | | $Z_3$ [symbols] | |
|---|---|---|---|---|---|---|
| μ | $Z_1$ | $Z_1'$ | $Z_2$ | $Z_2'$ | $Z_3$ | $Z_3'$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

When indicating the aperiodic/semi-persistent/periodic CSI report to the terminal, the BS may configure CSI reference resources in units of slots in order to determine a reference time of the reference signal for channel information measurement reported by the CSI report. For example, when transmission of CSI report #X in uplink slot n' is indicated, CSI reference resources of CSI report #X transmitted in uplink slot n' may be defined as downlink slot n-$n_{CSI-ref}$. Downlink slot n is calculated as n=⌊n'·$2^{\mu DL}/2^{\mu UL}$⌋ in consideration of downlink and uplink numerologies μDL and μUL. When CSI report #0 transmitted in uplink slot n' is the semi-persistent report or the periodic CSI report, $n_{CSI-ref}$ that is a slot interval between downlink slot n and the CSI reference resource follows $n_{CSI-ref}=4 \cdot 2^{\mu DL}$ if a single CSI-RS resource is connected to the corresponding CSI report according to the number of CSI-RS resources for channel measurement, and follows $n_{CSI-ref}=5 \cdot 2^{\mu DL}$ if multiple CSI-RS resources are connected to the corresponding CSI report. When CSI report #0 transmitted in uplink slot n' is the aperiodic CSI report, $n_{CSI-ref}=\lceil Z'/N_{symb}^{slot} \rceil$ is calculated in consideration of the CSI computation time Z' for channel measurement. $N_{symb}^{slot}$ is the number of symbols included in one slot, and it is assumed that $N_{symb}^{slot}=14$ in NR.

When the BS indicates transmission of any CSI report in uplink slot n' to the terminal through higher-layer signaling or DCI, the terminal may report the CSI by performing channel measurement or interference measurement for CSI- RS resources, CSI-IM resources, or SSB resources that are transmitted not later than a CSI reference resource slot of the CSI report transmitted in uplink slot n' among CSI-RS resources, CSI-IM resources, or SSB resources associated with the corresponding CSI report. The CSI-RS resources associated with the corresponding CSI report, the CSI-IM resources, or the SSB resources may be CSI-RS resources, CSI-IM resources, or SSB resources, which are included in the resource set configured in resource setting referred to by report setting for the CSI report of the terminal configured through higher-layer signaling, CSI-RS resources, CSI-IM resources, or SSB resources, which are referred to by a CSI report trigger state including a parameter for the corresponding CSI report, or CSI-RS resources, CSI-IM resources, or SSB resources, which care indicated by an ID of a Reference Signal (RS) set.

In embodiments of the disclosure, the CSI-RS/CSI-IM/SSB occasion is a time point at which CSI-RS/CSI-IM.SSB resource(s) determined by a combination of a higher-layer configuration or a combination of the higher-layer configuration and DCI triggering are transmitted. For example, as the semi-persistent or periodic CSI-RS resources, a slot transmitted according to a slot period and a slot offset configured through higher-layer signaling is determined, and transmission symbol(s) within the slot are determined with reference to one of resource mapping methods within the slot in [Table 24] according to resource mapping information (resourceMapping). In another example, as the aperiodic CSI-RS resources, a slot transmitted according to a slot offset with the PDCCH including DCI indicating the channel report configured through higher-layer signaling is determined, and transmission symbol(s) within the slot are determined with reference to one of resource mapping methods within the slot in [Table 24] according to resource mapping information (resourceMapping).

The CSI-RS occasion may be determined by independently considering the time point at which each CSI-RS resource is transmitted or considering together time points at which one or more CSI-RS resource(s) included in the resource set are transmitted, and accordingly two interpretations below are possible for the CSI-RS occasion according to each resource set.

Interpretation 1-1: from a start point of the earliest symbol to an end point of the latest symbol in which one specific resource is transmitted among one or more CSI-RS resources included in resource set(s) configured in resource set referred to by report setting configured for the CSI report Interpretation 1-2: from a start point of the earliest symbol in which CSI-RS resources transmitted at the earliest time point are transmitted to an end point of the latest symbol in which CSI-RS resources transmitted at the latest time point are transmitted among all CSI-RS resources included in resource set(s) configured in resource setting referred to by report setting configured for the CSI report Hereinafter, embodiments of the disclosure, the individual application is possible in consideration of the two interpretations for the CSI-RS occasion. Further, like in the case of the CSI-RS occasion, both the two interpretations can be considered for the CSI-IM occasion and the SSB occasion, but the principle is similar to the above description, and the us an overlapping description is omitted hereinafter.

In embodiments of the disclosure, "the CSI-RS/CSI-IM/SSB occasion for CSI report #X transmitted in uplink slot n'" is a set of the CSI-RS occasion, the CSI-IM occasion, and the SSB occasion which are not later than CSI reference resources of CSI report #X transmitted in uplink slot n' among CSI-RS occasions, CSI-IM occasions, and SSB occasions of CSI-RS resources, CSI-IM resources, and SSB resources included in the resource set configured in resource setting referred to by report setting configured for CSI report #X.

In embodiments of the disclosure, the "latest CSI-RS/CSI-IM/SSB occasion among the CSI-RS/CSI-IM/SSB occasions for CSI report #X transmitted in uplink slot n'" can have two interpretations below.

Interpretation 2-1: a set of occasions including the latest CSI-RS occasion among CSI-RS occasions for CSI report #X transmitted in uplink slot n', the latest CSI-IM occasion among CSI-RS occasions for CSI report #X transmitted in uplink slot n', and the latest SSB occasion among SSB occasions for CSI report #X transmitted in uplink slot n'

Interpretation 2-2: the latest occasion among all of the CSI-RS occasions, the CSI-IM occasions, and the SSB occasions for CSI report #X transmitted in uplink slot n'

In embodiments of the disclosure, the individual application is possible in consideration of both the two interpretations for the "latest CSI-RS/CSI-IM/SSB occasion among the CSI-RS/CSI-IM/SSB occasions for CSI report #X transmitted in uplink slot n'". When the two interpretations (interpretation 1-1 and interpretation 1-2) are considered for the CSI-RS occasion, the CSI-IM occasion, and the SSB occasion, the "latest CSI-RS/CSI-IM/SSB occasion among the CSI-RS/CSI-IM/SSB occasions for CSI report #X transmitted in uplink slot n'" can be individually applied in consideration of all of four different interpretations (the application of interpretation 1-1 and interpretation 2-1, the application of interpretation 1-1 and interpretation 2-2, and the application of 1-2 and interpretation 2-1, and the application of interpretation 1-2 and interpretation 2-2) in embodiments of the disclosure.

The BS may indicate the CSI report in consideration of an amount of channel information which can be simultaneously calculated by the terminal for the CSI report, that is, the number of channel information computation units (CSI Processing Units (CPUs) of the terminal. When the number of channel information computation units which the terminal can simultaneously calculate is $N_{CPU}$, the terminal may not expect the CSI report indication of the BS which require channel information computations larger than $N_{CPU}$ or may not consider an update of channel information which requires channel information computations larger than $N_{CPU}$. $N_{CPU}$ may be reported to the BS by the terminal through higher-layer signaling or may be configured by the BS through higher-layer signaling.

It is assumed that the CSI report indicated to the terminal by the BS occupies some or all of the CPUs for channel information computation among the total number $N_{CPU}$ of pieces of channel information which can be simultaneously calculated by the terminal. When the number of channel information computation units required for each CSI report, for example, CSI report n (n=0, 1, . . . , N–1) is $O_{CPU}^{(n)}$, the number of channel information computation units required for a total of N CSI reports may be $\Sigma_{n=0}^{N-1} O_{CPU}^{(n)}$. The channel information computation units required for each reportQuantity configured in the CSI report may be configured as shown in Table 28 below.

TABLE 28

$O_{CPU}^{(n)} = 0$ : reportQuantity configured in CSI report is configured as "none" and trs-Info is configured in CSI-RS resource set connected to CSI report
    $O_{CPU}^{(n)} = 1$ : reportQuantity configured in CSI report is configured as "none", "cri-RSRP", or "ssb-Index-RSRP" and trs-Info is not configured in CSI-RS resource set connected to CSI report
    reportQuantity configured in CSI report is configured as "cri-RI-PMI-CQI", "cri-RI-i1", "cri-RI-i1-CQI", "cri-RI-CQI", or "cri-RI-LI-PMI-CQI"
    >> $O_{CPU}^{(n)} = N_{CPU}$ : aperiodic CSI report is triggered and corresponding CSI report is not multiplexed with one or all of TB/HARQ-ACK; corresponding CSI report is wideband CSI, corresponds to maximum of 4 CSI-RS ports, and corresponds to a single resources having no CSI report, wherein codebookType corresponds to "typeI-SinglePanel" or reportQuantity corresponds to "cri-RI-CQI".
    (corresponding case may be the case corresponding to requirement 1 described above in which terminal rapidly calculates an available CPU by using CSI and report the same)
    >> $O_{CPU}^{(n)} = K_s$: all the remaining cases expect for the above cases; $K_s$ indicates number of CSI-RS resources within CSI-RS resource set for channel measurement.

When the number of channel information computations required by the terminal for a plurality of CSI reports at a specific time point is larger than the number $N_{CPU}$ of channel information computation units which can be simultaneously calculated by the terminal, the terminal may not consider an update of channel information for some CSI reports. Among the plurality of indicated CSI reports, a CSI report which does not consider the update of the channel information is determined in consideration of a time during which channel information computation required for at least one the CSI report occupies the CPU and a priority of the reported channel information. For example, the update of channel information for the CSI report starting at the latest time point of the time during which channel information computation required for the CSI report occupies the CPU may not be considered and the update of channel information may not be preferentially considered for the CSI report having a low priority of channel information.

The priority of the channel information may be determined with reference to Table 29 below.

TABLE 29

CSI priority value $Pri_{iCSI}(y, k, c, s) = 2 \cdot N_{cells} \cdot M_s \cdot y + N_{cells} \cdot M_s \cdot k + M_s \cdot c + s$
    $y = 0$ in aperiodic CSI report transmitted through PUSCH, $y = 1$ in semi-persistent CSI report transmitted through PUSCH, y = 2 in semi-persistent CSI report transmitted through PUCCH, and $y = 3$ in periodic CSI report transmitted through PUCCH
    $k = 0$ when CSI report includes L1-RSRP and $k = 1$ when CSI report does not include L1-RSPR
    c: serving cell index, $N_{cells}$ : maximum number of serving cells (maxNrofServingCells) configured through higher-layer signaling;
    s: CSI report configuration index reportConfigID), $M_s$: maximum number of CSI report configurations (maxNrofCSI-ReportConfigurations) configured through higher-layer signaling The CSI priority for the CSI report is determined through the priority value PriiCSI(y,k,c,s) in Table 29. Referring to Table 29, the CSI priority value is determined through a type of channel information included in the CSI report, a time axis report characteristic of the CSI report (aperiodic, semi-persistent, periodic), a channel (PUSCH or PUCCH) in which the CSI report is transmitted, a serving cell index, or a CSI report configuration index. In the CSI priority for the CSI report, priority values PriiCSI(y,k,c,s) are compared and it is determined that a CSI priority for the CSI report having a smaller priority value is higher.

When a time occupying the CPU is a CPU occupation time on the basis of channel occupation computation required for the CSI report which the BS indicates to the terminal, the CPU occupation time is determined in consideration of some of all of a type of channel information included in the CSI report (report quantity), a time axis characteristic of the CSI report (aperiodic, semi-persistent, periodic), a slot or a symbol occupied by higher-layer signaling or DCI indicating the CSI report, and a slot or a symbol occupied by a reference signal for channel state measurement.

In a CPU occupation time for an aperiodic CSI report in which the report quantity included in the CSI report is not configured as "none" according to some embodiments of the disclosure, when the BS indicates transmission of aperiodic CSI report #X in uplink slot n' through DCI using DCI format 0_1, the CPU occupation time for CSI report #X transmitted in uplink slot n' may be defined as symbols from a symbol next to the last symbol occupied by the PDCCH including DCI indicating aperiodic CSI report #X to the last symbol occupied by the PUSCH including CSI report #X transmitted in uplink slot n'.

In a CPU occupation time for a periodic or semi-persistent CSI report in which the report quantity is not configured as "none" included in the CSI report according to some embodiments of the disclosure, when the BS indicates transmission of periodic or semi-persistent CSI report #X in uplink slot n' through higher-layer signaling or DCI using DCI format 0_1 scrambled by an SP-CSI-RNTI, the CPU occupation time for CSI report #X transmitted in uplink slot n' may be defined as symbols from a first symbol of the first transmitted CSI-RS/CSI-IM/SSB resource corresponding to the last CSI-RS/CSI-IM/SSB occasion among CSI-RS/CSI-IM/SSB occasions for CSI report #X transmitted in uplink slot n' to the last symbol occupied by the PUCCH or the PUSCH including CSI report #X transmitted in uplink slot n', and the last CSI-RS/CSI-IM/SSB occasion may not be located after the CSI reference resource for CSI report #X. Exceptionally, when the BS indicates a semi-persistent CSI report through DCI and the terminal performs a first CSI report of semi-persistent CSI report #X, a CPU occupation time for the first CSI report may be defined as symbol from a symbol next to the last symbol occupied by the PDCCH including DCI indicating semi-persistent CSI report #X to the last symbol occupied by the PUSCH including the first CSI report. Accordingly, the operation causality in the time axis of the terminal may be guaranteed in consideration of a time point at which the CSI report is indicated and a time point at which the CPU occupation time starts.

For example, it may comply with the rule shown in Table 30.

TABLE 30

For a CSI report with CSI-ReportConfig with higher layer parameter reportQuantity not set to 'none', the CPU(s) are occupied for a number of OFDM symbols as follows:
    A periodic or semi-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the PUSCH/PUCCH carrying the report.
    An aperiodic CSI report occupies CPU(s) from the first symbol after the PDCCH triggering the CSI report until the last symbol of the PUSCH carrying the report.
    An initial semi-persistent CSI report on PUSCH after the PDCCH trigger occupies CPU(s) from the first symbol after the PDCCH until the last symbol of the PUSCH carrying the report.

In a CPU occupation time for an aperiodic CSI report in which the report quantity included in the CSI report is configured as "none" according to some embodiments of the disclosure, when the BS indicates transmission of aperiodic CSI report #X in uplink slot n' through DCI using DCI format 0_1, the CPU occupation time for CSI report #X transmitted in uplink slot n' may be defined as symbols from a symbol next to the last symbol occupied by the PDCCH including DCI indicating aperiodic CSI report #X to a symbol ending CSI computation. The symbol ending the CSI computation is the latest symbol among a symbol after the CSI computation time Z of the last symbol occupied by the PDCCH including DCI indicating CSI report #X and a symbol after the CSI computation time Z' of the last symbol of the most recent CSI-RS/CSI-IM/SSB occasion for CSI report #X transmitted in uplink slot n'.

In a CPU occupation time for a periodic or semi-persistent CSI report in which the report quantity is configured as "none" included in the CSI report according to some embodiments of the disclosure, when the BS indicates transmission of periodic or semi-persistent CSI report #X in uplink slot n' through higher-layer signaling or DCI using DCI format 0_1 scrambled by an SP-CSI-RNTI, the CPU occupation time for CSI report #X transmitted in uplink slot n' may be defined as symbols from a first symbol of the first transmitted CSI-RS/CSI-IM/SSB resource corresponding to each CSI-RS/CSI-IM/SSB occasion for CSI report #X transmitted in uplink slot n' to a symbol after the CSI computation time Z' of the last symbol of the last transmitted CSI-RS/CSI-IM/SSB resource.

For example, it may comply with the rule shown in Table 31.

TABLE 31

For a CSI report with CSI-ReportConfig with higher layer parameter reportQuantity set to 'none' and CSI-RS-ResourceSet with higher layer parameter trs-Info is not configured, the CPU(s) are occupied for a number of OFDM symbols as follows:
    A semi-persistent CSI report (excluding an initial semi-persistent CSI report on PUSCH after the PDCCH triggering the report) occupies CPU(s) from the first symbol of the earliest one of each transmission occasion of periodic or semi-persistent CSI-RS/SSB resource for channel measurement for L1-RSRP computation, until $Z_3'$ symbols after the last symbol of the latest one of the CSI-RS/SSB resource for channel measurement for L1-RSRP computation in each transmission occasion.
    An aperiodic CSI report occupies CPU(s) from the first symbol after the PDCCH triggering the CSI report until the last symbol between $Z_3$ symbols after the first symbol after the PDCCH triggering the CSI report and $Z_3'$ symbols after the last symbol of the latest one of each CSI-RS/SSB resource for channel measurement for L1-RSRP computation.

Hereinafter, CSI-RS resources configured for the purpose of tracking (that is, when a CSI-RS resource set is configured as trs-Info) may be referred to as Tracking RS (TRS). The TRS may have the following characteristic.
- For a periodic TRS, the TRS may be QCLed with an SS/PBCH block in an aspect of QCL-TypeC or QCL-TypeD or
- The periodic TRS may be QCLed with an SSB in an aspect of QCL-TypeC and may be QCLed with an NZP-CSI-RS configured as "repetition" in an aspect of QCL-TypeD.
- An aperiodic TRS may be QCLed with the periodic TRS.
- The terminal should assume the same port index for all CSI-RS resources configured as the TRS within the same CSI-RS resource set.

CSI-RS resources within the CSI-RS resource set configured as the TRS may be all configured to have the same period, bandwidth, and subcarrier location.

Figure 16:
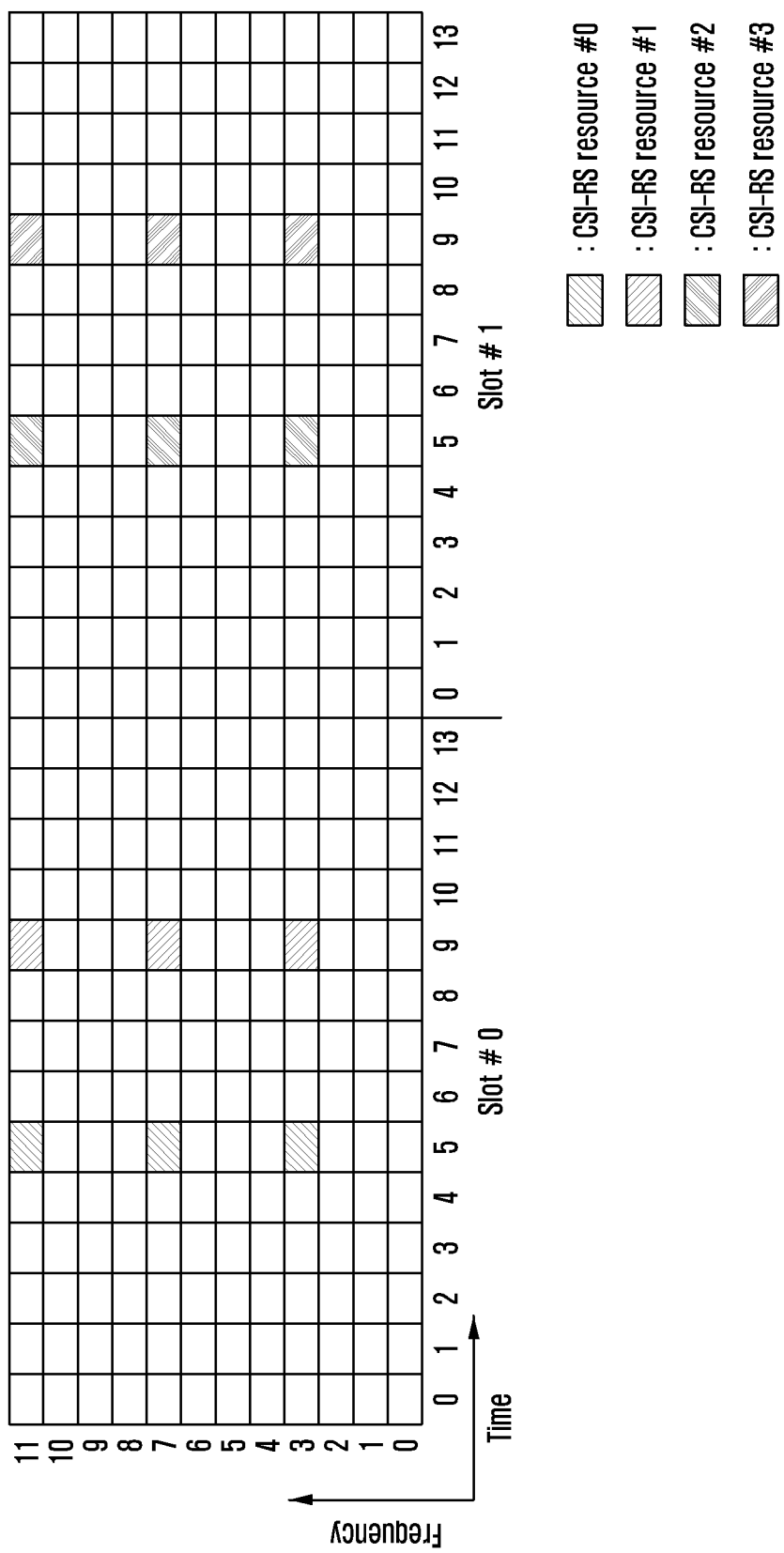
FIG. 16 illustrates an example of a method of transmitting a reference signal in a wireless communication system according to an embodiment of the disclosure.

FIG. 16 illustrates an example of a method of transmitting a reference signal in a wireless communication system according to an embodiment of the disclosure. Specifically, referring to FIG. 16, it illustrates an example of mapping of CSI-RS resources configured as a TRS. A detailed description is made below with reference to the drawings.

Four CSI-RS resources corresponding to the TRS may be periodically transmitted in two successive slots in a low frequency area (for example, a band equal to or lower than 6 GHz or frequency range 1).

Two CSI-RS resources corresponding to the TRS may be periodically transmitted in on slot or four CSI-RS resources may be periodically transmitted in two successive slots in a high frequency area (for example, a band higher than or equal to 6 GHz or frequency range 2).

CSI-RS resources configured as the TRS may be transmitted in a frequency area, that is, 3REs per RB (this may correspond to density 3).

Figure 17:
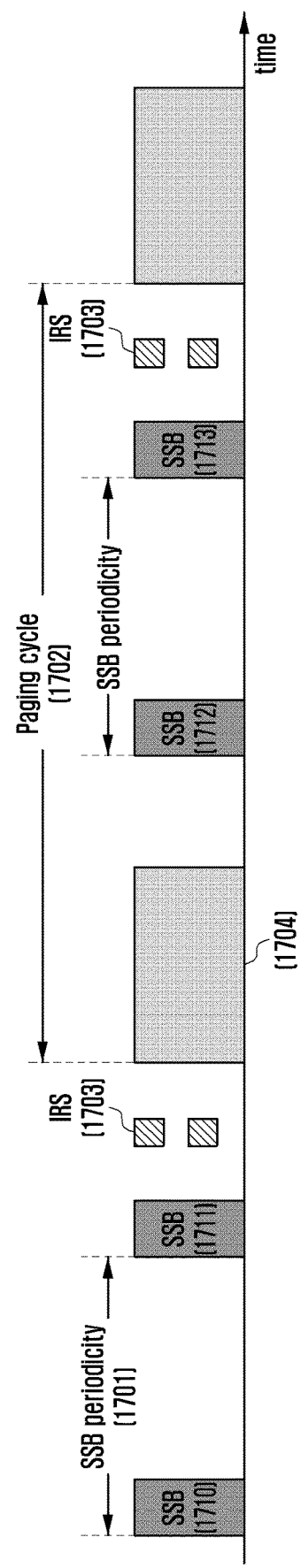
FIG. 17 illustrates an example of a method of transmitting a reference signal in a wireless communication system according to an embodiment of the disclosure.

FIG. 17 illustrates an example of a method of transmitting a reference signal in a wireless communication system according to various an of the disclosure.

As described above, in the wireless communication system, the BS may transmit paging in order to wake up the terminal in the idle mode or the inactive mode. The BS may transmit a PDCCH and a PDSCH for paging to the terminal. The terminal may receive configuration information for monitoring the PDCCH for paging from the BS and determine a paging frame and a paging occasion on the basis of the corresponding configuration information. The terminal may monitor the PDCCH for paging in one or a plurality of PDCCH monitoring occasions within the paging occasion. At this time, in order to decode the paging PDCCH and the paging PDSCH, the terminal may need a series of advance operations (for example, time and frequency synchronization operation or the like) and need to monitor a predetermined reference signal therefor.

Referring to FIG. 17, a terminal in an idle/inactive state may monitor paging according to a specific period 1702 (paging cycle). At this time, for decoding of the paging PDCCH and the paging PDSCH, an SS/PBCH Block (SSB) may be additionally monitored and an advance operation for decoding a physical layer channel thereafter may be performed (for example, time and frequency synchronization operation or the like). The terminal in the idle/inactive mode may assume that SSBs 1710 to 1713 are transmitted according to a specific cycle (e.g., SSB periodicity 1701). Accordingly, after waking up before the paging occasion 1704, monitoring the SSBs 1710 and 1711, and performing the advance operation, the terminal may decode the paging PDCCH and the paging PDSCH in the paging occasion 1704 thereafter. As illustrated in the series of processes, when monitoring paging in a predetermined occasion, the terminal is required to wake up more times in order to monitor the SSB, and accordingly power consumption of the terminal may increase. Particularly, when the paging cycle 1702 and the SSB periodicity 1701 are not aligned, the number of times the terminal wakes up for SSB monitoring may further increase, and when paging decoding thereafter is performed on the basis of the advance operation (for example, time and frequency synchronization) performed by SSB monitoring, performance deterioration may be generated.

As a method of solving the problem, a method of additionally transmitting a reference signal for the advance operation of the terminal in the idle mode or the inactive mode may be considered.

Referring to FIG. 17, the BS may additionally configure and transmit the reference signal 1703 to the terminal, and the terminal may receive the reference signal 1703 on the basis of the BS configuration and perform the advance operation on the basis thereof, and then perform the operation of decoding the paging PDCCH and the paging PDSCH. When the reference signal 1703 is more flexibly configured than the SSB 1710, it is possible to perform optimized transmission and reception in order to minimize power consumption of the terminal (that is, to minimize the number of times the terminal wakes up to monitor the reference signal 1703 and improve the performance of the advance operation (time and frequency synchronization). However, there is a disadvantage of increasing overhead of configuration information transmission in order to secure configuration flexibility of the reference signal 1703. A method of transmitting and receiving the reference signal 1703 considering the trade-off is needed.

The disclosure proposes various embodiments of a method of effectively transmitting and receiving a reference signal in idle and inactive modes.

Hereinafter, higher-layer signaling may be signaling corresponding to at least one of the following signalings or a combination of one or more thereof.

MIB (Master Information Block)
SIB (System Information Block) or SIB X (X=1, 2, . . . )
RRC (Radio Resource Control)
MAC (Medium Access Control) CE (Control Element)
UE Capability Reporting
UE assistance information or message L1 signaling may be signaling corresponding to at least one of the following physical layer channels or signaling methods or a combination of one or more thereof.

PDCCH (Physical Downlink Control Channel)
DCI (Downlink Control Information)
UE-specific DCI
Group common DCI
Common DCI
Scheduling DCI (for example, DCI used for scheduling downlink or uplink data)
Non-scheduling DCI (for example, DCI other than DCI used for scheduling downlink or uplink data)
PUCCH (Physical Uplink Control Channel)
UCI (Uplink Control Information)

Hereinafter, definition of each mathematical operator is described below.

floor(X): function outputting largest number among integers smaller than X
ceil(X): function outputting smallest number among integers larger than X
A mod B: function outputting remainder obtained by dividing A by B (modulo operator)
max(X,Y): function outputting larger number among X and Y
min(X,Y): function outputting smaller number among X and Y In the disclosure, a reference signal used in the idle/inactive mode is named an IRS. The IRS may be configured on the basis of a TRS, a CSI-RS, or a predetermined RS, or a TRS or a CSI-RS transmitted in the idle/inactive mode may be named an IRS. Accordingly, a reference signal denoted as IRS may be understood as being replaced with TRS or CSI-RS in the disclosure.

In an embodiment of the disclosure, the BS may configure various pieces of information on the IRS in the terminal through higher-layer signaling (for example, MIB, SIB, or RRC). The configuration information may include, for example, the following information.

IRS-ResourceId: IRS resource index
    resourceMapping: resource mapping information of IRS resource
    powerControlOffset: ratio between PDSCH Energy Per RE (EPRE) and IRS EPRE
    powerControlOffsetSS: ratio between SS/PBCH block EPRE and IRS EPRE
    scramblingID: scrambling index of IRS sequence
    periodicityAndOffset: transmission period of IRS resource and slot offset
    qcl-InfoPeriodicIRS: TCI-state information if corresponding IRS is periodic IRS All or some of the configuration information of the IRS may be explicitly configured, may follow a predefined value, or may be implicitly determined on the basis of various system parameter values. The terminal may perform reception and monitoring operations of the corresponding IRS on the basis of explicit configuration information, implicit configuration information, and predefined parameter values of the BS.

A detailed description of configuring, transmitting, and receiving the IRS is made through various embodiments of the disclosure.

In a description of an embodiment of the disclosure, the idle or inactive state is collectively named an idle mode, and a connected state is named a connected mode.

<Embodiment 1> Method of Determining Whether IRS is Transmitted

<Embodiment 1> of the disclosure proposes an IRS configuration method and an IRS transmission/reception method based on various modes or types.

In an embodiment of the disclosure, the BS may provide configuration information for the IRS for terminals in the idle mode through higher-layer signaling. The configuration information for the IRS may include various pieces of configuration information required to monitor the corresponding IRS by the terminal. For example, the following information may be included.

IRS-ResourceId: IRS resource index
    resourceMapping: resource mapping information of IRS resource
    powerControlOffset: ratio between PDSCH Energy Per RE (EPRE) and IRS EPRE
    powerControlOffsetSS: ratio between SS/PBCH block EPRE and IRS EPRE
    scramblingID: scrambling index of IRS sequence
    periodicityAndOffset: transmission period of IRS resource and slot offset
    qcl-InfoPeriodicIRS: TCI-state information if corresponding IRS is periodic IRS The terminal may monitor the corresponding IRS on the basis of the configuration information for the IRS received from the BS and perform the following operations or functions on the basis of the received IRS.

Function #1 (or use #1) time and frequency synchronization
        For example, time and frequency tracking
        For example, time and frequency offset estimation
    Function #2 (or use #2) Adaptive Gain Control (AGC)
    Function #3 (or use #3) signal quality measurement
        For example, measurement of signal quality for serving cell or neighboring cell for cell selection or reselection
        For example, measurement of signal quality for serving cell or neighboring cell for Radio Resource Management (RRM)
    Function #4 (or use #4) operation related to paging monitoring
        For example, it is determined whether to monitor a paging PDCCH
        For example, it is determined whether to decode a paging PDSCH Whether to support the operations or functions of the terminal according to IRS monitoring may be explicitly informed to the terminal by the BS through higher-layer signaling or L1 signaling or may be implicitly determined on the basis of configured other system information or another situation.

Embodiment 1-1

In an embodiment of the disclosure, the BS may transmit configuration information for an IRS to the terminal, and the terminal may monitor the IRS in an IRS occasion configured on the basis of the configuration information of the BS. At this time, the BS may or may not actually transmit an RS in the IRS occasion according to various situations. For example, in order to reduce overhead according to RS transmission of the network, the BS may share the RS (for example, CSI-RS or TRS transmitted for a connected-mode terminal) for the connected-mode terminal and the RS (for example, IRS transmitted for an idle-mode terminal) for the idle-mode terminal. That is, the connected-mode terminal and the idle-mode terminal may receive the same RS transmitted from the BS in the same RS transmission occasion. At this time, the BS may or may not transmit the RS for the connected-mode terminal in the corresponding RS transmission occasion. Accordingly, the idle-mode terminal may or may not receive the RS in the corresponding RS transmission occasion.

In an embodiment of the disclosure, the BS may not further inform the terminal of whether the RS is actually transmitted in the configured IRS transmission occasion. That is, the terminal may not know in advance whether the RS is actually transmitted in the configured IRS transmission occasion. In this case, as an operation for receiving the RS in the configured IRS transmission occasion, the terminal may perform one operation or a combination of one or more operation among the following operations.

[Operation-1]

The terminal may receive an RS on the basis of the assumption that the RS is always transmitted in the configured IRS transmission occasion. That is, the terminal may receive the RS regardless of whether the BS actually transmits the RS in the configured IRS transmission occasion and perform various additional operations or functions (for example, all or some of function #1, function #2, function #3, and function #4) on the basis of the received RS. In this case, the terminal may correctly perform the operations or functions if the BS actually transmitted the RS in the configured IRS transmission occasion, and may not correctly perform the operations or functions if the BS did not actually transmit the RS in the configured IRS transmission occasion. For example, when the terminal desires to perform time and frequency synchronization using the IRS, the terminal may correctly perform the time and frequency synchronization if the RS was actually transmitted in the configured IRS transmission occasion, and may not correctly perform the time and frequency synchronization if the RS was not actually transmitted in the configured IRS transmission occasion. However, in this case, the terminal may not recognize whether the operations or functions are correctly performed.

[Operation-2]

The terminal may determine whether the RS is transmitted in the configured IRS transmission occasion through blind detection and, when it is determined that the RS was transmitted, may perform various additional operations or functions (for example, all or some of function #1, function #2, function #3, and function #4) on the basis of the received RS. The blind detection may correspond to, for example, a procedure in which the terminal performs energy detection for the RS in the configured IRS transmission occasion and determines that the corresponding RS was transmitted when energy higher than or equal to a specific threshold value is detected and determines that the corresponding RS was not transmitted when energy equal to or lower than the specific threshold value is detected. In this case, for the RS which may or may not be transmitted, the terminal may avoid a series of additional operations or functions which may be incorrectly performed when the corresponding RS was not transmitted but also should perform blind detection for RS reception, and thus additionally power consumption may be generated.

Operation-1 and Operation-2 may correspond to examples and there may be a terminal reception operation of more various methods.

Embodiment 1-2

According to <Embodiment 1-1>, after configuring the IRS in the terminal, the BS may or may not actually transmit the RS in the configured IRS occasion. If the terminal does not know whether the RS was actually transmitted, Operation-1 or Operation-2 may be performed and, accordingly, the problem described in each operation may occur.

Accordingly, in an embodiment of the disclosure, the BS may additionally inform the terminal of whether the RS was or was not actually transmitted in the configured IRS transmission occasion. For example, the BS may explicitly inform the terminal of whether the IRS transmission is performed (availability) through higher-layer signaling or L1 signaling (here, signaling through which whether IRS transmission is performed is informed may be referred to as an "an indicator indicating whether RS transmission is performed (availability indicator)"). In another example, the terminal may determine whether the IRS transmission is performed through blind detection. In another example, the terminal may implicitly determine whether IRS transmission is performed on the basis of another system parameter or function.

In an embodiment of the disclosure, the BS may semi-statically configure whether the RS is actually transmitted in the configured IRS transmission occasion in the terminal through higher-layer signaling (for example, MIB, SIB1, SIBX (X=2, 3, 4, . . . ), RRC, and the like). That is, the BS may transmit the "RS transmission availability indicator" to the terminal through higher-layer signaling. The terminal may receive configuration information for the IRS from the BS and additionally receive the IRS transmission availability indicator through higher-layer signaling. More specifically, the terminal may receive configuration information for the IRS from the BS, additionally receive the "RS transmission availability indicator" through higher-layer signaling, and if the "RS transmission availability indicator" indicates that the RS is transmitted in the corresponding IRS occasion, perform monitoring on the basis of the assumption that the RS is transmitted in the corresponding IRS occasion. Alternatively, the terminal may receive configuration information for the IRS from the BS, additionally receive the "RS transmission availability indicator" through higher-layer signaling, and if the "RS transmission availability indicator" indicates that the RS is not transmitted in the corresponding IRS occasion, not perform monitoring on the basis of the assumption that the RS is not transmitted in the corresponding IRS occasion. At this time, when the terminal does not additionally receive the "RS transmission availability indicator", it may be assumed that transmission (or non-transmission) of the RS in the configuration IRS occasion is a default operation. Alternatively, it may be assumed that Operation-1 or Operation-2 of <Embodiment 1-1> is a default operation on the basis of the assumption that the RS may or may not be transmitted in the configured IRS occasion. After receiving the "RS transmission availability indicator", the terminal may determine that the RS is transmitted or is not transmitted in an IRS occasion corresponding to a specific time interval (T_RS) on the basis of the content in the "RS transmission availability indicator". It may be assumed that transmission (or non-transmission) of the RS in the configured IRS occasion is a default operation in IRS occasions after the specific time interval (T_RS). The specific time interval to which the content of the "RS transmission availability indicator" is applied may correspond to a predefined fixed value, may be pre-configured through higher-layer signaling, or may be configured in the terminal through the "RS transmission availability indicator".

In an embodiment of the disclosure, the BS may indicate whether the RS is actually transmitted in the pre-configured IRS transmission occasion through L1 signaling (for example, DCI, a paging PDCCH (or a DCI format equally scrambled by a P-RNTI), a paging PDSCH (or a PDSCH equally scrambled by a P-RNTI or a PDSCH scheduled by a DCI format scrambled by a P-RNTI), or the like). More specifically, the terminal may receive configuration information for the IRS from the BS, additionally receive the "RS transmission availability indicator" through L1 signaling, and if the "RS transmission availability indicator" indicates that the RS is transmitted in any IRS occasion, perform monitoring on the basis of the assumption that the RS is transmitted in the corresponding IRS occasion. Alternatively, if the "RS transmission availability indicator" indicates that the RS is not transmitted in any IRS occasion, the terminal may not perform monitoring on the basis of the assumption that the RS is not transmitted in the corresponding IRS occasion. At this time, when the terminal does not additionally receive the "RS transmission availability indicator", it may be assumed that transmission (or non-transmission) of the RS in the configuration IRS occasion is a default operation. Alternatively, it may be assumed that Operation-1 or Operation-2 of <Embodiment 1-1> is a default operation on the basis of the assumption that the RS may or may not be transmitted in the configured IRS occasion. After receiving the "RS transmission availability indicator", the terminal may determine that the RS is transmitted or is not transmitted in an IRS occasion corresponding to a specific time interval (T_RS) on the basis of the content in the "RS transmission availability indicator". The IRS occasion corresponding to the specific time interval (T_RS) may correspond to, for example, IRS transmission occasion(s) associated with a paging cycle (or paging occasion) after reception of DCI including the "RS transmission availability indicator" or IRS occasion(s) corresponding to a predetermined time interval after reception of DCI including the "RS transmission availability indicator". It may be assumed that transmission (or non-transmission) of the RS in the configured IRS occasion is a default operation in IRS occasions after the specific time interval (T_RS).

In an embodiment of the disclosure, the BS may control whether to transmit or not transmit the "RS transmission availability indicator" to the terminal through a higher-layer signaling configuration. That is, the terminal may or may not expect additional transmission of the "RS transmission availability indicator" according to the configuration of the BS. If the BS configures additional transmission of the "RS transmission availability indicator", the terminal may expect additional reception of the "RS transmission availability indicator". The terminal may determine whether the RS is transmitted in the pre-configured IRS transmission occasion on the basis of the "RS transmission availability indicator" and accordingly, may differently control an operation of monitoring the IRS occasion. If the BS does not configure additional transmission of the "RS transmission availability indicator" or may configure not to additionally transmit the "RS transmission availability indicator", the terminal may not except additional reception of "RS transmission availability indicator". At this time, the terminal may assume that transmission (or non-transmission) of the RS in the pre-configured IRS occasion is a default operation. Alternatively, it may be assumed that Operation-1 or Operation-2 of <Embodiment 1-1> is a default operation on the basis of the assumption that the RS may or may not be transmitted in the configured IRS occasion. Accordingly, the terminal may differently control whether or not to monitor the pre-configured IRS occasion.

Embodiment 1-3

According to <Embodiment 1-1>, after configuring the IRS in the terminal, the BS may or may not actually transmit the RS in the configured IRS occasion. If the terminal does not know whether the RS was actually transmitted, Operation-1 or Operation-2 may be performed and, accordingly, the problem described in each operation may occur. According to <Embodiment 1-2> of the disclosure, when the BS additionally transmits the "RS transmission availability indicator" to the terminal, signaling overhead of the network may increase. Unlike this, if the BS configures the IRS in the terminal and the terminal always expect RS transmission in the configured IRS occasion, RS transmission overhead of the network may increase. The disclosure proposes a method of controlling IRS transmission on the basis of the configuration of the BS in consideration of such trade-off.

In an embodiment of the disclosure, two types (or modes) of IRS transmission/reception methods are considered.

[IRS Type A]
The BS may always transmit the RS to the terminal in the configured IRS occasion.
The terminal may assume that the RS is always transmitted in the configured IRS occasion.

[IRS Type B]
The BS may or may not transmit the RS to the terminal in the IRS occasion.
The terminal may expect that the RS is transmitted or is not transmitted in the configured IRS occasion.

In an embodiment of the disclosure, when configuring the IRS, the BS may additionally configure the IRS type A or the IRS type B in the terminal. If the BS configures the type A, the terminal may assume that the RS is always transmitted in the configured IRS occasion. If the BS configures the type B, the terminal may assume that the RS is transmitted or is not transmitted in the configured IRS occasion. If information indicating which type among the type A and the type B is configured is not configured in the terminal or is not provided to the terminal, the terminal may consider at least one of the type A or the type B as a default type and accordingly control monitoring of the IRS.

In an embodiment of the disclosure, whether to configure the type A or the type B may be explicitly configured in the terminal by the BS through higher-layer signaling or may be implicitly determined on the basis of another parameter configured in the terminal by the BS. Hereinafter, various examples of the implicit determination method is described. In the following various determination methods, it is noted that conditions for determining the type A or the type B are only for examples and do not limit the scope of the disclosure.

[Implicit Determination Method 1]
Whether to configure the type A or the type B may be determined on the basis of the function or use of the IRS. For example, the terminal may assume the type A when the IRS corresponds to function #X (or use #X), and may assume the type B when the IRS corresponds to function #Y (or use #Y) (see <Embodiment 1-1> for a detailed description of the function and use). For example, the terminal may assume the type A when the IRS is used for time and frequency synchronization and AGC (corresponding to use #1 and use #2 of <Embodiment 1-1>) or for measurement (corresponding to use #3 of <Embodiment 1-1>), and may assume the type B when the IRS is used for indicating paging monitoring (corresponding to use #4 of <Embodiment 1-1>). At this time, the use or function of the IRS may be configured in the terminal through higher-layer signaling or may be implicitly determined on the basis of IRS configuration information.

[Implicit Determination Method 2]
Whether to configure the type A or the type B may be determined on the basis of configuration information of the IRS. For example, the terminal may assume the type A when the IRS configuration corresponds to configuration information #X, and assume the type B when the IRS configuration corresponds to configuration information #Y. For example, when the BS explicitly configures a period and an offset (periodicityAndOffset) in order to configure a monitoring occasion for the IRS, the terminal may assume the type A. Alternatively, when the BS configures a predetermined time interval or window length associated with the paging period (or paging occasion) in order to configure the monitoring occasion for the IRS, the terminal may assume the type B.

[Implicit Determination Method 3]
Whether to configure the type A or the type B may be determined on the basis of configuration information of the "RS transmission availability indicator". For example, when the BS configures transmission of the "RS transmission availability indicator" in the terminal, the terminal may assume the type A. On the other hand, when the BS does not configure transmission of the "RS transmission availability indicator" or configure not to transmit the "RS transmission availability indicator" in the terminal, the terminal may assume the type B. In another example, the terminal may assume the type B when the BS configures transmission of the "RS transmission availability indicator" and may assume the type A when the BS does not configure transmission of the "RS transmission availability indicator" or configures not to transmit the "RS transmission availability indicator" in the terminal.

[Implicit Determination Method 4]

Whether to configure the type A or the type B may be determined on the basis of configuration information of the IRS. For example, it may be determined on the basis of configuration information of a transmission period of the IRS. For example, the terminal may assume the type A when the transmission period of the IRS is configured to be higher than or equal to X ms, and may assume the type B when the transmission period of the IRS is configured to be equal or lower than X ms. In another example, the terminal may assume the type A when the transmission period of the IRS is configured to be equal to or lower than X ms, and may assume the type B when the transmission period of the IRS is configured to be higher than or equal to X ms.

[Implicit Determination Method 5]

Whether to configure the type A or the type B may be determined on the basis of configuration information of paging. For example, it may be determined on the basis of configuration information of a paging cycle (that is, a paging period). For example, the terminal may assume the type A when the paging period is configured to be higher than or equal to X ms, and may assume the type B when the paging period is configured to equal to or lower than X ms. In another example, the terminal may assume the type A when the paging period is configured to be equal to or lower than X ms, and may assume the type B when the paging period is configured to higher than or equal to X ms.

In an embodiment of the disclosure, the terminal may monitor the IRS on the basis of, for example, Operation-1 of <Embodiment 1-1> for the IRS type A, or monitor the IRS on the basis of, for example, Operation-2 of <Embodiment 1-1> or monitor the IRS on the basis of <Embodiment 1-2> for the IRS type B.

In another example, in an embodiment of the disclosure, the BS may additionally transmit the "RS transmission availability indicator" to the terminal and the terminal may monitor the IRS on the basis of the content of the "RS transmission availability indicator" for the IRS type B (see <Embodiment 1-2>).

In an embodiment of the disclosure, <Embodiment 1-1>, <Embodiment 1-2>, and <Embodiment 1-3> may be combined and implemented.

<Embodiment 2> Use Configuration Method

As described in <Embodiment 1-1> of the disclosure, the IRS may be used for various purposes. In other words, the IRS may be used for the purposes associated with the following operations of the terminal.

Function #1 (or use #1) time and frequency synchronization

For example, time and frequency tracking

For example, time and frequency offset estimation

Function #2 (or use #2) Adaptive Gain Control (AGC)

Function #3 (or use #3) signal quality measurement

For example, measurement of signal quality for serving cell or neighboring cell for cell selection or reselection For example, measurement of signal quality for serving cell or neighboring cell for Radio Resource Management (RRM)

Function #4 (or use #4) operation related to paging monitoring

For example, it is determined whether to monitor a paging PDCCH

For example, it is determined whether to decode a paging PDSCH

A characteristic required for IRS transmission and reception may vary depending on the use of the IRS. <Embodiment 2> of the disclosure proposes a method by which the BS and the terminal differently control IRS transmission and reception according to the use of the IRS.

According to an embodiment of the disclosure, the BS may explicitly inform the terminal for what the IRS is used through higher-layer signaling. For example, the IRS may be configured for one or a plurality of use #1, use #2, use #3, and use #4. If the terminal does not explicitly receive a configuration of configuration information for the use from the BS, the terminal may assume that one of the uses (for example, use #1 or use #2) is a default use.

In an embodiment of the disclosure, combinations of specific uses for the IRS may be or may not be simultaneously configured. For example, the BS may simultaneously configure use #1, use #2, and use #3 in the terminal. In another example, the BS cannot simultaneously configure use #3 and use #4 in the terminal. If the IRS is used for use #3, the corresponding IRS may be required to be periodically transmitted for measurement. On the other hand, if the IRS is configured for use #4, the corresponding IRS may be or may not be transmitted for the purpose of indicating whether paging monitoring transmission is performed (or example, the terminal may perform an operation of monitoring paging when the IRS is transmitted and may not perform the operation of monitoring paging when the IRS is not transmitted). Accordingly, a transmission scheme of the IRS may vary depending on use #3 or use #4, and thus it is inappropriate to simultaneously configure use #3 and use #4.

In an embodiment of the disclosure, it may be assumed that a specific use is a default use. For example, use #1 and use #2 may correspond to uses that may be basically assumed by the terminal without any additional signaling.

In an embodiment of the disclosure, the BS may configure the use only for a specific use through additional signaling. For example, the BS may inform the terminal whether use #3 and use #4 are supported through additional signaling.

In an embodiment of the disclosure, the BS may configure one or a plurality of IRSs, and the use may be configured for each IRS. For example, the terminal may use #3 for IRS #1 and configure use #4 for IRS #2. Accordingly, the terminal may monitor one or a plurality of IRSs.

In an embodiment of the disclosure, configuration information of the IRS may be configured in different schemes according to the use configured in the IRS. For example, when the IRS is configured for use #1, use #2, or use #3, a period and an offset (periodicityAndOffset) may be explicitly configured to configure a monitoring occasion of the IRS, and accordingly the terminal may determine the IRS occasion. In another example, when the RIS is configured for use #4, an offset and a time interval (T_win) from the paging occasion may be configured to configure the monitoring occasion of the IRS. The terminal may determine the monitoring occasion for the IRS on the basis of configuration information for paging and configuration information for the offset and the time interval. For example, the terminal may determine that a time area corresponding to a time interval configured as T_win from a time point ahead of the paging occasion of a specific paging cycle by an offset is the IRS occasion or determine IRS occasion(s) existing in the corresponding time area is the valid IRS occasion. This is because, when the IRS is used for indicating whether paging monitoring is performed, it may be efficient that the IRS occasion is transmitted in association with the paging occasion or the paging cycle (that is, transmitted at a time point before the paging occasion).

In another example, a scrambling ID (scramblingID) of the IRS may be determined on the basis of a cell ID when the IRS is configured for use #1, use #2, or use #3, and a scrambling ID (scramblingID) may be additionally configured when the IRS is configured for use #4. When the IRS is used for use #4 and the corresponding IRS or the IRS occasion is shared with the connected-mode terminal, the scrambling ID may be separately configured in order to minimize the signal correlation between the case in which the RS is transmitted for the connected-mode terminal and the case in which the RS is transmitted for the idle-mode terminal.

<Embodiment 3> PRM Operation Method

According to an embodiment of the disclosure, the IRS may be used for the purpose of RRM as described below.
Function #3 (or use #3) signal quality measurement
  For example, measurement of signal quality for serving cell or neighboring cell for cell selection or reselection
  For example, measurement of signal quality for serving cell or neighboring cell for Radio Resource Management (RRM)

That is, the terminal may perform RRM for a serving cell or RRM for a neighboring cell on the basis of the IRS received from the BS. RRM may be a series of operations of measuring a received signal quality, determining whether the connectivity of a serving cell or a neighboring cell is good or not, and performing the following procedure according thereto (For example, cell selection or reselection).

In an embodiment of the disclosure, the BS may configure the IRS for the purpose of RRM in the terminal, and the terminal may perform an RRM-related operation (for example, signal quality measurement) on the basis of the configured IRS.

In an embodiment of the disclosure, the BS may configure the IRS for the purpose of RRM in the terminal, and the terminal may assume that the RS is always transmitted in the IRS occasion configured for the IRS for the purpose of RRM.

In an embodiment of the disclosure, the BS may or may not actually transmit the RS in the IRS occasion configured for the purpose of RRM in the terminal. When the terminal does not know non-transmission of the RS in the configured IRS occasion, a problem in the performance of the RRM-related operation may occur. Accordingly, the BS may additionally configure the "RS transmission availability indicator" for the IRS configured for the purpose of RRM in the terminal and additionally inform the terminal of whether the RS is actually transmitted in a predetermined IRS occasion (see <Embodiment 1-2> for a detailed embodiment).

In an embodiment of the disclosure, if the terminal receives information indicating that the RS is not transmitted in the IRS occasion configured for the purpose of RRM during a specific time interval through the "RS transmission availability indicator" or if the terminal does not receive the "RS transmission availability indicator" and a defined default operation corresponds to an operation assuming that the RS is not transmitted, the terminal may perform the RRM operation on the basis of a combination of operations corresponding to one or more of the following operations.

[Operation-3]
The terminal may not perform the RRM operation on the basis of the IRS during a specific time interval and may operate on the basis of the assumption that an RRM operation based on an SS/PBCH is a default operation.
[Operation-4]
The terminal may not perform the RRM operation during a specific time interval.

The BS may configure whether to implement the embodiments in the terminal. The terminal may receive configuration information indicating whether to implement the embodiments from the BS and may differently control the operation of each embodiment on the basis of the corresponding configuration information.

Whether the embodiments can be implemented may be notified on the basis of a UE capability report from the terminal to the BS. The BS may acquire whether functions of the embodiments can be supported through a capability report from the terminal and control operations based on the embodiments suitable for the terminal.

The embodiments may be combined with each other and implemented.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with various embodiments thereof, it will be understood by those skilled in the art that various changes in form and details may be made therein without departing from the spirit and scope of the disclosure as defined by the appended claims and equivalents.

What is claimed is:

1. A method performed by a terminal in a communication system, the method comprising:
   receiving, from a base station, a system information block (SIB) configuring an idle/inactive state reference signal (IRS) resource for an idle state or an inactive state, wherein an IRS availability indication is enabled based on a configuration in the SIB;
   receiving, from the base station, downlink control information (DCI), wherein the DCI includes the IRS availability indication indicating presence of an IRS in a specific time interval in case that the configuration enables the IRS availability indication and the IRS is received according to an IRS type B; and
   receiving, from the base station, the IRS in the specific time interval while the idle state or the inactive state,
   wherein the specific time interval is determined based on a reception timing of the DCI including IRS availability indication and a paging cycle, and
   wherein:
      one of an IRS type A or the IRS type B is determined based on a periodicity of the IRS,
      the IRS type A is defined as a type in which the IRS is always present in IRS occasions, and
      the IRS type B is defined as a type in which the IRS is present or not present in the IRS occasions.

2. The method of claim 1,
   wherein the SIB includes information on power control offset, scrambling ID, periodicity, and offset associated with the IRS,
   wherein the power control offset indicates ratio of a non-zero power (NZP) channel state information reference signal (CSI-RS) energy per resource element (EPRE) and a physical broadcast channel and synchronization signal (SS/PBCH) block EPRE.

3. The method of claim 1, wherein the IRS is unavailable after receiving the SIB until receiving the DCI including the IRS availability indication.

4. The method of claim 1, wherein the DCI includes a cyclic redundancy check (CRC) scrambled with a paging-radio network temporary identifier (P-RNTI).

5. A method performed by a base station in a communication system, the method comprising:
   transmitting, to a terminal, a system information block (SIB) configuring an idle/inactive state reference signal (IRS) resource for an idle state or an inactive state, wherein an IRS availability indication is enabled based on a configuration in the SIB;
   transmitting, to the terminal, downlink control information (DCI), wherein the DCI includes the IRS availability indication indicating presence of an IRS in a specific time interval in case that the configuration enables the IRS availability indication and the IRS is transmitted according to an IRS type B; and
   transmitting, to the terminal, the IRS in the specific time interval while the terminal is in the idle state or the inactive state,
   wherein the specific time interval is determined based on a transmission timing of the DCI including IRS availability indication and a paging cycle, and
   wherein:
      one of an IRS type A or the IRS type B is determined based on a periodicity of the IRS,
      the IRS type A is defined as a type in which the IRS is always present in IRS occasions, and
      the IRS type B is defined as a type in which the IRS is present or not present in the IRS occasions.

6. The method of claim 5,
   wherein the SIB includes information on power control offset, scrambling ID, periodicity, and offset associated with the IRS, and
   wherein the power control offset indicates ratio of a non-zero power (NZP) channel state information reference signal (CSI-RS) energy per resource element (EPRE) and a physical broadcast channel and synchronization signal (SS/PBCH) block EPRE.

7. The method of claim 5, wherein the IRS is unavailable after transmitting the SIB until transmitting the DCI including the IRS availability indication.

8. The method of claim 5, wherein the DCI includes a cyclic redundancy check (CRC) scrambled with a paging-radio network temporary identifier (P-RNTI).

9. A terminal in a communication system, the terminal comprising:
   a transceiver; and
   a processor configured to:
      receive, from a base station, a system information block (SIB) configuring an idle/inactive state reference signal (IRS) resource for an idle state or an inactive state, wherein an IRS availability indication is enabled based on a configuration in the SIB,
      receive, from the base station, downlink control information (DCI), wherein the DCI includes the IRS availability indication indicating presence of the IRS in a specific time interval in case that the configuration enables the IRS availability indication and the IRS is received according to an IRS type B, and
      receive, from the base station, the IRS in the specific time interval while the idle state or the inactive state,
   wherein the specific time interval is determined based on a reception timing of the DCI including IRS availability indication and a paging cycle, and
   wherein:
      one of an IRS type A or the IRS type B is determined based on a periodicity of the IRS,
      the IRS type A is defined as a type in which the IRS is always present in IRS occasions, and
      the IRS type B is defined as a type in which the IRS is present or not present in the IRS occasions.

10. The terminal of claim 9,
    wherein the SIB includes information on power control offset, scrambling ID, periodicity, and offset associated with the IRS, and
    wherein the power control offset indicates ratio of a non-zero power (NZP) channel state information reference signal (CSI-RS) energy per resource element (EPRE) and a physical broadcast channel and synchronization signal (SS/PBCH) block EPRE.

11. The terminal of claim 9, wherein the IRS is unavailable after receiving the SIB until receiving the DCI including the IRS availability indication.

12. The terminal of claim 9, wherein the DCI includes a cyclic redundancy check (CRC) scrambled with a paging-radio network temporary identifier (P-RNTI).

13. A base station in a communication system, the base station comprising:

a transceiver; and
a processor configured to:
  transmit, to a terminal, a system information block (SIB) configuring an idle/inactive state reference signal (IRS) resource for an idle state or an inactive state, wherein an IRS availability indication is enabled based on a configuration in the SIB,
  transmit, to the terminal, downlink control information (DCI), wherein the DCI includes the IRS availability indication indicating presence of an IRS in a specific time interval in case that the configuration enables the IRS availability indication and the IRS is transmitted according to an IRS type B, and
  transmit, to the terminal, the IRS in the specific time interval while the terminal is in the idle state or the inactive state,
wherein the specific time interval is determined based on a transmission timing of the DCI including IRS availability indication and a paging cycle and
wherein:
one of an IRS type A or the IRS type B is determined based on a periodicity of the IRS,
the IRS type A is defined as a type in which the IRS is always present in IRS occasions, and
the IRS type B is defined as a type in which the IRS is present or not present in the IRS occasions.

14. The base station of claim 13,
wherein the SIB includes information on power control offset, scrambling ID, periodicity, and offset associated with the IRS, and
wherein the power control offset indicates ratio of a non-zero power (NZP) channel state information reference signal (CSI-RS) energy per resource element (EPRE) and a physical broadcast channel and synchronization signal (SS/PBCH) block EPRE.

15. The base station of claim 13, wherein the IRS is unavailable after transmitting the SIB until transmitting the DCI including the IRS availability indication.

* * * * *